(12) United States Patent
Corbett et al.

(10) Patent No.: US 12,071,293 B2
(45) Date of Patent: *Aug. 27, 2024

(54) CONTAINERS FOR HOLDING MATERIALS

(71) Applicant: ECO.LOGIC BRANDS INC., Manteca, CA (US)

(72) Inventors: Julie Corbett, Oakland, CA (US); Romeo Graham, Ottawa (CA); Robert Watters, Ottawa (CA); Michael Sirois, Ottawa (CA)

(73) Assignee: ECO.LOGIC BRANDS INC., Manteca, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/331,847

(22) Filed: May 27, 2021

(65) Prior Publication Data
US 2021/0284418 A1 Sep. 16, 2021

Related U.S. Application Data

(63) Continuation of application No. 15/982,152, filed on May 17, 2018, now Pat. No. 11,167,904, which is a
(Continued)

(51) Int. Cl.
*B65D 77/00* (2006.01)
*B65D 1/02* (2006.01)
(Continued)

(52) U.S. Cl.
CPC ......... *B65D 77/065* (2013.01); *B65D 1/0246* (2013.01); *B65D 11/04* (2013.01);
(Continued)

(58) Field of Classification Search
CPC ...... B65D 77/065; B65D 77/06; B65D 23/02; B65D 11/04; B65D 11/08; B65D 11/06;
(Continued)

(56) References Cited

U.S. PATENT DOCUMENTS

| 1,452,039 A | 4/1923 | Gravell |
| D99,757 S | 5/1936 | Dallas |

(Continued)

FOREIGN PATENT DOCUMENTS

| DE | 4401719 A1 | 7/1994 |
| DE | 20220109 U1 | 4/2004 |

(Continued)

OTHER PUBLICATIONS

European search report and search opinion dated Mar. 30, 2015 for EP Application No. 14190546.3.
(Continued)

*Primary Examiner* — King M Chu
(74) *Attorney, Agent, or Firm* — CANTOR COLBURN LLP

(57) ABSTRACT

A container includes: a skeleton shell defining a container body of the container, the skeleton shell being formed from a recycled and/or biodegradable pulp material; and, a bag or liner removably disposed within the skeleton shell. Wherein the skeleton shell includes at least one separation feature that facilitates separation of the skeleton shell from the bag or liner.

20 Claims, 38 Drawing Sheets

Related U.S. Application Data continuation of application No. 15/272,300, filed on Sep. 21, 2016, now Pat. No. 10,005,605, which is a continuation of application No. 14/201,563, filed on Mar. 7, 2014, now abandoned, said application No. 15/982,152 is a continuation of application No. PCT/US2012/054035, filed on Sep. 6, 2012, said application No. 15/982,152 is a continuation-in-part of application No. 14/458,189, filed on Aug. 12, 2014, now Pat. No. 9,452,857, which is a continuation-in-part of application No. 13/044,366, filed on Mar. 9, 2011, now Pat. No. 8,807,377, said application No. 15/982,152 is a continuation-in-part of application No. 14/799,486, filed on Jul. 14, 2015, now abandoned, which is a continuation of application No. 13/208,933, filed on Aug. 12, 2011, now abandoned, which is a continuation of application No. 12/740,350, filed as application No. PCT/US2009/056754 on Sep. 11, 2009, now Pat. No. 8,430,262.

(60) Provisional application No. 61/533,137, filed on Sep. 9, 2011, provisional application No. 61/312,658, filed on Mar. 10, 2010, provisional application No. 61/096,743, filed on Sep. 12, 2008.

(51) Int. Cl.
*B65D 8/00* (2006.01)
*B65D 8/02* (2006.01)
*B65D 25/16* (2006.01)
*B65D 25/18* (2006.01)
*B65D 77/06* (2006.01)

(52) U.S. Cl.
CPC ............ *B65D 11/06* (2013.01); *B65D 11/08* (2013.01); *B65D 25/16* (2013.01); *B65D 25/18* (2013.01); *B65D 77/06* (2013.01); *B65D 77/067* (2013.01); *B65D 2583/005* (2013.01)

(58) Field of Classification Search
CPC ............ B65D 83/0055; B65D 25/16; B65D 77/062; B65D 65/466; B65D 1/0246
USPC .......... 220/23.91, 495.03, 678; 222/105, 183
See application file for complete search history.

(56) References Cited

U.S. PATENT DOCUMENTS

| | | | |
|---|---|---|---|
| 2,562,389 A | 7/1951 | Piazze | |
| 2,822,965 A | 2/1958 | Smith | |
| 2,949,370 A * | 8/1960 | Hughes | B65D 75/68 |
| | | | 426/123 |
| 2,954,901 A | 10/1960 | Winstead | |
| 3,017,049 A * | 1/1962 | Powell | B65D 50/061 |
| | | | 215/206 |
| D192,535 S | 4/1962 | Laudano | |
| 3,119,543 A | 1/1964 | Walker | |
| D198,404 S | 6/1964 | Busch | |
| D198,407 S | 6/1964 | Busch | |
| D201,213 S | 5/1965 | Petitto | |
| 3,255,932 A | 6/1966 | Hunter et al. | |
| 3,450,254 A | 6/1969 | Miles | |
| D217,439 S | 5/1970 | Platte | |
| 3,567,104 A | 3/1971 | Arslanian et al. | |
| 3,610,455 A | 10/1971 | Greenhalgh et al. | |
| D229,485 S | 12/1973 | Petersen | |
| D233,829 S | 12/1974 | Balbach | |
| 3,941,301 A | 3/1976 | Jorgensen | |
| 4,003,492 A * | 1/1977 | Beveridge | B65D 7/38 |
| | | | 220/678 |
| D258,117 S | 2/1981 | Bashour | |
| 4,282,984 A | 8/1981 | Curry, Jr. | |
| 4,330,066 A | 5/1982 | Berliner | |
| 4,384,657 A * | 5/1983 | Ueno | B23K 11/0006 |
| | | | 138/171 |
| RE32,354 E | 2/1987 | Savage | |
| 4,709,528 A | 12/1987 | Merkus | |
| 4,817,830 A | 4/1989 | Yavorsky | |
| 4,837,849 A | 6/1989 | Erickson et al. | |
| 4,838,429 A | 6/1989 | Fabisiewicz et al. | |
| D305,980 S | 2/1990 | Binder et al. | |
| 5,156,295 A * | 10/1992 | Gordon | B65D 77/065 |
| | | | 222/105 |
| 5,203,470 A | 4/1993 | Brown | |
| 5,257,865 A | 11/1993 | Tani | |
| 5,288,531 A | 2/1994 | Falla et al. | |
| 5,363,966 A | 11/1994 | Czech et al. | |
| D354,914 S | 1/1995 | Newman | |
| 5,429,263 A | 7/1995 | Haubenwallner | |
| 5,474,212 A * | 12/1995 | Ichikawa | B05B 11/026 |
| | | | 222/105 |
| 5,477,974 A | 12/1995 | Reil et al. | |
| D368,660 S | 4/1996 | Terwilleger et al. | |
| D372,429 S | 8/1996 | Clark et al. | |
| D373,533 S | 9/1996 | Gonda et al. | |
| D373,535 S | 9/1996 | Gonda et al. | |
| D374,179 S | 10/1996 | Gonda et al. | |
| D376,761 S | 12/1996 | Gonda et al. | |
| 5,715,992 A | 2/1998 | Andrews, Sr. et al. | |
| 5,735,422 A | 4/1998 | Binter | |
| D401,506 S | 11/1998 | Collins et al. | |
| 5,860,530 A | 1/1999 | Simmons et al. | |
| 5,860,555 A | 1/1999 | Mayled | |
| D408,742 S | 4/1999 | Goettner | |
| 5,890,616 A | 4/1999 | Cravens et al. | |
| 5,909,841 A | 6/1999 | Andrews, Sr. et al. | |
| 5,996,427 A | 12/1999 | Masek et al. | |
| D426,469 S | 6/2000 | Mankowski et al. | |
| D429,465 S | 8/2000 | Weeden | |
| 6,142,344 A | 11/2000 | Kai | |
| 6,196,452 B1 | 3/2001 | Andrews, Sr. et al. | |
| 6,223,945 B1 | 5/2001 | Giblin et al. | |
| 6,237,308 B1 | 5/2001 | Quintin et al. | |
| 6,290,124 B2 | 9/2001 | Andrews, Sr. et al. | |
| D451,401 S | 12/2001 | Silvers et al. | |
| 6,375,040 B1 | 4/2002 | Allanson et al. | |
| 6,398,076 B1 | 6/2002 | Giblin et al. | |
| 6,431,401 B1 | 8/2002 | Giblin et al. | |
| 6,454,134 B1 | 9/2002 | Aujesky et al. | |
| 6,464,106 B1 | 10/2002 | Giblin et al. | |
| 6,510,965 B1 | 1/2003 | Decottignies et al. | |
| D471,111 S | 3/2003 | Kuzma et al. | |
| 6,619,505 B1 | 9/2003 | Decottignies et al. | |
| 6,679,381 B1 | 1/2004 | Bush | |
| 6,783,277 B2 | 8/2004 | Edwards et al. | |
| 6,794,053 B2 | 9/2004 | Quintin et al. | |
| 6,826,892 B2 | 12/2004 | Basque et al. | |
| 6,857,779 B2 | 2/2005 | Olin | |
| 6,874,299 B2 | 4/2005 | Basque | |
| D508,206 S | 8/2005 | Meeker et al. | |
| 7,076,935 B2 | 7/2006 | Basque | |
| D543,466 S | 5/2007 | Little et al. | |
| D543,852 S | 6/2007 | Warren | |
| D607,743 S | 1/2010 | Eble | |
| D608,211 S | 1/2010 | Eble | |
| D633,808 S | 3/2011 | Titherington | |
| D645,754 S | 9/2011 | Corbett et al. | |
| D645,755 S | 9/2011 | Corbett et al. | |
| 8,430,262 B2 | 4/2013 | Corbett et al. | |
| D692,768 S | 11/2013 | Corbett et al. | |
| D692,769 S | 11/2013 | Corbett et al. | |
| D694,635 S | 12/2013 | Corbett et al. | |
| 8,807,377 B2 | 8/2014 | Corbett et al. | |
| D720,227 S | 12/2014 | Corbett et al. | |
| 8,991,635 B2 | 3/2015 | Myerscough | |
| 10,005,605 B2 | 6/2018 | Corbett et al. | |
| 2002/0175094 A1 * | 11/2002 | Campbell | B65D 83/0888 |
| | | | 383/41 |
| 2005/0133578 A1 | 6/2005 | Farha et al. | |

(56) References Cited

U.S. PATENT DOCUMENTS

| | | |
|---|---|---|
| 2005/0167319 A1 | 8/2005 | Girondi et al. |
| 2006/0062497 A1 | 3/2006 | Murray |
| 2006/0111224 A1 | 5/2006 | Caudle |
| 2006/0131188 A1 | 6/2006 | Lindemann |
| 2006/0230588 A1 | 10/2006 | Sprehe |
| 2007/0068944 A1 | 3/2007 | McKinney et al. |
| 2007/0211967 A1 | 9/2007 | Murray |
| 2008/0083695 A1 | 4/2008 | Nievierowski |
| 2008/0083777 A1 | 4/2008 | Lips |
| 2008/0210584 A1* | 9/2008 | Barthel .................. B65D 77/06 206/581 |
| 2008/0267540 A1 | 10/2008 | Ashworth |
| 2009/0057381 A1 | 3/2009 | Gokhale |
| 2011/0036846 A1 | 2/2011 | Corbett et al. |
| 2011/0220652 A1 | 9/2011 | Corbett et al. |
| 2012/0024897 A1 | 2/2012 | Corbett et al. |
| 2012/0145710 A1 | 6/2012 | Corbett et al. |
| 2014/0252032 A1 | 9/2014 | Corbett et al. |
| 2015/0034588 A1 | 2/2015 | Corbett et al. |
| 2015/0298895 A1 | 10/2015 | Corbett et al. |
| 2015/0314916 A1 | 11/2015 | Corbett et al. |
| 2016/0159545 A1 | 6/2016 | Corbett et al. |
| 2016/0185500 A1 | 6/2016 | Corbett et al. |

FOREIGN PATENT DOCUMENTS

| | | |
|---|---|---|
| DE | 202004010291 U1 | 9/2004 |
| EP | 0134142 A2 | 3/1985 |
| EP | 0134142 A3 | 5/1986 |
| EP | 0302600 A1 | 2/1989 |
| EP | 0590424 A1 | 4/1994 |
| EP | 0785023 A1 | 7/1997 |
| EP | 1739025 A1 | 1/2007 |
| EP | 2338807 A1 | 6/2011 |
| EP | 2361847 A1 | 8/2011 |
| FR | 1287487 A | 3/1962 |
| GB | 191516490 A | 6/1916 |
| GB | 1207421 A | 9/1970 |
| GB | 05247895 | 12/2005 |
| GB | 06111371 | 6/2006 |
| GB | 08076978 | 4/2008 |
| GB | 08076986 | 4/2008 |
| GB | 08110983 | 6/2008 |
| GB | 2432829 B | 8/2008 |
| GB | 08185514 | 10/2008 |
| JP | S5089191 A | 7/1975 |
| JP | H0532272 B2 | 5/1993 |
| JP | H1159726 A | 3/1999 |
| JP | 2001287260 A | 10/2001 |
| JP | 2001287620 A | 10/2001 |
| JP | 2002542992 A | 12/2002 |
| JP | 2009196644 A | 9/2009 |
| JP | 5098689 B2 | 10/2012 |
| KR | 200379463 | 3/2005 |
| NL | 2000414 C2 | 7/2008 |
| TW | M269271 U | 7/2005 |
| WO | 9114630 A1 | 10/1991 |
| WO | 9315967 A1 | 8/1993 |
| WO | 9419242 A1 | 9/1994 |
| WO | 9419255 A1 | 9/1994 |
| WO | 9746465 A1 | 12/1997 |
| WO | 9902415 A1 | 1/1999 |
| WO | 0064595 A1 | 11/2000 |
| WO | 03033376 A1 | 4/2003 |
| WO | 2005054068 A1 | 6/2005 |
| WO | 2007060450 A2 | 5/2007 |
| WO | 2007066090 A1 | 6/2007 |
| WO | 2007126044 A1 | 11/2007 |
| WO | 2008103649 A2 | 8/2008 |
| WO | 2008103649 A3 | 11/2008 |
| WO | 2009133355 A1 | 11/2009 |
| WO | 2009133359 A1 | 11/2009 |
| WO | 2009153558 A1 | 12/2009 |
| WO | 2010030958 A2 | 3/2010 |
| WO | 2011112712 A1 | 9/2011 |
| WO | 2011141696 A1 | 11/2011 |
| WO | 2011157999 A2 | 12/2011 |
| WO | 2011158000 A1 | 12/2011 |
| WO | 2011157999 A3 | 2/2012 |
| WO | 2013036695 A1 | 3/2013 |

OTHER PUBLICATIONS

European search report and search opinion dated Apr. 23, 2014 for EP Application No. 11754007.0.
European search report and search opinion dated Aug. 27, 2013 for EP Application No. 13171258.
European search report and search opinion dated Dec. 18, 2014 for EP Application No. 14187674.8.
GreenBottle. Is it The End for Plastic Bottles? Flyer. Nov. 3, 2009, pp. 1-4.
International search report and written opinion dated Apr. 25, 2007 for PCT Application No. GB2006004534.
International Search Report and Written Opinion for International Application No. PCT/US2011/027744; International Filing Date Mar. 9, 2011; Report Mail Date Aug. 12, 2011 (8 Pages).
International Search Report and Written Opinion for International Application No. PCT/US2012/054035; International Filing Date Sep. 6, 2012; Report Mail Date Dec. 14, 2012 (9 Pages).
International Search Report for International Application No. PCT/US2009/056754; International Filing Date Sep. 11, 2009; Report Mail Date Mar. 25, 2010 (3 Pages).
Notice of allowance dated Mar. 25, 2013 for U.S. Appl. No. 12/740,350.
Notice of allowance dated May 31, 2016 for U.S. Appl. No. 14/458,189.
Notice of allowance dated Jun. 17, 2014 for U.S. Appl. No. 13/044,366.
Notice of allowance dated Jun. 23, 2011 for U.S. Appl. No. 29/357,340.
Notice of allowance dated Jul. 28, 2016 for U.S. Appl. No. 14/458,189.
Notice of allowance dated Aug. 25, 2014 for U.S. Appl. No. 29/431,407.
Office action dated Jan. 14, 2015 for U.S. Appl. No. 13/208,933.
Office action dated Feb. 6, 2014 for U.S. Appl. No. 29/431,407.
Office action dated Feb. 23, 2012 for U.S. Appl. No. 13/208,933.
Office action dated Mar. 9, 2011 for U.S. Appl. No. 12/740,350.
Office action dated Mar. 13, 2013 for U.S. Appl. No. 12/740,350.
Office action dated Apr. 1, 2016 for U.S. Appl. No. 14/458,189.
Office action dated Apr. 18, 2014 for U.S. Appl. No. 13/208,933.
Office action dated May 15, 2017 for U.S. Appl. No. 15/272,300.
Office Action dated May 18, 2016 for U.S. Appl. No. 14/799,486.
Office action dated May 22, 2015 for U.S. Appl. No. 29/452,101.
Office action dated Jun. 19, 2015 for U.S. Appl.No. 14/458,189.
Office action dated Jul. 8, 2020 for U.S. Appl. No. 15/982,152.
Office action dated Jul. 9, 2013 for U.S. Appl. No. 13/044,366.
Office action dated Jul. 14, 2011 for U.S. Appl. No. 12/740,350.
Office action dated Sep. 26, 2012 for U.S. Appl. No. 13/208,933.
Office Action dated Oct. 6, 2016 for U.S. Appl. No. 14/201,563.
Office action dated Nov. 1, 2012 for U.S. Appl. No. 12/740,350.
Office action dated Nov. 5, 2015 for U.S. Appl. No. 14/799,486.
Office action dated Nov. 6, 2012 for U.S. Appl. No. 13/044,366.
Office action dated Dec. 5, 2017 for U.S. Appl. No. 15/272,300.
Office action dated Dec. 23, 2013 for U.S. Appl. No. 13/044,366.
U.S. Appl. No. 29/452,101, filed Apr. 11, 2013.

* cited by examiner

SECTION C-C

SECTION B-B

SECTION A-A

SECTION D-D

SECTION D-D

Section A-A

Section B-B

CONTAINERS FOR HOLDING MATERIALS

CROSS-REFERENCE

The present application is a continuation application of U.S. patent application Ser. No. 15/982,152, filed May 17, 2018, which is a continuation application of U.S. patent application Ser. No. 15/272,300, filed Sep. 21, 2016, which is a continuation application of U.S. patent application Ser. No. 14/201,563, filed Mar. 7, 2014, which is a continuation application of International Application No. PCT/US2012/054035, filed Sep. 6, 2012, which claims priority to Provisional Patent Application No. 61/533,137, filed Sep. 9, 2011, each of which is entirely incorporated by reference herein; U.S. patent application Ser. No. 15/982,152 is also a continuation-in-part application of U.S. patent application Ser. No. 14/458,189, filed Aug. 12, 2014, which is a continuation application of U.S. patent application Ser. No. 13/044,366, filed Mar. 9, 2011, now U.S. Pat. No. 8,807,377, which claims priority to Provisional Patent Application No. 61/312,658 filed Mar. 10, 2010, each of which is entirely incorporated by reference herein; and U.S. patent application Ser. No. 15/982,152 is also a continuation-in-part application of U.S. patent application Ser. No. 14/799,486, filed Jul. 14, 2015, which is a continuation application of U.S. patent application Ser. No. 13/208,933, filed Aug. 12, 2011, now abandoned, which is a continuation application of U.S. patent application Ser. No. 12/740,350, filed Nov. 3, 2010, now U.S. Pat. No. 8,430,262, which is a National Stage Entry filing of PCT/US2009/056754, filed Sep. 11, 2009, which claims priority to Provisional Patent Application No. 61/096,743, filed Sep. 12, 2008, each of which is entirely incorporated by reference herein.

BACKGROUND OF INVENTION

Packaging used for containing liquids can generate large amounts of waste. In some cases, packaging used for containing liquids can be recycled. Packaging used for containing liquids has been described in PCT Publication No. WO 2007/0066090, which is herein incorporated by reference in its entirety.

Traditionally, many beverages such as wine, beer and milk have been supplied in glass bottles. The glass used to make these bottles may itself be recycled. However, the energy required to make the bottles is high. Also, the weight of the resulting packaging is high, increasing the amount of energy required to transport the products. While the glass can be recycled, this does require that the bottles are separated from other waste, for example by users separating the glass bottles from other household waste for collection. Therefore, it is often the case that glass bottles are disposed of with other waste. In this case, the glass bottles may be disposed of in a landfill site. This is a problem since, unlike some other forms of waste, glass is not biodegradable.

More recently, it has become common to use bottles made from plastics, such as PET or HDPE, for liquid such as water, juice, carbonated drinks, or milk. In this case, it is common for the bottles to be formed from virgin, i.e., non-recycled, material to ensure that the liquid contained within the bottle is not contaminated as could be the case if the containers were formed from recycled material. While the material itself could be recycled if separated from other waste, as with glass bottles this frequently does not occur due to the need for the waste producer, such as a householder, to separate the containers from other waste material. Again, if the container is disposed of in a landfill site or the like, the bottle is not biodegradable. Also, bottles take up a volume larger than that of the material itself due to their hollow, rigid, structure, and therefore take up an excessive amount of space in a landfill site.

It has also been proposed to package liquid in laminated cardboard containers, for example in containers marketed by Tetra Pak. In this case, the cardboard from which the body of the container is formed may be virgin or recycled material. The cardboard is laminated with a waterproof coating. This ensures that the container is able to hold liquid and also acts as a barrier between the liquid and the cardboard, which can prevent contamination of the liquid from the cardboard. This is especially needed where the cardboard is formed from recycled material. A problem with such packages is that they are difficult to recycle, and the waterproof coating prevents them fully decomposing. The problem is exacerbated when a plastic dispensing nozzle or cap is formed as part of the package for dispensing the contents. This is another component that would need to be separated before the container can be recycled or parts of this be allowed to decompose.

In some countries, liquid such as milk is packaged in bags. However, these bags have little structural stability, and therefore are difficult to transport and to stack on shelves. They are often not re-sealable, making them hard to hold and carry.

It is known to package wine in boxes. These comprise a box body, typically formed of laminated cardboard, which provides the structure for the package. A bag is provided within the box, the wine being contained within the bag. A dispensing tap is often connected to the bag, and when in use is arranged to protrude through a side opening in the box. In such instances, the spout is made to protrude or hang outside of the box for dispensing. The weight of the liquid is usually distributed along the box bottom and is not supported by the dispensing tap protruding from the box. For the efficient disposal of such a container, each of the parts made from different materials would be also separated, namely the bag from the box, the dispensing tap from the bag, and the lamination from the cardboard forming the box. This separation of packaging components is difficult and prevents such packages from being disposed of or recycled efficiently.

Furthermore, in some cases bottles or other liquid containers contain additional, separable components that do not make it into a recycling bin. For example, loose caps, straws, and plastic tamperproof or tamper-evident devices can contribute to overall litter in the environment. Even if bottles make it into a recycling bin or garbage can, their caps or other types of closures often end up as general litter.

Therefore, there is a need for improved containers that have a reduced negative impact on the environment while providing consumers with enhanced functionality and design features.

SUMMARY OF INVENTION

In an aspect of the invention, containers for holding materials, such as solids and liquids, are provided.

In an embodiment, a liquid container comprises a liquid holding bag having a fitment, the liquid holding bag and the fitment each formed from a polymeric material; and a molded fiber or pulp-formed skeleton shell that supports the liquid holding bag.

In another embodiment of the invention, a liquid container comprises a liquid holding bag attached to a fitment and a skeleton shell, the fitment comprising one or more flanges that are complementary to one or more flanges of the skeleton shell, the one or more flanges forming one or more connections that integrate the fitment and the skeleton shell.

In another embodiment, a container comprises a holding bag with a fitment having an orifice for filling the holding bag with a material, the fitment having one or more external mating features for making a secure connection to a skeleton shell, the orifice being sealably or re-sealably closable upon being filled with the material; and a molded fiber or pulp-formed skeleton shell enclosing the liquid holding bag.

Another embodiment of the invention provides a materials container comprising a materials holding bag having a fitment with one or more heat stakes and a skeleton shell, wherein the fitment is secured to the skeleton shell by the one or more heat stakes configured to embed into the skeleton shell through compression and to deform and adhere while embedded in the skeleton shell by the application of ultrasonic energy.

In a further embodiment, a materials container is provided that comprises a materials holding bag and a skeleton shell with mating features, wherein the skeleton shell is formed with a smooth outer surface on at least one edge of the skeleton shell by said mating features.

Another aspect of the invention is directed to a container comprising a materials holding container having a fitment; and a shell comprising one or more scalloped features on both sides of a flange, wherein the shell includes a neck configured to support the fitment.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The features and advantages of the invention may be further explained by reference to the following detailed description and accompanying drawings that sets forth illustrative embodiments.

DETAILED DESCRIPTION OF INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for material containment. Various aspects of the invention described herein may be applied to any of the particular applications set forth below or in any other type of material containment application. The invention may be applied as a standalone system, or as part of an integrated container/packaging system. It shall be understood that different aspects of the invention can be appreciated individually, collectively, or in combination with each other.

The invention provides for containers comprising components selected from the group consisting of a liquid-holding vessel, a closure, and a skeleton. The container components, including the liquid-holding vessels, fitments, closures and skeletons described herein can be interchanged or combined with various illustrations of the invention. Any of the aspects of the invention described herein can be combined with other container components known to those skilled in the arts.

The containers described herein can be used for the delivery and/or storage of beverages for human consumption or for the delivery of other materials not for human consumption. Examples of materials that can be contained include beverages, syrups, concentrates, soaps, inks, gels, solids, and powders. The vessels, which may be liquid-holding vessels, can be preferably comprised of one type of material, facilitating full recycling of the materials. In other embodiments of the invention the vessel assembly can be significantly of one type of material while a component such as a cap or tamper proof seal may be made of a different material better suited to its purpose.

The liquid-holding vessel can be coupled to a structural chassis or skeleton to support the vessel during shipping and handling. The fluid can be dispensed from the container by pouring, sucking, squirting, or other means. The structural chassis can prevent collapse of the vessel and resist side force on the container sufficient to allow the container to be picked up in one hand and the beverage to be dispensed in a controlled fashion.

Figure 1:
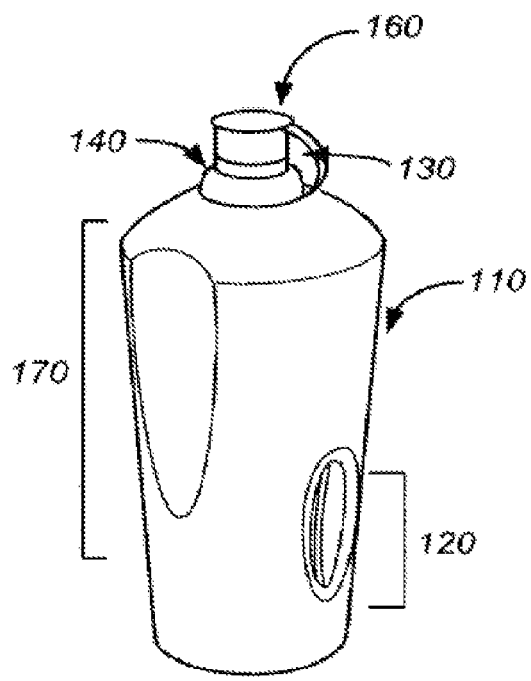
FIG. 1 is a diagram of a container comprising a molded fiber or pulp-molded skeleton, a liquid-holding bag, and a closure, in accordance with an embodiment of the invention.

FIG. 1 shows an illustration of a container comprising a liquid-holding bag supported by a molded fiber or pulp-formed skeleton (110). The molded fiber or pulp-formed skeleton can comprise one or more openings (120) for viewing the contents of a liquid-holding bag contained within the fiber molded or pulp-formed skeleton. The liquid-holding bag can be formed of an optically transparent material. The container can also comprise a fitment (130). The closure can comprise a retaining collar (140) and a cap (160). The container can also have a gripping or grasping area (170) for gripping or grasping the container by a user.

The liquid-holding bags or vessels herein can be formed of a polymer or other liquid impermeable material. The polymer or other liquid-impermeable material can be food-grade for storage of consumable products. The liquid-holding vessel can be flexible or compressible. In some embodiments of the invention, the amount of polymer used to construct the liquid-holding vessel is minimized for a given vessel volume. The minimization of polymer used for construction of the liquid-holding vessel can reduce the negative environmental impact associated with production or disposal of the container. In other embodiments of the invention, the liquid-holding vessel can comprise a seam for providing shape to the liquid-holding vessel. In some cases, the vessel can be formed of a single and uniform polymer allowing for an enhanced product life cycle.

The closures herein can be attached near openings of liquid-holding vessels to allow for reversible sealing of liquid-holding containers and dispensing of liquid from the vessels within. A closure can be preferably formed of a polymer or any other liquid-impermeable material. In some embodiments of the invention, the closure and the liquid-holding vessel are formed from polymers belonging to one recycling group or are formed from the same type of polymer. In some embodiments of the invention, the fitment is constructed of a single polymer type and the liquid-holding vessel is formed of multiple polymer types. Formation of the closure and the liquid-holding vessel from the same type of polymer or from polymers belonging to one recycling group can allow for simplified and/or reduced-cost recycling. A type of polymer can comprise polyethylene terephthalate (PET), high-density polyethylene (HDPE), polyvinyl chloride (PVC), low density polyethylene (LDPE), polypropylene (PP), polystyrene (PS), and other polymers. The polymer can be an FDA-approved plastic. The recycling groups can comprise plastic identification codes 1, 2, 3, 4, 5, 6, and 7. A recycling group can comprise a set of plastic or polymer types that can be recycled together using a recycling process that does not require separation of the plastic or polymer types prior to the recycling process.

In some embodiments of the invention, the amount of polymer used to construct the closure is minimized. The minimization of polymer used to construct the closure can reduce the negative environmental impact associated with production or disposal of the closure.

The fitments herein can be mechanically attached to an open end of a liquid-holding vessel through robust means, such as ultrasonic welding, heat sealing or other methods familiar to any skilled in the art. The fitments/dispensing apertures can be comprised of a single centrally located neck with an annular retaining collar extending outwardly from an unattached end of the centrally located neck that retains the neck to features on a structural chassis or skeleton. The annular retaining collar can be shaped to establish a secure connection to the central neck though the engagement of an inner portion of the retaining collar with appropriate ridged features on an outer portion of the neck. An outer portion of the retaining collar can be shaped to retain a top portion of the structural chassis or skeleton. In one embodiment of the structural chassis or skeleton where the configuration of the structural chassis or skeleton is similar to a clamshell, the annular retaining collar can provide secure closure of the clamshell around the liquid holding vessel. Those skilled in the art will be aware that the function of the retaining collar could be performed by other devices such as elastic banding, adhesive or non-adhesive tape or film, cord, metal banding, heat-shrink tubing, adhesive or non-adhesive paper labels, sealing wax, etc.

Closures herein can also include a tamper-evident seal. The tamper-evident seal can indicate whether or not a container has been opened. The tamper-evident seal can be formed of a paper, a polymer, a wax, or any other liquid-impermeable material. In other embodiments of the invention, the tamper-evident seal is not formed from a liquid-impermeable material. The tamper evident seal can be a film or other thin and lightweight material covering an opening or aperture. In some embodiments of the invention, the tamper-evident seal and the other components of the closure are formed from the same polymer type or from polymers belonging to a single recycling group. The tamper-evident seal can be designed such that breaking the tamper-evident seal does not release components from the container. In other embodiments of the invention, the tamper-evident seal is broken by release of a component of the tamper-evident seal from the container. The tamper evident seal can be broken by an initial biting or other user action on an aperture of the container.

In some embodiments of the invention, a tamper-evident feature or seal that is coupled to a bag can be configured such that breaking, destruction or unsealing of the tamper-evident seal results in formation of an opening in the bag. The can be designed by selecting a tamper-evident feature that possesses an adhesive strength or adherence strength that is greater than the strength of the bag or a tear strength of the bag. The adherence strength can be the adherence strength between a portion of the tamper-evident feature to the bag. This configuration can result in the formation of an opening in the bag by tearing the bag when the tamper-evident seal is broken or removed.

A fitment, which may also be referred to as a neck herein, can include a closure, which may be used for reversible closure and opening of a vessel, and one or more parts or features that are complementary to one or more features or parts on a shell or skeleton. The fitment can be welded or otherwise attached to a bag. The fitment can be secured to a pulp shell, thereby securing a bag to the skeleton via the fitment. In some embodiments, the fitment comprises a re-sealable closure. In other embodiments, the fitment comprises a twist cap, snap cap or lid.

The neck or fitment portions for the containers provided herein can be formed with a generally cylindrical or oval section forming an opening that allows communication between the inside and outside of the liquid-holding vessel by a fluid path. The fluid path can be interrupted by an integrally molded tamper-evident seal with features allowing the seal to be removed by hand of a user before extraction of fluid from within the liquid-holding vessel.

Furthermore, a neck or fitment can be formed with a plurality of flanges or registration features extending radially or circumferentially outwardly from the outer cylindrical or oval surface, spaced apart and located in such a way as to provide an interlock with features formed near the top of the structural chassis or skeleton. The structural chassis or skeleton can also comprise one or more flanges or registration features to mate with flanges or registration features of the neck. The secure interlock between the neck and the structural chassis or skeleton can prevent any relative movement along a long axis of the neck, or about the long axis of the neck. In some cases, rotational movement may be allowed between the chassis and neck about the long axis. The flanges or registration features may be secured to the neck or the skeleton by a glue, and adhesive, or by any other methods or compositions described herein. In some embodiments, the neck or fitment can include a melt part that may comprise a thin film or other meltable part. The skeleton can be secured to the neck by melting or welding the melt part, which can resolidify and form an adhesive or physical connection between the skeleton and the fitment. The flanges or registration features of the neck may be secured to the flanges or registration features of the skeleton by an adhesive, a glue, or by any other methods or compositions described herein. The flanges or registration features of the neck can be complementary to the flanges or registration features of the skeleton.

The outer skeletons in accordance with the invention herein can comprise any structural body that provides an enclosure and support to a liquid-holding vessel. The weight of the liquid-holding vessel may be supported by the skeleton. In some cases, the weight of the liquid-holding vessel may be preferably supported at a neck area only, which is connected to the skeleton. The skeleton can be formed of any material suitable for providing structural support. In some configurations, the skeleton can have sufficient structural rigidity to provide a gripping or grasping area for a user's hand and/or to prevent compression of a liquid-holding vessel contained within the skeleton. The gripping or grasping area can be positioned about the liquid-holding vessel, such that the liquid-holding vessel is between two points on the gripping or grasping area. In such a configuration, the liquid-holding vessel can exhaust its contents naturally as the liquid-holding vessel collapses. A fitment, described herein, may also be designed to facilitate gripping or grasping of a container described herein. The fitment can have grooves, reinforced surfaces, or friction pads to facilitate gripping or grasping.

The material used for forming the skeleton need not be food-grade, as the liquid-holding vessel can prevent contact of any liquid contained within the liquid-holding vessel with the skeleton during storage of the liquid or during dispensing of the liquid. The skeleton can comprise biodegradable materials, such as molded fiber or pulp or paper. For example, the skeleton may comprise 100% post-consumer fiber or pulp feedstock. In another example, the skeleton may comprise 100% recycled corrugated fiberboard and newspaper. The skeletons or other materials described herein can include virgin pulp fiber. The skeleton can comprise type-2 molded fiber, type-2A thermoformed fiber, type-3 thermoformed fiber, type-4 thermoformed fiber, molded fiber, X-RAY formed fiber, infrared formed fiber, microwave formed fiber, vacuum formed fiber, structural fiber, sheet stock, recycled plastic or any other structural material. Any of the materials that may be used to form the skeleton may be used in any of the embodiments described herein. Any discussion of pulp may also apply to any of the materials (e.g., fiber molding, natural fibers, biodegradable or compostable materials) that may be used to form a skeleton or skeleton shell.

The skeleton can be formed from one or more sheets of material that are laminated, folded or glued together. The sheets of material can comprise hinges, joints, creases, interlocks, flanges, or flaps for simplified folding of the sheets to form the skeleton.

Further, the skeleton shell can be formed in a dual or multiple wall configuration to allow for heavy load containment and/or dispensing. One or more shell parts may be formed of two or more layers, enabling a container design with a higher load rating. Features may be added to one or more shell parts to support a dual wall and its assembly. For example, in a multi-part skeleton shell configuration, a shell part may contain flanges appropriate for mating to one or more wall inserts. For example, a container may be assembled as a single wall container in order to reduce material requirements. The skeleton shell of the container may be provided with features allowing for subsequent conversion to a container suitable for more rugged performance (greater overall rigidity) through the addition of one or more insert wall layers. The wall inserts may be provided in areas where the largest mechanical stress is exerted. The extra wall(s) may be inserted on the inside or outside surface or the container shell. In some embodiments, the skeleton shell may be opened in order to expose wall insert receiving regions. Any description of a dual wall configuration herein may also apply to multiple walls.

The one or more skeleton wall layers may be bonded through mechanical means. The wall layers may also be bonded through adhesives, heat stakes or any other bonding means described herein. For example, a material-holding container may comprise areas of double-walled construction, where two or more pulp parts are bonded and/or mechanically connected at one or more locations to create a closed beam structural element. In some embodiments, an area of a skeleton shell may be folded over and bonded to form double-walled construction, wherein the double walls purposefully contact each other in certain areas with the perimeter of the smallest part. The one or more double-walled areas may be located anywhere on the skeleton shell, including the bottom, top and sides of the container. Alternatively, the entire container may comprise double-walled areas. A double-walled area may further function as a suitable receiving region for one or more insert pieces, such as a handle insert, in accordance with some embodiments of the present invention.

Figure 29A:
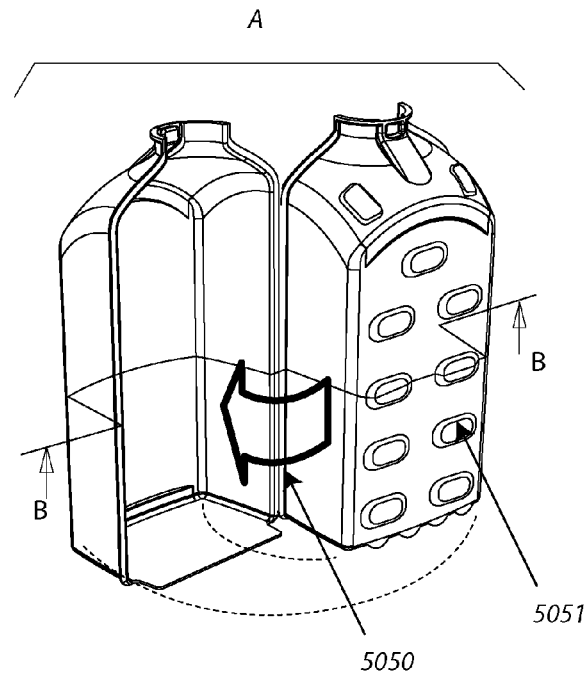
FIGS. 29A-29F detail features and assembly of a double-wall skeleton shell.
Figure 29B:
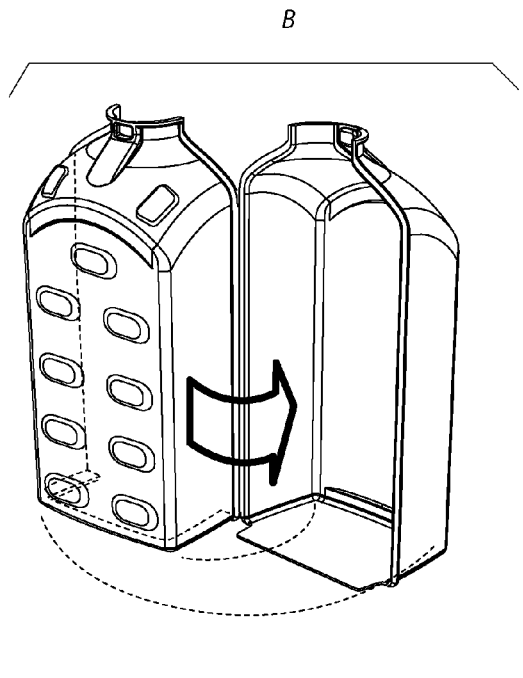
Figure 29C:
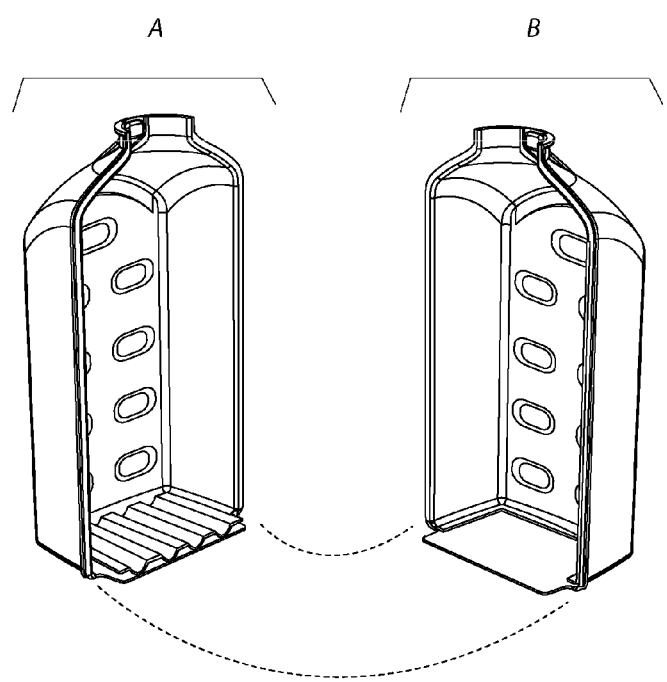
Figure 29D:
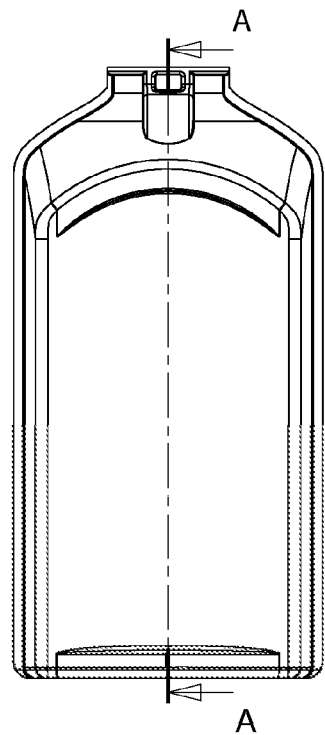
Figure 29E:
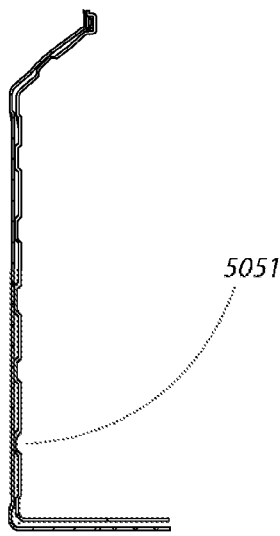
Figure 29F:
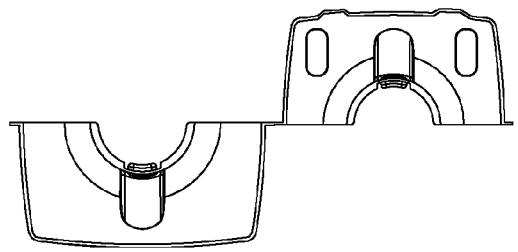

In one embodiment, shown in FIGS. 29A-29F, a double-walled skeleton shell comprising two halves may be assembled from two double-walled halves (A) and (B). Each shell half may be assembled from one hinged part into a double wall by folding along a hinge (5050) to mate the wall layers (shown). The wall layers may be of equal size. Alternatively, one of the wall layers may be local only and smaller than the other wall layer to allow for local reinforcing. The shell halves may also be assembled from two independent nested parts (not shown). One or both of the wall layers may comprise connecting features, such as one or more kiss off areas (5051) where the wall layers touch. The wall layers may or may not touch between said kiss off areas. The kiss off areas (5051) may be points where gluing, fitted connection or other attachment means can be used. The two double-walled shell halves (A) and (B) may be assembled as shown in FIG. 29C.

A skeleton shell may be formed from two, three or more types of pulp molded parts. A skeleton shell made of multiple parts may comprise parts formed from any suitable skeleton shell materials described elsewhere herein. The shell parts may or may not be made of the same material. Further, in embodiments featuring one or more wall inserts, the wall layers may or may not be made of the same material. For example, a skeleton shell may comprise a less-detailed Type 2 wet mold part and a more detailed Type 3 thermo formed part. The shell parts can be selected according to different properties, such as for example a higher moisture barrier in parts that form the base of a container, different colors of pulp joined together etc. Materials may be combined for the purpose of cost reduction (for example, substituting a less expensive Type 2 part), increasing structural performance (for example, selecting a Type 2 part with a heavier wall), increasing impact attenuation, and for providing areas of higher tolerance (for example, created by Type 3 thermo formed parts) as well as areas of lower tolerance (for example, created by Type 2 parts) in the same container such that, for example, the high tolerance areas may be specifically located for interlock and/or registration to other components.

In some embodiments of the invention, the skeleton comprises a fiber or pulp-molded body. The fiber and pulp-molded body can be a hollow shell, a clam shell, a two-piece shell, a multi-piece shell, or a combination thereof. The hollow shell can be a one-piece fiber or pulp molded body where a liquid-holding vessel is placed on the interior of the hollow shell through an opening of the hollow shell. The clam shell can be a fiber or pulp-molded body with a hinge that is folded around a liquid-holding vessel. The hinge can be located on any side of the clam shell. For example, the hinge can be along a bottom edge or side edge of the skeleton. As another example, the clam shell can be formed from two halves without a hinge, with separate shells coming together. The clam shell and/or the liquid-holding vessel can have flanges and/or interlocks for securing the clam shell to or around the liquid-holding vessel. The two-piece shell can comprise two fiber or pulp-molded body pieces that can enclose a liquid-holding vessel. The two pieces can have interlocks or flanges for securing the pieces to each other. The two-piece shell can be a two-part assembly of two cup-like parts that are assembled to one another with their open ends facing one another that can enclose a liquid-holding vessel. A multi-piece shell can comprise a fiber or pulp-molded body piece with a hinge or a two-piece fiber or pulp-molded body combined with a belly band and/or an end cap for securing the multi-piece shell in a closed form around a liquid-holding vessel. Pieces of the skeleton can be held in place by an adhesive, a label, a mechanical deformation, or any other means known to those skilled in the arts.

The skeleton can be shaped for incorporation of functional features. In some embodiments of the invention, the skeleton can comprise openings or cut-outs. The openings or cut-outs can be located on any side or surface of the skeleton. The openings or cut-outs can provide multiple functions. These functions can include reducing the amount of material used to form the skeleton, reducing the weight of the skeleton, allowing for viewing of the contents of the container, allowing for the positioning of stiffening rib features, retaining an interlock feature from another piece of the skeleton, providing features for enhancing the ability to grasp the skeleton, providing features for separation from the liquid-holding vessel, and increasing the ability to collapse or compress the skeleton. The openings or cut-outs can be formed during molding of the skeleton, or can be die-cut or water-cut after molding of the skeleton.

Figure 12:
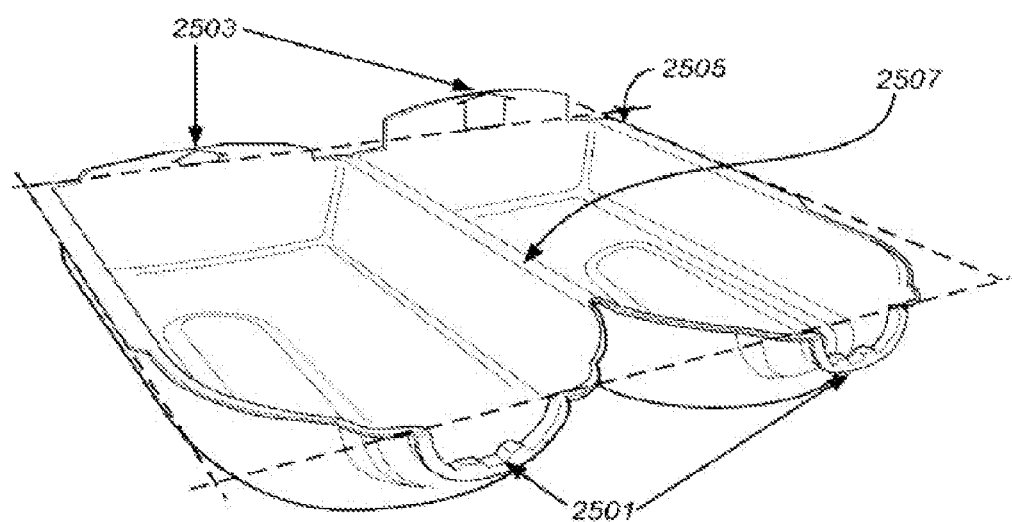
FIG. 12 shows a pulp molded shell with features that project above and below the parting line, in accordance with an embodiment of the invention.

The skeleton, which can be pulp molded, can have features that extend below or above a tool parting line, as shown in FIG. 12. The parting line is shown as the dashed line in FIG. 12 and arrow 2505 points toward one of the dashed lines. The four dashed lines indicate a parting line plane. The parting line indicates roughly where two sides of the skeleton meet once the skeleton is in a closed position. A horizontal parting line flange, typical of the pulp molding process, can be seen running around the perimeter of the part plane except around the edges at 2503. In comparison, arrows (2503) point toward an edge of the skeleton that does not have a parting line flange. Instead, the skeleton extends vertically beyond the parting line. Although FIG. 12 shows a skeleton having a bottom edge without a parting line flange, any edge can be designed without a parting line flange. The absence of a parting line flange can allow for a flat surface to be formed when that edge is joined to another edge of the skeleton that also does not have a parting line flange. As described and shown later herein, the flat surface can allow for a container to sit stably on a flat surface. The innovative flat bottom can offer a more resilient bottle that can better survive use and abuse of being picked up and deposited onto a surface. The current art would still require a flange but would have local low draft regions or no draft regions where touch down points can be extended to the corners of the base. These touch down points, however, are only localized and will be more easily point-loaded and damaged, resulting in the bottle sitting off from the vertical. The generally flat bottoms of bottles of embodiments of the invention have a more uniform under surface that better distributes force loads and is absent of local features that can be damaged. Bottles of embodiments thus provided more inherent stability. As shown in FIG. 12, the containers described herein can have a bending part or seam (2507) that allows for pulp molded or any other container to be folded into a closed configuration.

Figure 13:
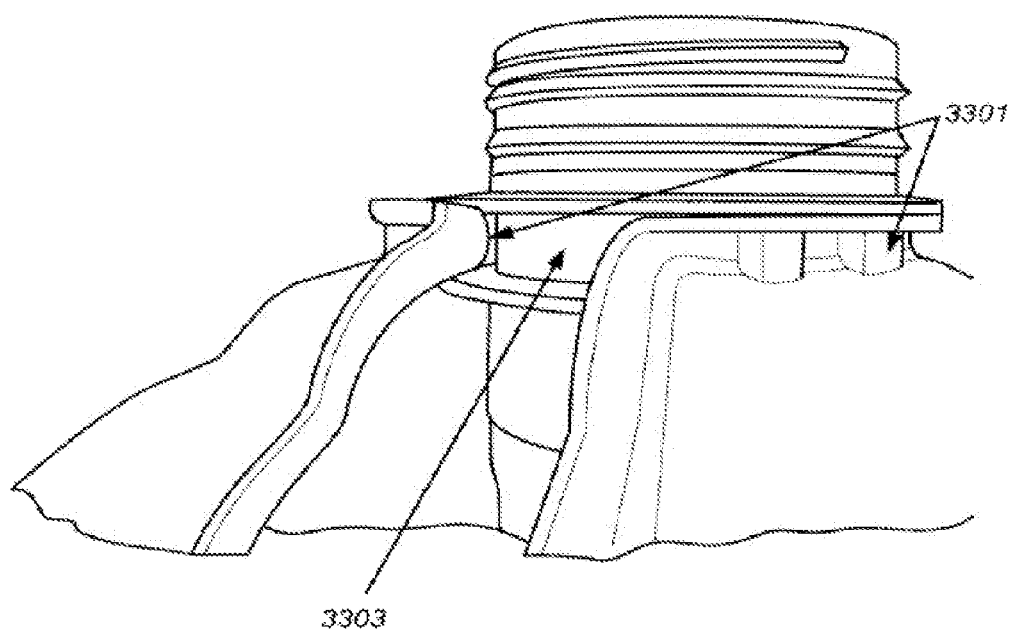
FIG. 13 shows a shell with protrusions or indentations to provide rigidity to the shell and facilitate friction fitting to a fitment, in accordance with an embodiment of the invention.

In some embodiments, features may project below the parting line, e.g., the features near the top of the skeleton (2501). As shown in FIG. 13, the features in the skeleton may be complementary to features on the fitment (3303), and can be used to integrate the skeleton and the fitment. The shaped portions of the skeleton can be complementary to the shape of a fitment that is to be mated to the skeleton. Grooves and/or ridges in the fitment may align with grooves and/or ridges in the skeleton. The features are not limited to grooves or ridges, and may also include, divots, dimples, rectangular shapes, annular flanges with ribs and/or a series of ribs that key into the fitment. The complementary features can reduce rotation of the fitment relative to the skeleton. The features on the skeleton and/or fitment, such as dimples and divots, can increase adherence of glue or other adhesives that may be used to secure the fitment to the skeleton. The features can be designed to mate with a fitment by friction, mechanical deformation, heat stakes (described herein), or any other manner known in the art. As shown in FIG. 13, the portions projecting below the part line can also have stiffening protrusions (3301) that extend along the areas that may engage with the fitment (3303). These areas may be circumferential. These protrusions can provide structural rigidity to the skeleton. Alternatively, these features can allow for holes that are designed to facilitate dismantling of the skeleton.

In other embodiments, features can extend beyond the parting line, such as those shown near the base of the skeleton (2503). The features on the skeleton, e.g., the features near the base of the skeleton (2503), may be of equal or unequal size, can be designed such that they overlap, or can be designed such that one feature inserts through a slot in the other feature. Overlapping features can allow for the two sides of the skeleton to be secured to each other without adhesives. The features can be designed such that sides of the skeleton are prevented from separating once one feature is inserted through a slot in another feature. For example, a first feature on one side of the skeleton may be shaped like an arrowhead and a second feature on another side of the skeleton can have a slot. The arrowhead shaped feature can be inserted through the slot of the second feature, where the arrowhead prevents the sides from becoming separated. Other shapes, such as hook-shapes, L-shapes, Y-shapes, and T-shapes, can be used to secure one feature to the other feature. The features can extend in the plane of the skeleton portion that they originate from, or the features can extend in a plane other than the plane of the skeleton portion that they original from. For example, features at the base of the skeleton (2503) shown in FIG. 12 can extend toward features at the top of the skeleton (2501). Angled features can allow for a variety of locking shapes to be formed, such as hooks. The features can be formed during the molding process and/or can be modified after pulp molding by folding or any other method known in the art. The feature may or may not need to be deformed to be inserted through the slot of the second feature.

Figure 14A:
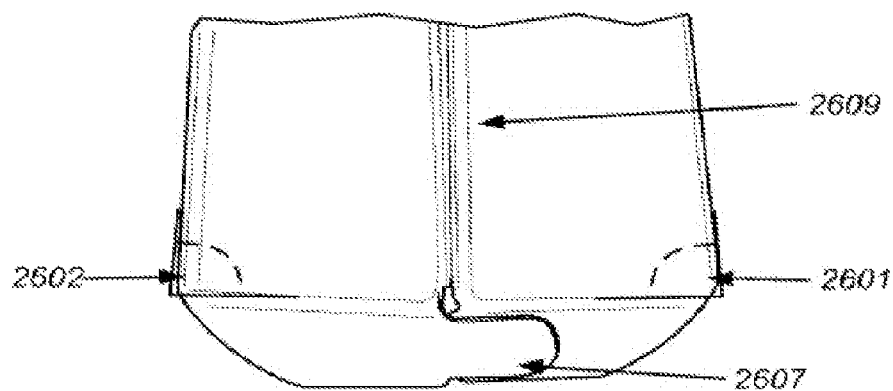
FIG. 14A shows a side view of a pulp molded shell with a flat base, in accordance with an embodiment of the invention.
Figure 14B:
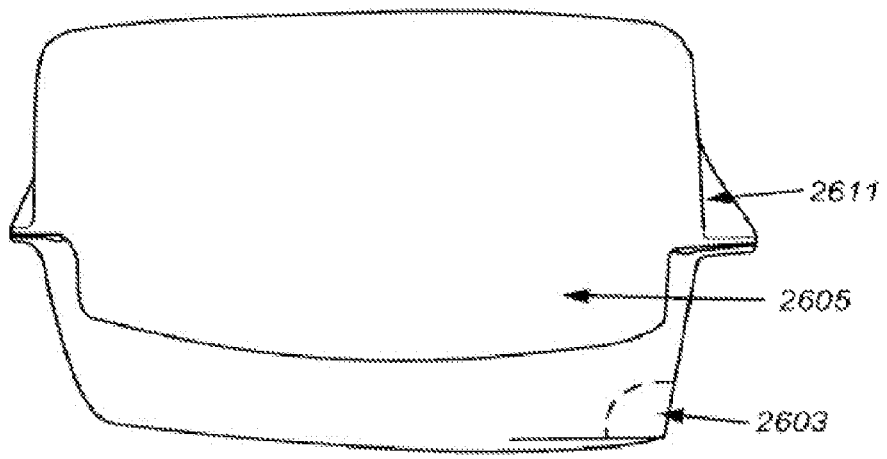
FIG. 14B shows a bottom view of a pulp molded shell with a flat base, in accordance with an embodiment of the invention.

Overlapping features can allow for a flat surface to be formed from two pulp-molded parts, pieces, or halves. For example, FIG. 14A shows a side view of the bottom part of a skeleton in a closed position and FIG. 14B shows a bottom view of a skeleton in a closed position, where the bottom surface (2607, 2605) sits flat with no parting line flange. The bottom surface may be flat or sit flat with the absence of a parting line flange. In comparison, the side surface shows an external flange (2609, 2611). In some embodiments, the flange can be formed internally, externally, or both internally and externally.

In embodiments, having overlapping bottom flanges allows for a better transfer of the internal loading between the parts of the housing at the bottom. The overlap at the bottom with the distribution of load reduces the splitting the housings apart at the seams (where parts come together) under the load. This overlap can also benefit automated assembly and the desire to reduce manufacturing costs by allowing for a large surface (overlap area) for glue to be easily added, or for the friction nature, or a purposeful mechanical engagement features at the overlap to offer sufficient engagement and requiring no gluing operation in the base.

In some embodiments, overlapping or interlocking features may provide a flangeless connection for side surfaces of the skeleton. In other embodiments, overlapping or interlocking features may provide flangeless connections for a portion or an entirety of one or more side surfaces, bottom surfaces, top surfaces or any combination thereof. The overlapping or interlocking features may provide smooth, indented or extruding (bumpy) connections between skeleton portions. The container shell can be of any material described elsewhere herein, such as a molded fiber or pulp-formed skeleton. In a preferable embodiment, smooth, flangeless skeleton side regions may facilitate application of container labels. In such configurations, the parts of a shell that enclose for example a liner with a fitment feature may be held together by one or more interconnects described herein, and may or may not be glued at the one or more points of interconnection. In some arrangements, the container label itself may serve to secure interconnects without using glue. The interconnects may be attached through mechanical means, including but not limited to lugs, flaps, hooks, arrowheads, slots or other complementary mating features on the mating shell portions. The mating features may be removably attached by friction or mechanically deformed for a more permanent connection. The mating features may further be secured through adhesives, glue, heat stakes or any other attachment means known in the art. The interconnects may be internal to the side walls or may be located on the inner and/or outer surface of the side walls. Similarly, adhesive or other attachment means may be internal and/or external to the walls. Any description of side walls herein may also be applied to top, bottom or any other region of the container.

Figure 25A:
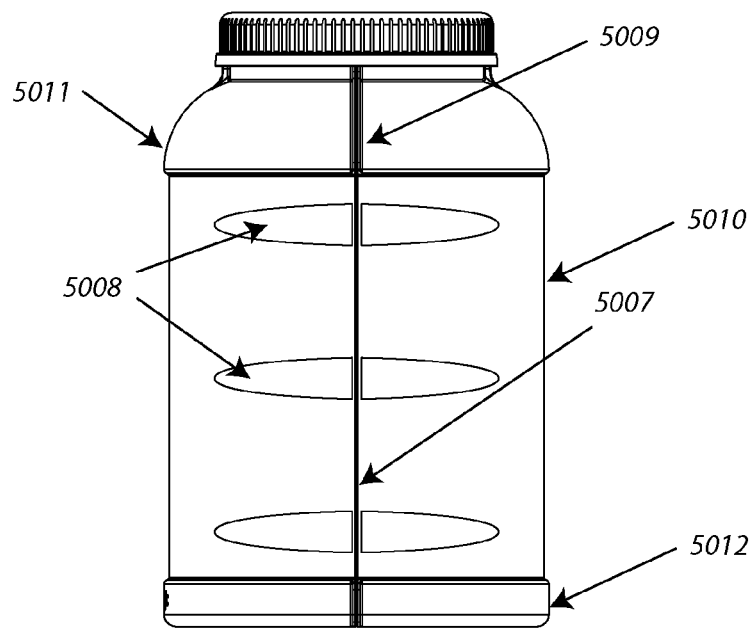
FIG. 25A is a front view of a seamless side connection on a container with a clamshell-type skeleton.

FIG. 25A shows a configuration with container side walls interconnected through one or more gluing lug features (5008) along a parting line (5007). The lug features (5008) may be internal to the skeleton walls, creating a smooth outside skeleton surface and no flanges or other extruding features along the parting line (5007). The shells enclosing the inside of the container may or may not be joined seamlessly along the full height of the container. For example, the container in FIG. 25A may have a region (5010) with a seamless side parting line (5007) combined with a flanged top region (5011) and/or a flanged bottom region (5012) with flanged seams (5009). Combinations of flanged and smooth regions may include any or all of a top flange region, a bottom flanged region, a central flanged region, a top seamless region, a central seamless region and a bottom seamless region. For example, in a cylindrical shell configuration, a smooth side region may preferably be located in a constant area section of the skeleton and flanged regions may or may not constitute variable area sections of the skeleton. Further, non-seamless regions not involving a flange may be used interchangeably with the flanged regions described above. One or more seamless and one or more non-seamless regions may be of varying geometry with respect to each other. For example, in a cylindrical configuration, a container may include flanged regions (5011), (5012) with a larger diameter than a seamless region (5010), and vice versa. In another example, the flanged regions may be of different diameters or flange configurations.

Figure 25B:
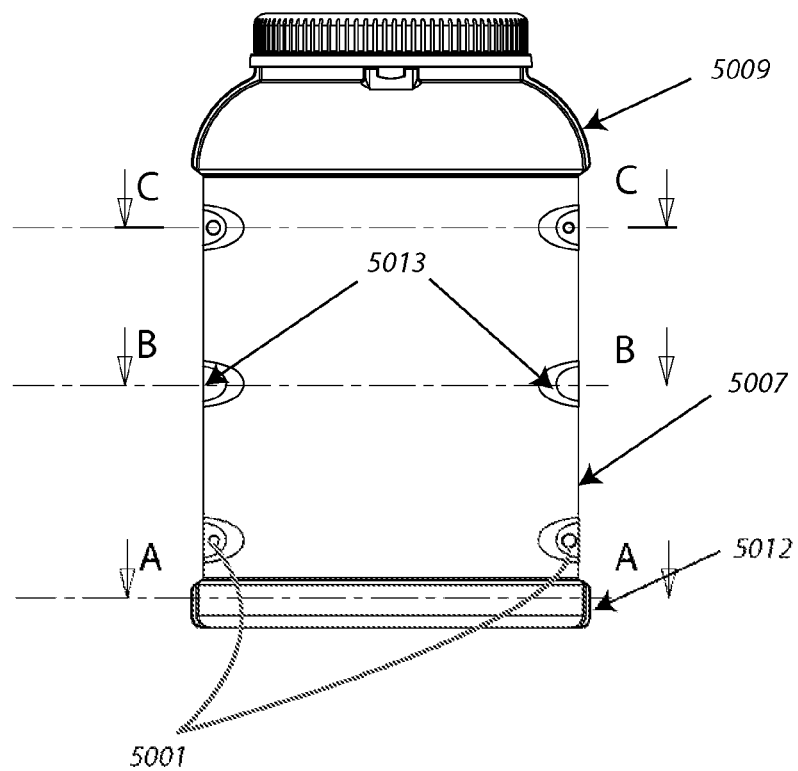
FIG. 25B is a side view of mating features on the container with seamless skeleton side walls shown in FIG. 25A.
Figure 25C:
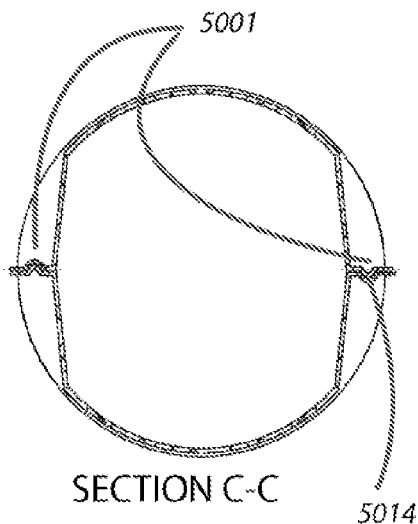
FIGS. 25C-25E detail internal lug registration features connecting the side walls of a skeleton in accordance with cross-section views indicated in FIG. 25B.
Figure 25D:
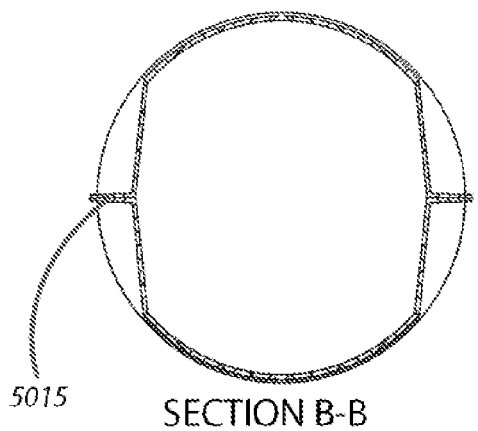
Figure 25E:
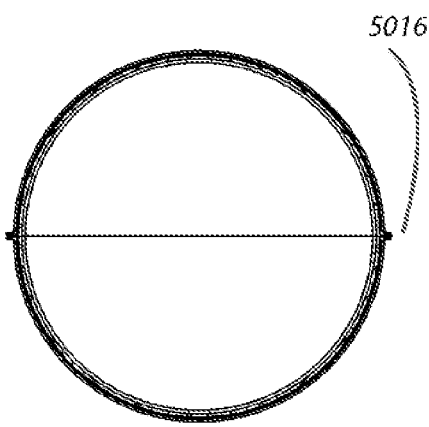

FIG. 25B shows a side view of a seamless interconnect configuration with gluing central lug features (5013) and top/bottom lug features (5001). These lug features may appear as identical lug features (5008) in the front view in FIG. 25A. Cross-sections along planes of the lug features perpendicular to the vertical axis of the container are shown in FIGS. 25C-25E. The lug features (5001) may involve registration dimples or other mating features that may alternate as protrusions and recessed features, allowing for a unique joint of complementary lugs on the sides being connected. For example, these internal registration features may allow for two halves of a container shell to be exactly the same geometry. Further, the registration dimples or other features may or may not have one or more glue areas (5014). The dimple may aid with efficient and rapid registration between the shell parts during manual or automated assembly. The dimple may be fashioned with locking features that make a connection between the shell parts. The dimple features may be increased in size and engagement depth to further improve the integrity and strength of the assembled bottle. In another configuration, shown in FIG. 25D, lug features may involve flat glue areas between halves (5015). These and other types of glue or glue-less registration features or areas may be combined in arbitrary configurations. In a configuration with one or more non-seamless regions above, below or in between one or more seamless side regions, flanges (5016), such as shown in the cross-section view in FIG. 25E, may be used for connecting side walls in the non-seamless regions.

Figure 26A:
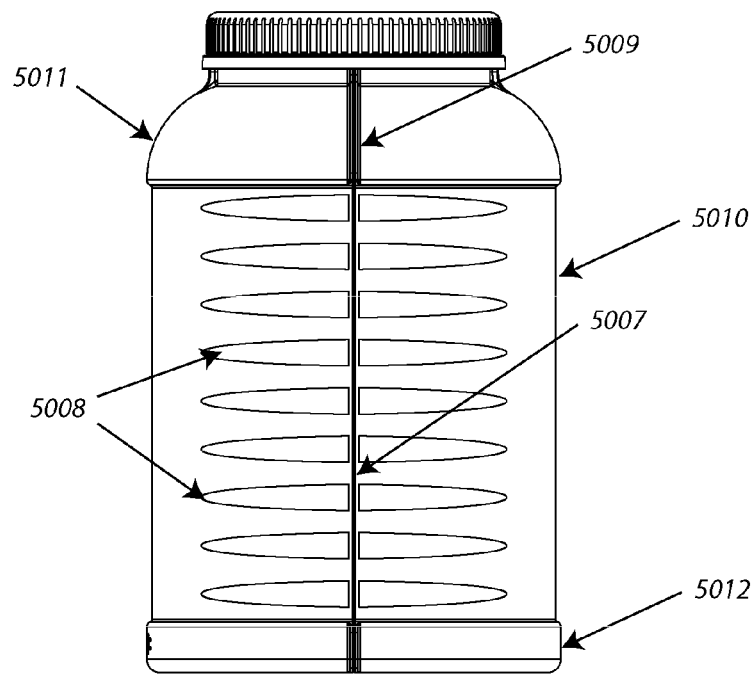
FIG. 26A is a front view of a seamless side connection on a container with a clamshell-type skeleton with a higher frequency of mating features compared to FIG. 25A.
Figure 26B:
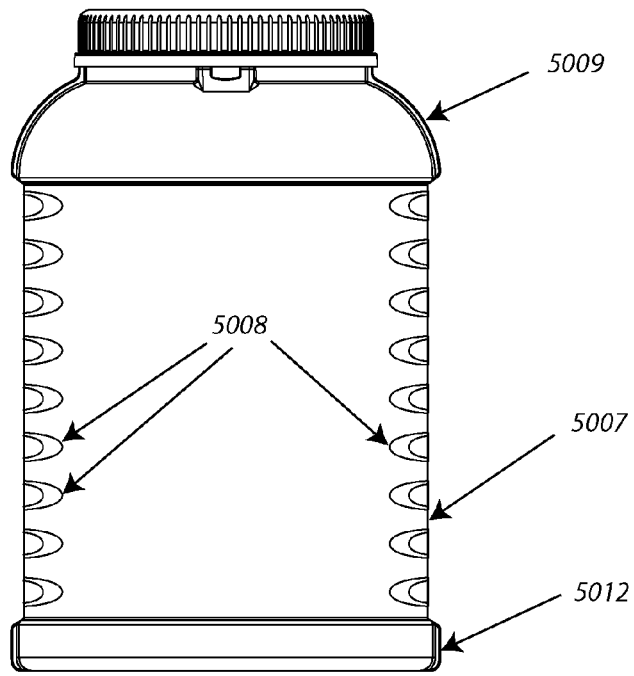
FIG. 26B is a side view of mating features on the container with seamless skeleton side walls shown in FIG. 26A.

FIG. 26A and FIG. 26B show front and side views, respectively, of a container with a skeleton comprising a higher frequency of lug features (5008). One or more sections of a skeleton side wall may be joined using any number and/or type of mating features. For example, one seamless side wall connection may be configured with three lug features as shown in FIG. 25A and another seamless side wall connection may be configured according to FIG. 26A. In an embodiment using a clamshell-type skeleton, a seamless connection may be employed along the open edges of the clamshell. Further, a seamless side connection may be made bendable to provide a hinged side connection forming the closed side of a clamshell. Glue, adhesives or other attachment means may be employed to create a stronger connection.

Figure 27A:
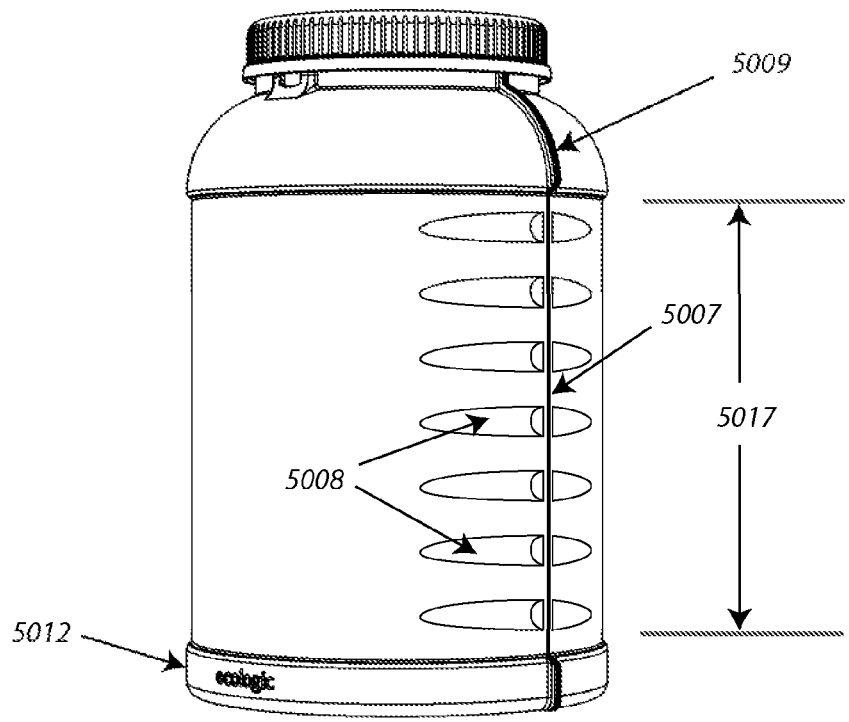
FIG. 27A is a front perspective view of a closed container shell a label region with smooth side walls and upper and lower flanged side connection regions.
Figure 27B:
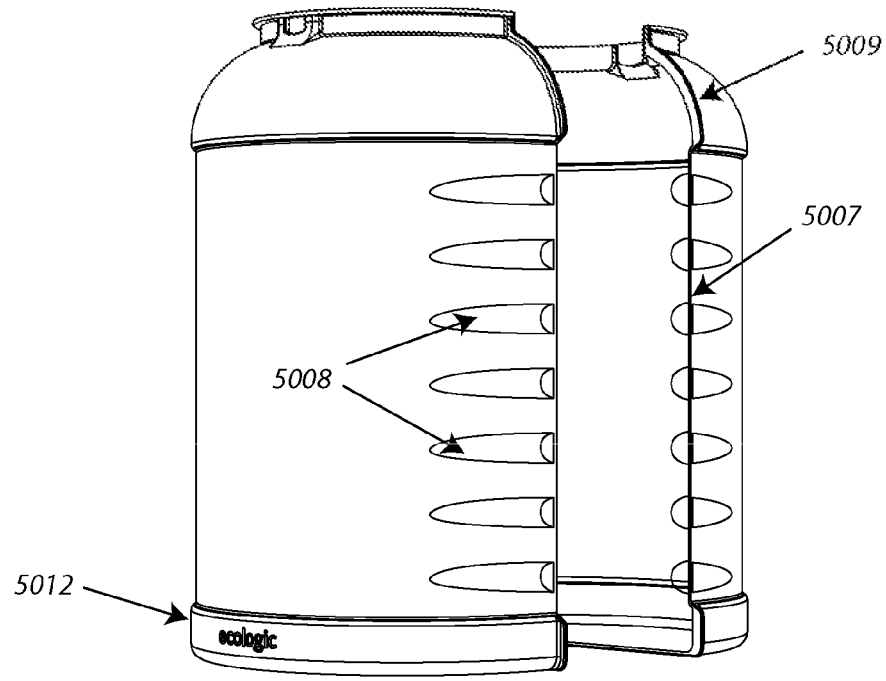
FIG. 27B is a front perspective view of the container shell in FIG. 27A with mating features forming a smooth side wall not engaged.

FIG. 27A shows a front perspective view of a container with a smooth side wall connection region (5017), which may be used a zone for placing a container label. Flanges may or may not exist above and/or below the label zone (5017). FIG. 27B shows the container with the side wall connection not engaged, with lug features (5008) exposed along both sides of the parting line (5007). The skeleton side connections may be configured to have releasable interconnects such that the container can be opened and released repeatedly. The skeleton side connections may also be configured to be permanently attached along one or more side parting lines. The lug features may be internal to the side walls, and may protrude toward the inside of the skeleton cavity in order to accommodate additional registration features. Mating features may also be entirely accommodated within the thickness of the side wall. Any description of mating lugs herein may also be applied to any other type of mating feature including but not limited to nubs, latches, arrowhead features, slots and other complementary interlock features.

Figure 30A:
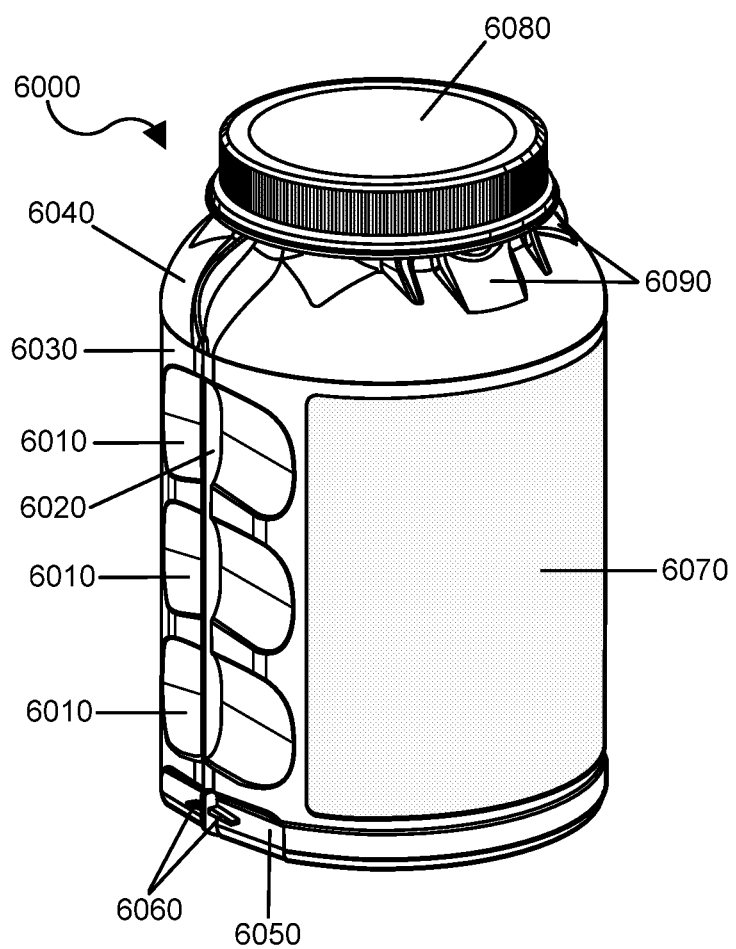
FIGS. 30A-30I shows an example of a container with scalloped features.

FIG. 30A shows another example of a container (6000) with lug features, which may also be referred to as scallops (6010). One or more flange (6020) may be present on the container. The flange may be capable of accepting a glue or other adhesive. The flange may provide a set of surfaces that may be adhered together. The flange may permit portions of the container to come together and be held together. The flange may be a parting line flange. In some instances, the flange may protrude from the scalloped portion of the container, but need not protrude from a seamless (6030) portion of the container. The flange may or may not protrude from an upper portion (6040) of the container.

In some instances, the flange may or may not protrude from a lower portion (6050) of the container. The lower portion may be indented like a scallop or shelf. In some embodiments, one or more protruding features (6060) may be provided on the lower portion of the container.

One or more label (6070) may be provided on the container. The label may completely or partially surround the container. The label may assist with keeping the container closed portions of the container together. In some instances, the label may form a smooth surface on the container. The label may be able to go over or cover one or more feature, such as a scallop or flange. In some instances, a flange does not extend beyond a scallop, so that a label may be applied over such features in a smooth fashion.

The container may have a cap (6080). The cap may be screwed on, twisted on, snap fit, lock-and-groove, or have any other feature. The cap may interface with an upper portion (6040) of the container. The upper portion of the container may have one or more protruding or shaped feature (6090). The features on the upper portion of the container may permit a fitment within the container to interlock with the protruding features and prevent internal rotation of the fitment. The features may also prevent the fitment from moving in a vertical or axial direction.

Figure 30B:
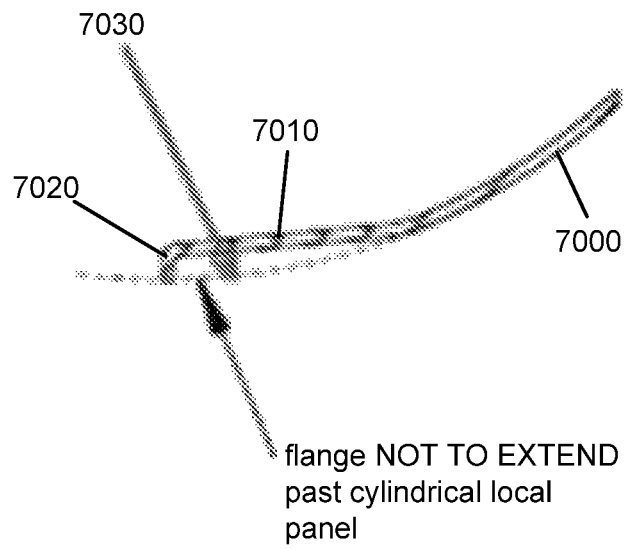

FIG. 30B provides a cross-sectional view of a portion of the container. FIG. 30B shows a wall of the container (7000). The wall may be straight or curved. One or more scalloped feature (7010) may be provided. The scalloped feature may be indented compared to the rest of the wall. The thickness of the scalloped feature may or may not be the same as the rest of the wall. One or more flange (7020) may be provided. The flange may protrude relative to the scalloped feature. In some instances, the flange and scalloped feature may be formed of a single integral piece. The flange may be a molded feature or fold relative to the scalloped feature and/or the rest of the container wall. The flange and/or scalloped feature may be thermoformed or molded.

A dotted line (7030) may be provided illustrating a surface where a label may be applied. The label may be applied in a smooth manner. The label may be provided over a scalloped feature and/or the flange. In some instances, the flange does not extend past the cylindrical label panel.

Figure 30C:
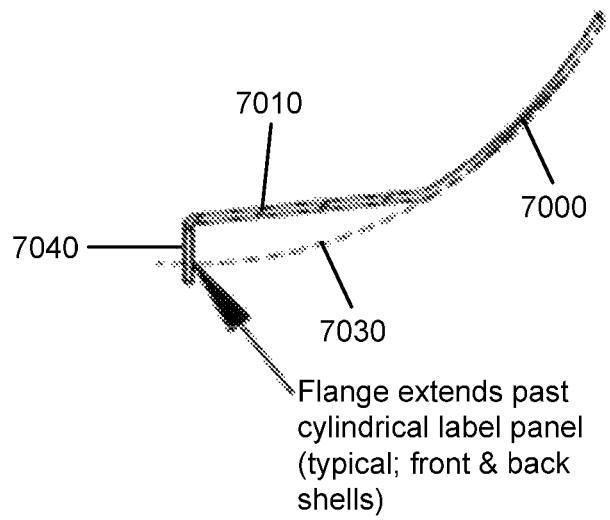

FIG. 30C provides another example of a cross-sectional view of a portion of a container. In some embodiments, the flange (7040) may extend beyond the cylindrical label part, or a surface that would be representative of a label portion. The flange may extend beyond where the surface of the container would be if there were no scallop. A label may or may not cover the flange.

Figure 30D:
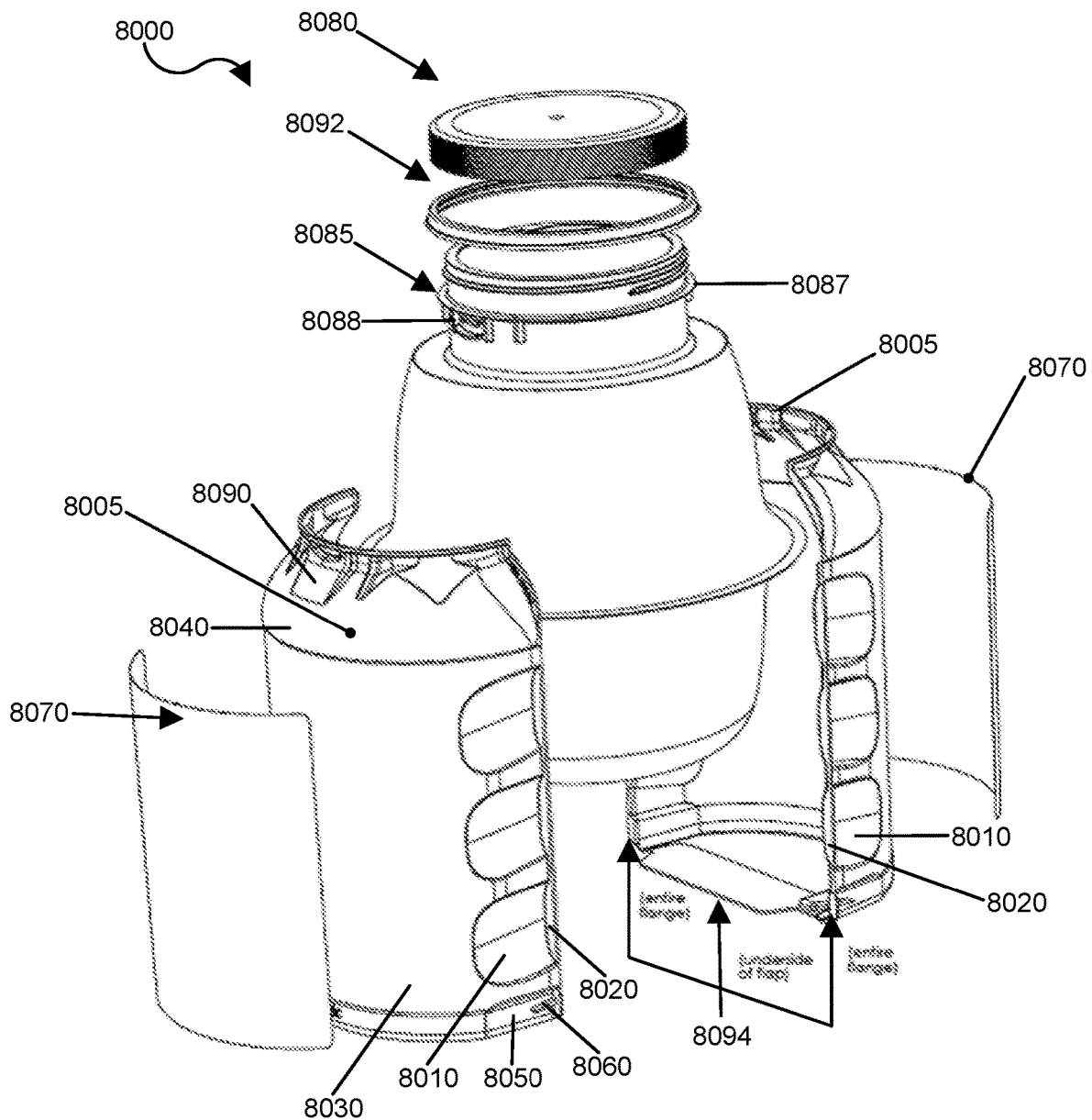

FIG. 30D shows an example of an exploded view of the container (8000). The container may include a shell (8005). The shell may include one or more scalloped features (8010) and one or more flange (8020). The shell may have a seamless portion. In some instances no flanges may extend from the seamless portion. The seamless portion may be a flangeless portion. The seamless portion may include a curved surface where flangeless walls may butt together. Alternatively, one or more flat surface or facets may be provided. The shell may be formed from two shell portions. Alternatively, any number of shell portions may be provided. The shell portions may be connected to one another at the flanges. One or more adhesive may be provided at the flanges that may hold the shell portions together. A shell may have an upper portion (8040) and a lower portion (8050). Optionally, one or more protruding features (8060) may be provided at a lower portion of the container.

The container may also have one or more label (8070) provided thereon. The label(s) may or may not cover a scalloped feature and/or a flange. If the labels do cover the scalloped feature and/or the flange, the label may form a continuous, uninterrupted surface. The label may form a smooth surface without being bent or protruding due to the scalloped features and/or flanges. The labels may completely surround the container circumference, or may cover a portion of the circumference.

One or more cap (8080) may be provided. The cap may come into contact with a fitment (8085). For example, the cap may screw onto a fitment. The cap may be twisted on, snap fit, locked, or attached to the fitment in any manner. The fitment may be connected to a bag or other internal container. The internal container may be formed from a polymer, or any other material described elsewhere herein. The shell may be formed from molded fiber or pulp, or any other material described elsewhere herein. The internal container may be flexible, semi-rigid, or rigid. The fitment may be welded onto the internal container. The fitment may form a single integral piece with the internal container. The fitment may include one or more flange (8087) which may mate with one or more flange-receiving region of the shell. The fitment may include one or more interlock features (8088) that may interact with one or more protruding portion (8090) of the shell. The interlock features and the protruding portion may prevent the fitment and/or internal container from rotating relative to the shell. The interlock features and/or fitment flange may prevent the fitment and/or internal container from moving axially relative to the shell.

In some embodiments, a retaining collar (8092) may be used. The retaining collar may optionally fit over and/or around an upper portion of the shell. The retaining collar may encircle a lip of the shell. The retaining collar may assist with keeping the shells together and/or keeping the fitment mated with the shell.

In some instances, the container may have a flat bottom. The flat bottom may enable the container to stand upright without assistance. The bottom of the container may include one or more overlap (8094). In some instances, the shell may include two or more shell portions. In some instances, only one of the two or more shell portions may have an overlap. In other instances, two or more of the two or more shell portions may have an overlap. All, or fewer than all of the shell portions may have an overlap. The overlap from a shell portion may extend to cover at least a portion of the bottom surface of another shell portion. The overlap may cover the portion on the outer surface or inner surface of the other shell portion.

Figure 30E:
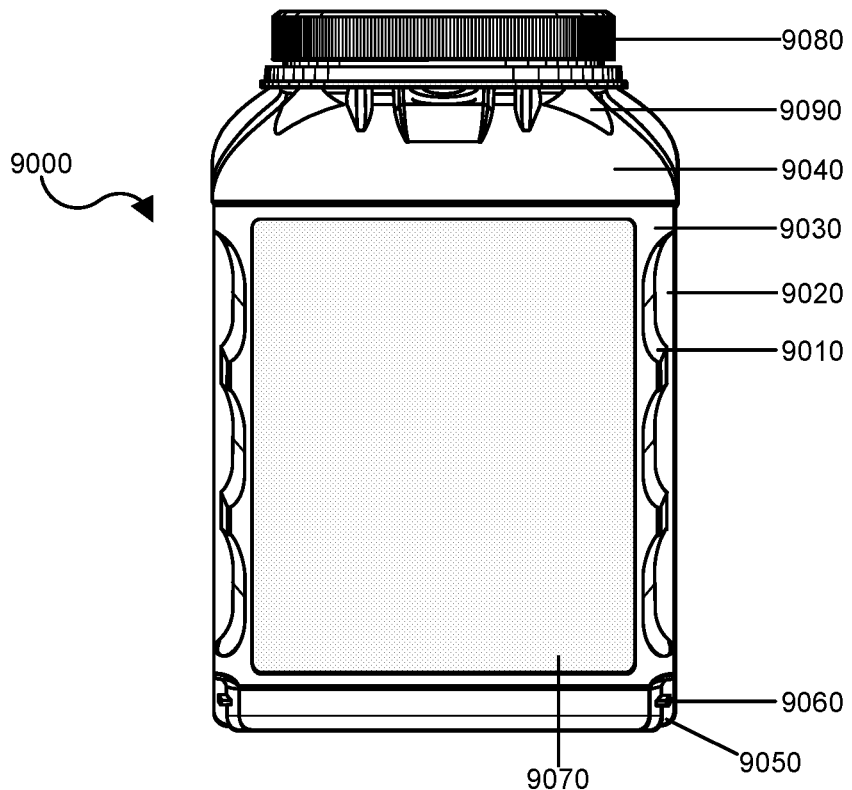

FIG. 30E shows an example of a side view of the container (9000). The container may include one or more scalloped feature (9010). For example, one, two, three, four, five, six or more scalloped feature may run along a side of the container. In some instances, a shell portion may include scalloped features at or near one edge, or at or near two edges of the shell portion. A flange (9020) may run along the edge of the shell portion. The shell portion may protrude beyond the scalloped portion. The flange may or may not protrude beyond a seamless (or flangeless) (9030) portion of the shell. The container may have an upper portion (9040) and a lower (9050) portion. One or more protruding features (9060) may be provided on the lower portion. One or more protruding features (9090) may be provided on the upper feature. The protruding features may be capable of mating with one or more fitment features. The protruding features may form an interlock that prevents the fitment from moving relative to the shell in one, two or more directions. The interlock can transmit applied forces to the fitment onto the shell.

The container may also include one or more label (9070). The labels may or may not cover scalloped and/or flanged portions. The container may also include a closure, such as a cap (9080). The cap may be closed over a fitment. The fitment may be separate from the shell.

Figure 30F:
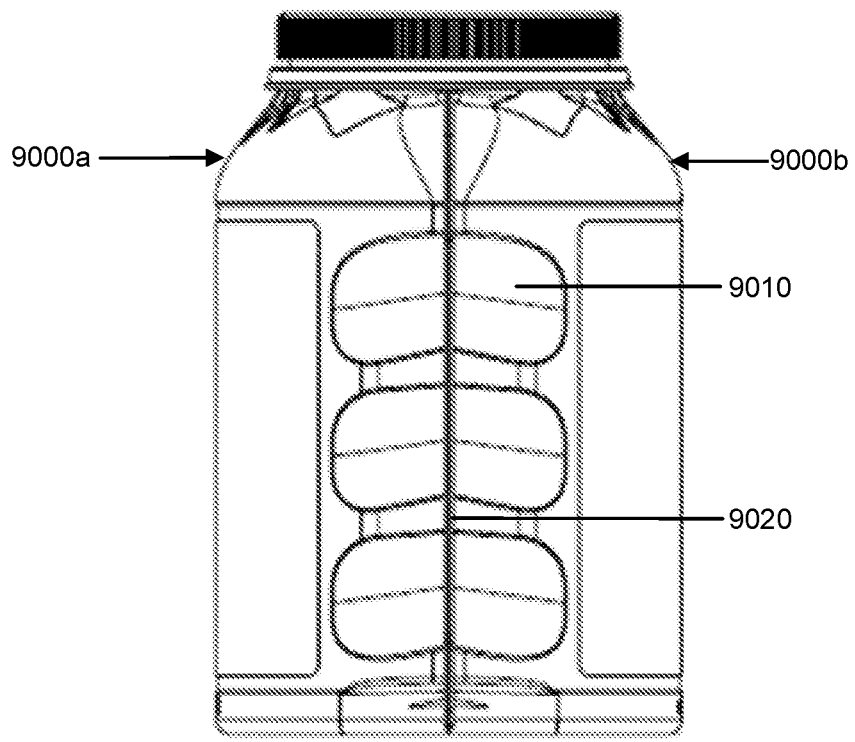

FIG. 30F shows another side view of the container. The container may include a shell, which may have one, two or more shell portions (9000*a*, 9000*b*). The shell portions may meet at edges. The edges may include one or more flange (9020). The flange may provide a surface to which an adhesive may be applied. The adhesive may permit the shell portions to be held together.

The shell portions may include one or more scalloped features (9010) or indentations. The scalloped features on either side of the flange (e.g., on different shell portions) may or may not line up. For example, three scalloped features may be provided from each shell portion, and may be aligned to one another.

Figure 30G:
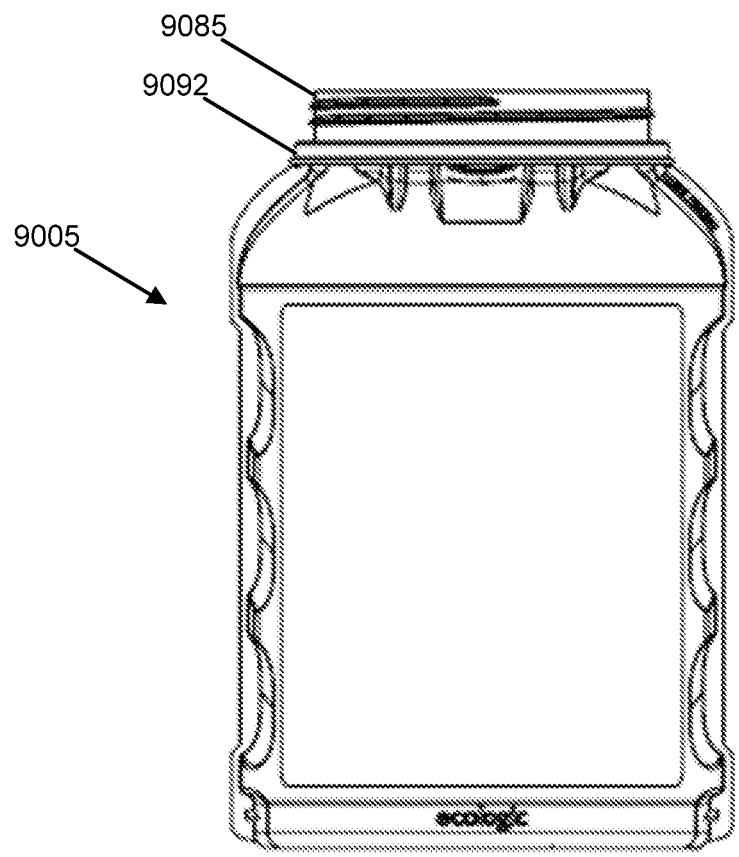

FIG. 30G provides an example of a side view of a container without the cap. The fitment (9085) may be formed from a separate material as the shell of the container (9005). The fitment may be formed from a polymer. The fitment may be separable relative to the shell. The fitment may include one or more threaded features configured to mate with the cap. The fitment may include one or more features that may mate with complementary features of the shell. A retaining collar (9092) may optionally be provided. The retaining feature may go over a portion of the shell. The retaining collar may keep the shell mated with the fitment. The retaining collar may assist with keeping the shell portions together.

Figure 30H:
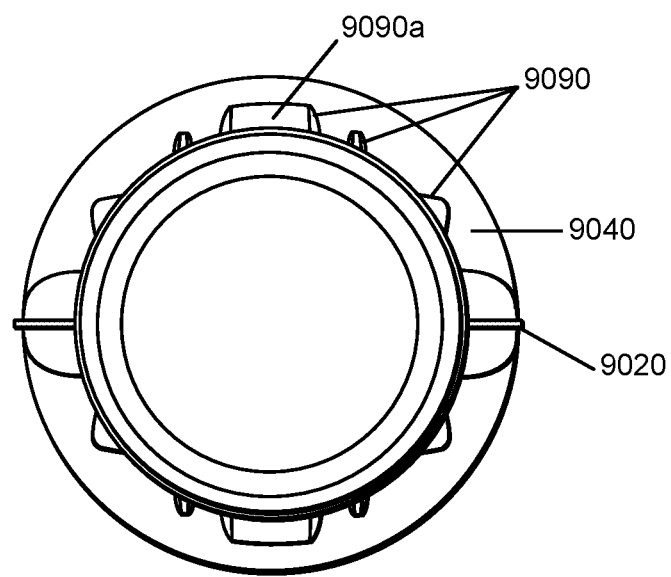

FIG. 30H provides a top view of the container. One or more protruding portions (9090) may be provided on an upper surface (9040) of the container. Any description of protruding portions may also apply to grooves, indentations, channels, bumps, dimples, or any other surface features. Any description of protruding portions may apply to any deviation in the surface from a smooth surface. Some protruding portions (9090*a*) may be sized and/or configured to mate with one or more features of the fitment. For example, the fitment may have an interlock feature that may have a complementary shape to the inner surface of the protruding portion. The protruding features may make any pattern around the circumference of the container. In some instances, the protruding features may be symmetrical about a plane defined by the flange (9020).

Figure 30I:
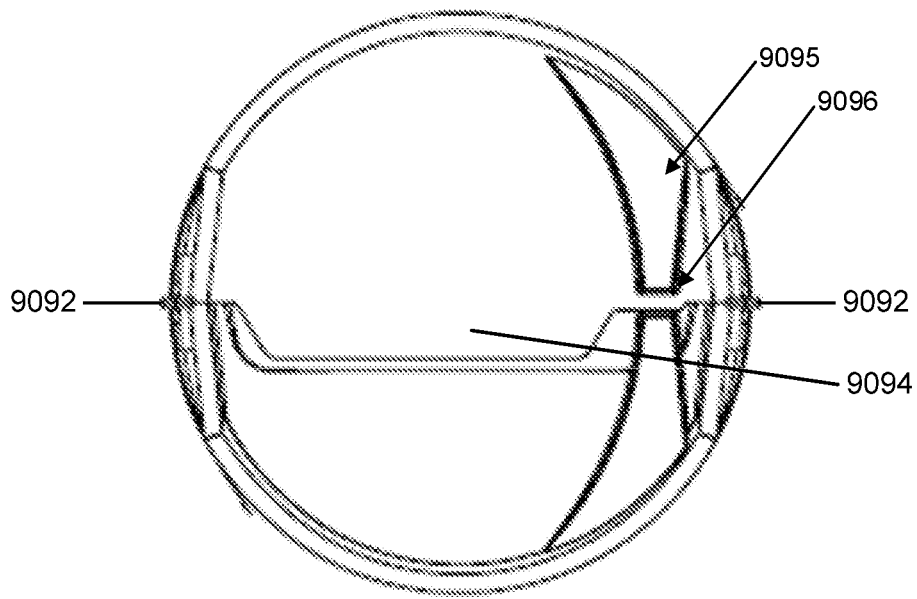

FIG. 30I shows an example of a bottom surface of the container. The bottom surface of the container may be flat. The container may include a shell having two or more shell portions. In some instances, one, two or more shell portions may have an overlap (9094) that overlies another shell portion. The overlap may provide structure support and/or strength to the bottom of the container while retaining a flat bottom. The overlap may extend beyond a plane defined by the flanges (9092) of the shell portions. One overlap may be offset to accommodate the other and still allow a flat bottom. The overlaps can receive adhesive to further improve the strength of the overlap.

In some embodiments, a bottom surface may include a recessed surface (9095). One or more wall (9096) may be formed about the recessed surface. Such features may allow for rotation indexing of the container. Thus the orientation (e.g., front/back) of the container may be determined.

Figure 31A:
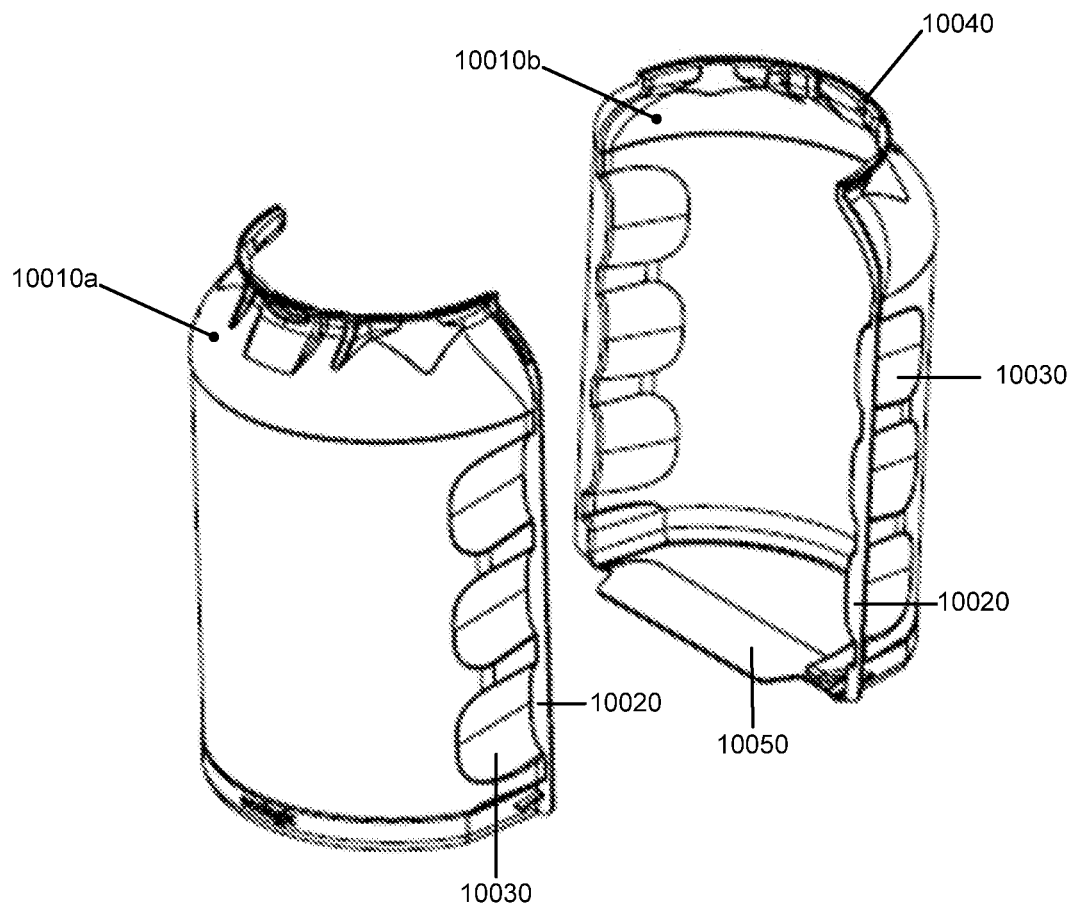
FIG. 31A-31C shows an example of a shell portions for a container having scalloped features.

FIG. 31A shows an example of shell portions that may come together to form a shell. For example, a first shell portion (10010*a*) and a second shell portion (10010*b*) may be provided to form a shell. Any number of shell portions may be provided. Each shell portion may have an outer surface and an inner surface. The shell portions may have a flange (10020) along the edge of the shell portion. The flange may provide an area to which adhesive may be applied. The shell portions may come together to form the shell at the flange. The flange may include portions that form a greater surface area than the thickness of the shell portions.

The shell portions may include one or more scalloped features (10030). The scalloped features may provide indentations relative to an outer surface of a shell portion. The scalloped features may protrude relative to an inner surface of the shell portion. The scalloped features may be provided near the side flanges.

The shell portions may include one or more neck interlock features (10040). The neck interlock features may be shaped to complement the shape of one or more fitment feature. The neck interlock feature may include protruding or indented features. The neck interlock features may create deviations from a smooth surface of the shell. The neck interlock features may cause the inner surface of the shell neck to have one or more grooves, channels or protrusions. The neck interlock features may prevent a fitment from rotating and/or moving axially when the fitment is mated with the shell.

The shell portions may include an overlapping feature (10050). The overlapping feature may be on a bottom surface of the shell. The overlapping feature of a second shell may overlap at least a portion of the first shell. The overlapping feature may overlap the portion of the first shell on an inner surface or an outer surface of the first shell. The first shell may or may not have an overlapping feature. The overlapping feature may extend beyond a plane defined by the flanges (10020). The overlapping feature may deviate from the plane defined by the flanges.

Figure 31B:
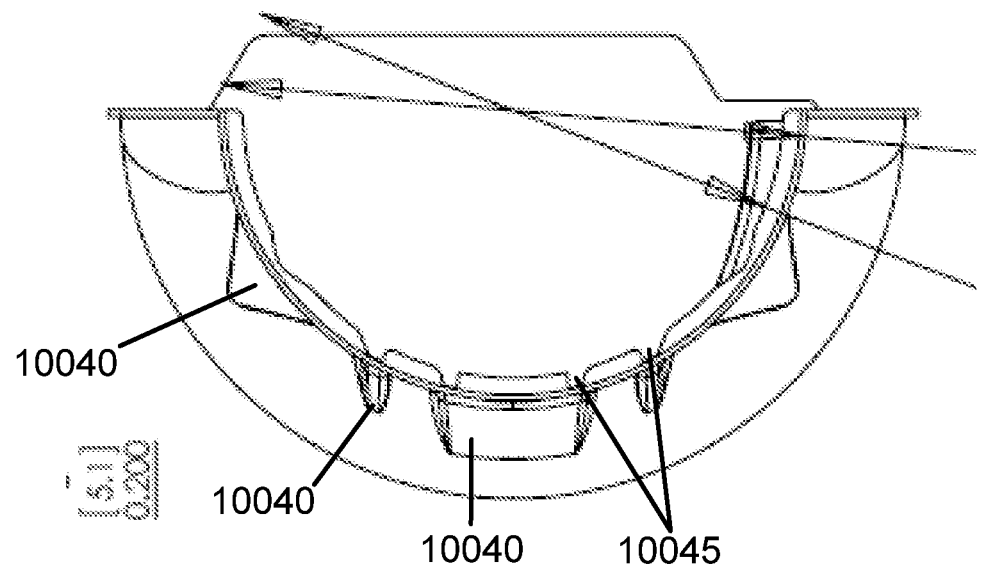

FIG. 31B provides a top view of a shell portion. The neck interlock features (10040) are shown, which may include one or more protrusion or indentation. The neck interlock features of the shell may be configured to receive a feature from a fitment. For example, an inner surface of the neck may have one or more groove (10045) that may receive a flange or protrusion from the fitment. The groove may have any orientation. For example, the groove may have a vertical or horizontal orientation. The groove may have an axial orientation relative to the container and/or a circumferential orientation. In some instances, multiple grooves may be provided which may have any combination of orientations.

Figure 31C:
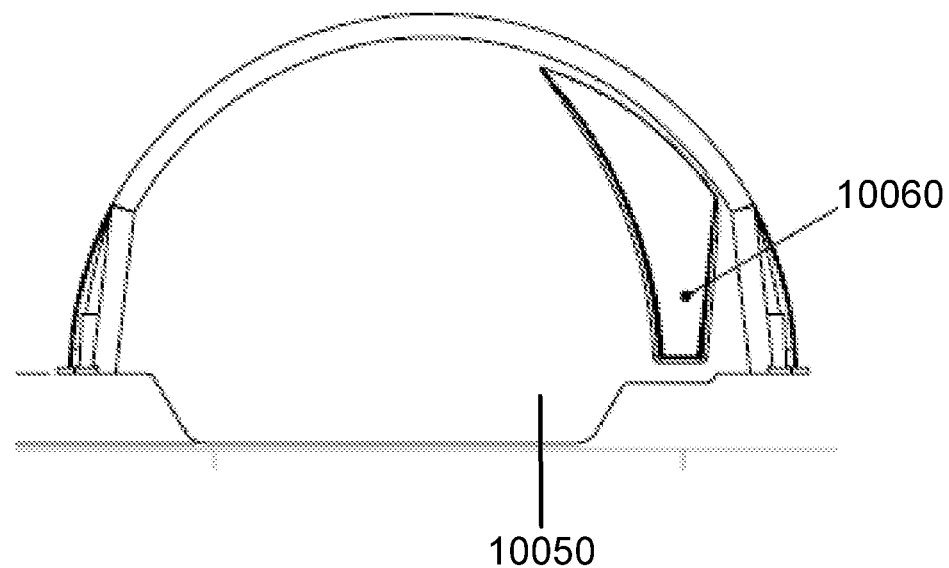

FIG. 31C shows a bottom view of a shell portion. An overlapping feature (10050) may be provided. The overlapping feature may have any shape. In some instances, the overlapping feature may have a length greater than or equal to 0.25, 0.3, 0.4, 0.45, 0.5, 0.6, 0.7, 0.8, or 0.9 of the diameter of the container.

A bottom may also include a recessed portion (10060). One or more wall portion may surround the recessed portion. The recessed portion may be indented in toward an inner surface of the shell portion. The recessed portion may have a sloping surface that may provide for a short vertical wall near the open end of the shell portion. This wall may be able to be used by conveyance equipment to help determine the proper rotation of the bottle (i.e. identify front/back of the bottle to allow for spot label (e.g., front/back) application.

Figure 28A:
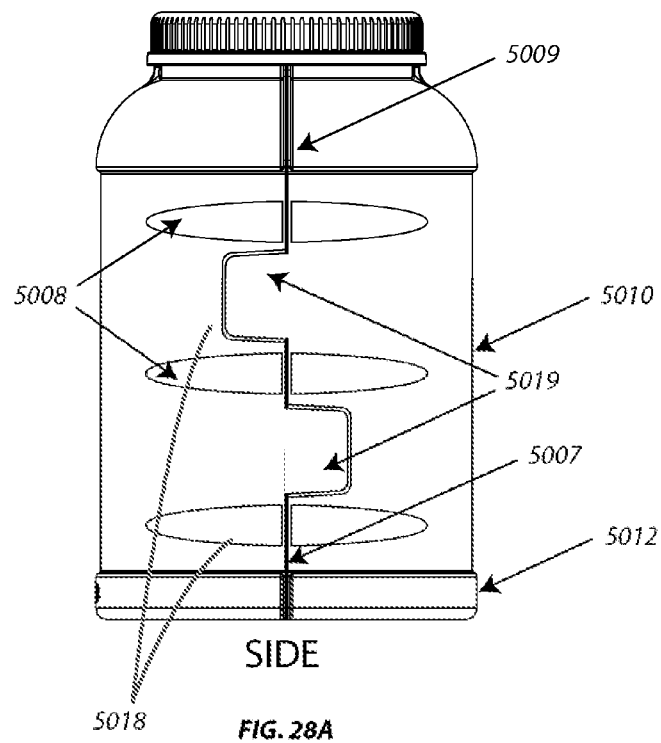
FIG. 28A is a front view of a seamless side connection on a container with two types of interlock features.
Figure 28B:
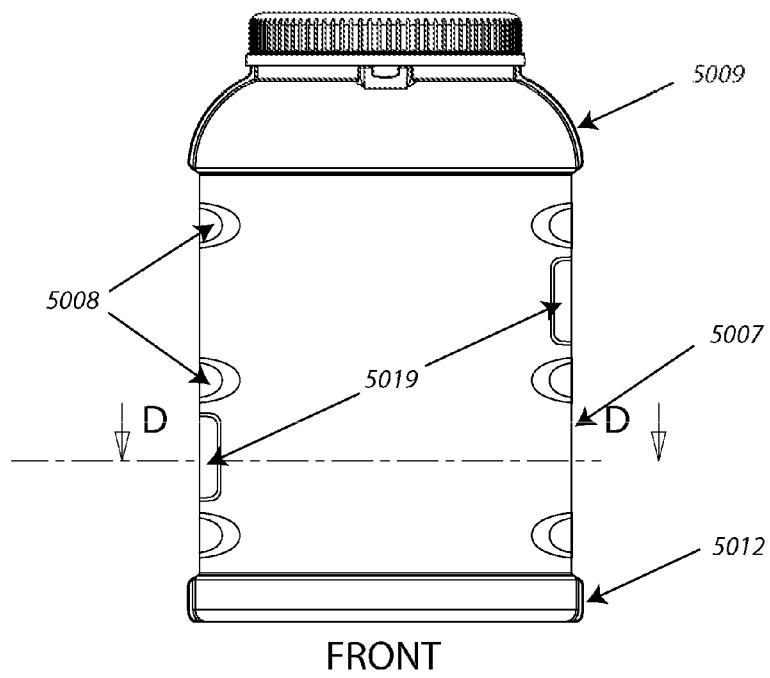
FIG. 28B is a side view of mating features on the container with seamless skeleton side walls shown in FIG. 28A.

Seamless side wall joining features may further include inner and/or outer flap features (5019), shown in FIGS. 28A-28B. The flaps may overlap from one side of the parting line (5007) to another. Preferably, alternating flaps may be used to provide balanced structural support along the parting line (5007). For example, the flaps (5019) in FIG. 28A may be arranged in an alternating configuration such that the top flap overlaps from the right side to the left side of the parting line (5007) and the subsequent bottom flap overlaps from the left side to the right side of the parting line (5007). Alternatively, the flaps may be arranged such that all flaps overlap from the same side, such as from the right side to the left side of the parting line (5007). Any combination of one or more lugs (5008) and/or one or more flaps (5019) may be employed to form a secure connection along the side wall parting line (5007) within a seamless side wall region (5010). For example, a smooth surface shell may have internal lug features for glue and overlapping flap features for gluing. The smooth surface bottle may have only one type of joining feature, or a mix of both, as shown in FIGS. 28A-28B. The joining features may further involve material thickness offsets, such as a thicker side wall to accommodate internal lug features, thinner flap receiving regions, thicker side wall along the parting line when adhesive means such as heat stakes are used etc. Material thickness offsets may be adjusted to provide required material strength while at the same time allowing for a smooth outer skeleton surface better suited for attachment of labels as well as for handling and storage. To aid assembly, flaps may be molded with a dimple and/or other feature and the flap receiving area on the other shell part may have a receiving feature for said dimple and/or other feature. This may allow the flaps to be closed (for example, into a smooth surface configuration) without the need for glue or additional attachment means. This configuration may be a temporary retention for the flaps. For example, flaps may be retained using said registration and/or locking features prior to a label being applied for further mechanical retention for the flaps. Inversely, the flap may have a receiving area and the other shell part may have one or more dimples and/or other features. The dimples and/or other registration/locking features may be sized slightly larger than the receiving area to ensure a friction based mechanical connection.

Figure 28C:
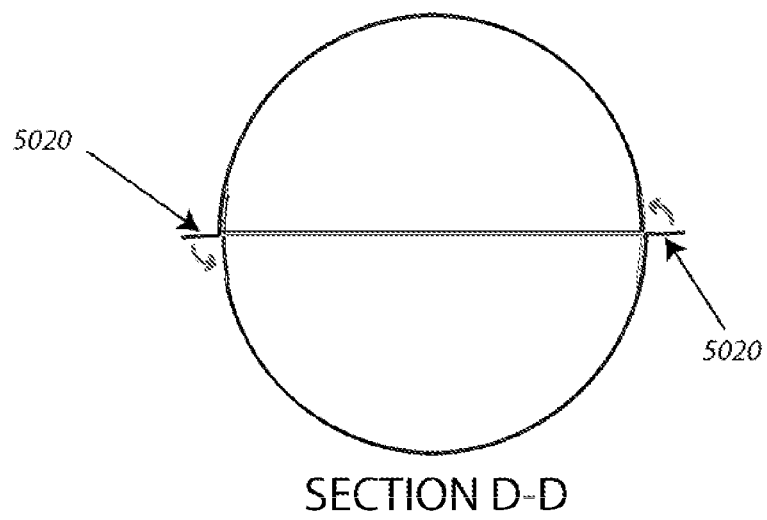
FIGS. 28C-28D detail overlapping flap registration features connecting the side walls of a skeleton in accordance with cross-section views indicated in FIG. 28B.
Figure 28D:
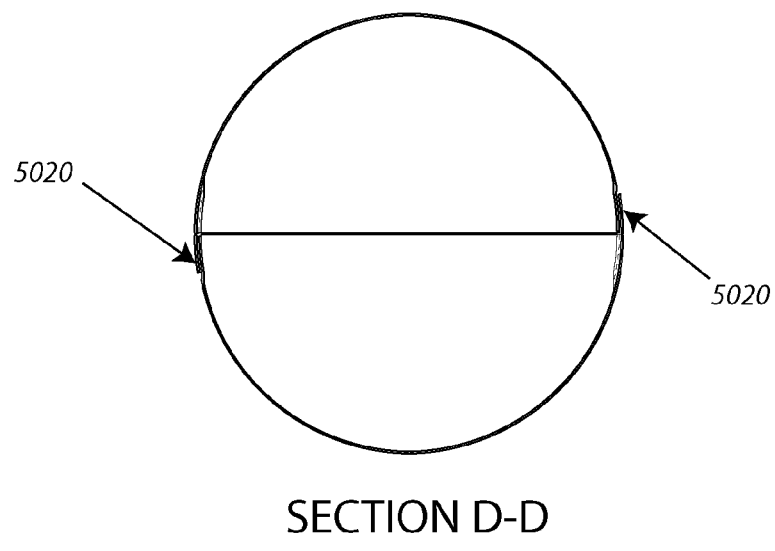

FIGS. 28C-28D detail a configuration of flaps in a cross-section view of the plane of the flap features perpendicular to the vertical axis of the container in FIG. 28B. The one or more outer flaps (5020) are shown in their open positions in FIG. 28C. In one embodiment, the molded position of the glue flaps may be open for easy line of draw molding (no undercuts). The flaps may be closed and secured with glue or any other adhesive means, as shown in an alternating flap configuration in FIG. 28D. In this arrangement, the flaps may create a smooth surface in the glued position. In some embodiments, flaps may not require glue to establish a secure connection. For example, an outer flap may be secured by being slipped into a groove or slot in the outer wall surface. As described elsewhere herein, flaps may further be placed along the inner surface of the skeleton side wall, and may be used interchangeably with other joining features.

FIG. 14A and FIG. 14B also show that the pulp molded skeleton can have angles between walls that are about 90 degrees, as shown by the dashed lines (2601, 2602). In FIG. 14A, the dashed line (2601) indicates an angle between the base and a side wall. The dashed lined (2602) indicates an angle between the base and another side wall. These angles may be similar or identical. These angles may be between about 80 to 100 degrees, or about 85 to 95 degrees, or about 90 to 93 degrees. These angles may allow for a flat or substantially flat base. The angles shown by the lines (2601, 2602) may work together to form a generally flat base from the overlapping base surfaces. In FIG. 14B, the dashed line (2603) indicates an angle between two side walls. This angle can be about, greater than about, or less than about 80, 85, 90, 95 degrees.

Figure 15A:
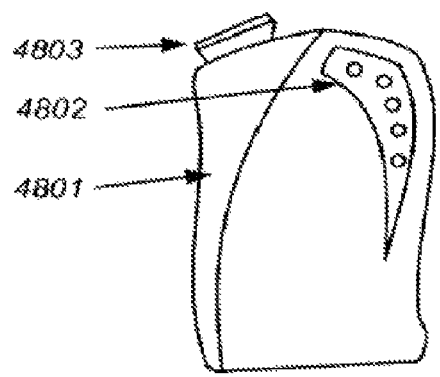
FIG. 15A shows a multi-part shell, in accordance with an embodiment of the invention.
Figure 15B:
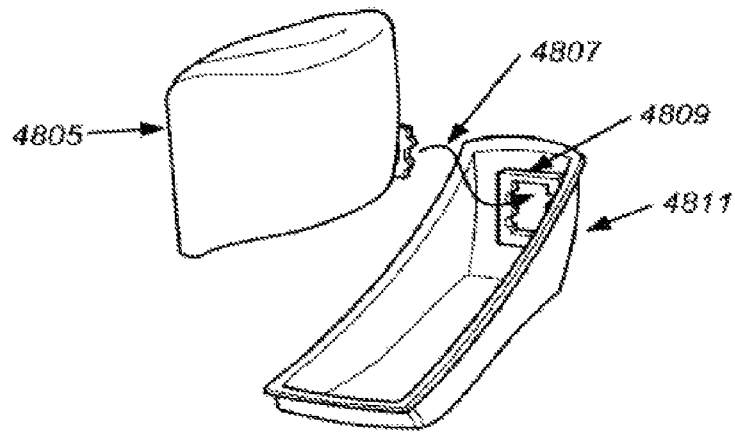
FIG. 15B shows a bag positioned for mating to a shell part with an insert molded piece, in accordance with an embodiment of the invention.
Figure 15C:
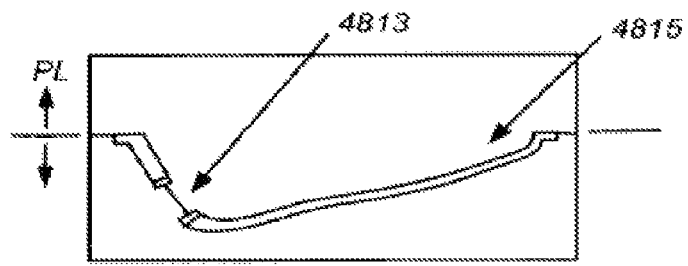
FIG. 15C shows a shell part with an insert molded piece, in accordance with an embodiment of the invention.

In some embodiments, the skeleton can be formed from multiple parts, some of which can have insert molded pieces, as shown in FIG. 15. FIG. 15A shows a skeleton formed from a first part (4801) and a second part (4802). FIG. 15B shows the first part (4811) separated from the second part. The first part (4811) has an insert molded piece (4809) which, as shown, is a receiver part that can mate with a fitment on a bag (4805). An arrow (4807) indicates how the fitment of the bag is attached to the insert molded piece of the first part. FIG. 15C shows a cross-sectional view of the first part. The insert molded piece (4813) can be molded with the skeleton (4815) during the molding process. The insert molded piece can be placed in the mold prior to formation of the skeleton. The parts to be insert molded can placed into the pulp forming machine by hand, mechanically, or robotically. Once the skeleton is formed, the insert molded piece is integrated with the skeleton and removed from the mold with the skeleton. The insert molded piece can be any type of material. For example, it can be plastic, pulp, paper, cardboard, metal, or glass. The insert molded can be the same type of material as the skeleton. In an embodiment, the insert molded part can be made of Type 3 pulp thermo forming and the resulting detailed pulp parts can be placed in a Type 2 forming machine for over molding of the inserted part resulting is a detailed area integrated to a less detailed part. With the difference in cost between the two processes the final part can be more cost effective that an entirely Type 3 part yet still have optimal detail and tolerance where desired. The insert molded can be separated from the skeleton by a user, which can allow for proper separation of materials for recycling, disposal, or reuse. The insert molded piece can also increase the stability or rigidity of the skeleton. For example, an insert molded piece can be designed such that it reinforces the base, sidewalls, or neck area of the skeleton. The insert molded piece can be a solid piece with or without an aperture. The insert-molded piece can mate to a fitment on a bag by friction, mechanical deformation, heat stakes, snaps or locks, or any other manner described herein or known to one skilled in the art.

In an embodiment, another way that the benefits of an alternate material or an alternate process part can be achieved is by adding parts to the thermoformed Type 3 or the formed Type 2 pulp parts afterwards. This is the addition and integration of parts post or after molding can be made with adhesives, mechanical deformations, heat stakes, interlock, etc. Also, a formed pulp part, after forming, can itself be placed into a mold for over-molding of another material or a feature from a different molding orientation. There can be many benefits to the insert or post molded parts into (or onto) the skeleton shell, including allowing connection of a fitment to the inserted part, having integrated wear points, having touch down points to facilitate stacking of like units, the integration of stiffeners of other material into the pulp to improve stacking/compressive strength, for achieving hard points for hanging/merchandizing, etc.

In some embodiments, separate parts, which may be insert molded pieces, may be inserted in between pulp shell parts. For example, a separately formed handle part may be incorporated between pulp shell halves in a clamshell configuration. The additional parts may be closed and/or captured between shell parts. The skeleton shell may be configured such that mating or other connecting features between shell parts can incorporate the one or more insert pieces. Additional features may also be added to the skeleton shell to facilitate the incorporation of the insert pieces. For example, one or both shell halves in a clamshell configuration may contain an indentation or other handle receiving region to appropriately position an insert handle piece. In another example, mating features such as mating nubs, dimples, interlocks etc. designed to be complementary to the one or more insert pieces may be added to the insert piece and/or mating skeleton shell parts. The insert pieces may further be integral to a skeleton shell part and may be appropriately incorporated in the skeleton shell when shell parts are mated. The insert piece may be formed of any material, including but not limited skeleton shell and insert molded piece materials described elsewhere herein. Further, in an embodiment featuring a double wall or reinforced skeleton shell, as described elsewhere herein, double-walled shell area(s) may serve as rigid handle or other insert piece receiving areas. For example, a reinforced (double-walled) skeleton shell region may be appropriate for carrying heavy load associated with a handle region. In a double-walled skeleton configuration, insert pieces such as handles may substantially incorporated between the layers of the double wall, wherein the wall layers may function as flanges for the insert piece, which may have a flat end configuration appropriate to fit in between wall layers.

In embodiments, containers comprise pulp parts with integral fiber pull-tabs (e.g., thread, string, tape, paper) to facilitate tear away opening of the container for materials separation and recycling.

The skeleton can be shaped for improved shipping or storage characteristics. The skeleton can have a design such that the skeleton can stack against other skeletons in a space-efficient manner. In some embodiments of the invention, the skeleton can be designed to fit into a carrier. The carrier can provide structural support to prevent breakage or damage to the container during transport.

The liquid-holding vessels herein can be secured within and supported by a skeleton. The skeleton can be designed such that the liquid-holding vessel can be secured within the skeleton without adhesives. A neck is adjoined to the vessel in preferable embodiments of the invention that in turn is supported by the skeleton. For some applications, only portions or specific locations of the liquid-holding vessel are secured to the skeleton.

In some embodiments of the invention, the skeleton can comprise of stiffening features near the neck area or other areas such as ribs, gussets, tabs, flanges, and other details to support the weight of the liquid-holding vessel, to provide structural integrity that allows for stacking of the container, or to ensure that the shape of the skeleton allows for stable stacking.

The liquid-holding vessel can have a volume that is greater or less than an interior volume of the skeleton. A liquid-holding vessel with a volume greater than an interior volume of the skeleton can utilize the skeleton as a structural support. In some embodiments of the invention, the liquid-holding vessel comprises a shape such that a first portion of the liquid-holding vessel may be supported by the skeleton and a second portion of the liquid-holding vessel may not be supported by the skeleton.

For reduction of negative environmental impact or other purposes, all of the components of the containers can be configured such that they are attached, or can be reattached by the user, to the container. Furthermore, the containers can be configured such that no component is released from the container throughout the life cycle of the container.

The liquid-holding vessel and skeleton can be recycled after use. The container can be designed such that the liquid-holding vessel and the skeleton can be separated prior to being subjected to a recycling process or prior to disposal. The liquid-holding vessel and skeleton can also be refilled and reused. In such instances, the liquid-holding vessel can be separated from the skeleton without damaging or destructing the skeleton. In some embodiments of the invention, the liquid-holding vessel may be formed from polyethylene and the skeleton may be formed from paper. In some instances, only two material families can be used to form the container, while in other instances various numbers of materials or material families can be used to form the container.

Separation of the liquid-holding vessel and the skeleton can be facilitated by a minimization of attachment points between the liquid-holding vessel and the skeleton. In some embodiments of the invention, the attachment points are weakened to allow for breakage. Separation of the liquid-holding vessel and the skeleton can improve the ability and/or ease of recycling the container by a given recycling process.

Figure 2:
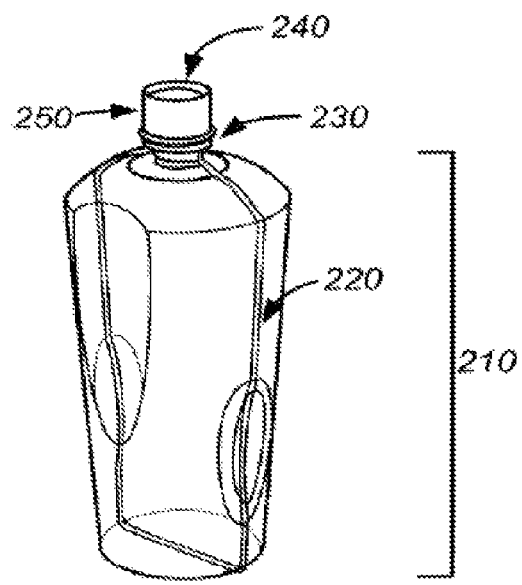
FIG. 2 is a diagram of a vessel with an attached neck, in accordance with an embodiment of the invention.

FIG. 2 is an illustration of a liquid-holding bag (210). The liquid-holding bag can be attached by bonding, sealing or welding to a neck (250). The liquid-holding bag can be bonded, sealed or welded to a lower portion of the neck. Bonding, sealing or welding of the liquid-holding bag to the neck can create a substantially water-tight seal between the neck and the liquid-holding bag. The bonding, sealing or welding can be such that the weight of the bag or the contents therein can be supported. The neck can form a portion of a closure for the liquid-holding bag. Components of the container, including the neck, the liquid-holding bag and the closure, can be formed from the same polymer, from polymers belonging to the same recycling group, or from polymers of the same type. The neck can be rigid, semi-rigid, or flexible. The neck can comprise an aperture (240) that can be used for dispensing a liquid from the container. The aperture (240) can be ribbed for sealing against a cap. The neck can comprise one or more flanges (230) for mating the neck with a molded fiber or pulp-formed skeleton. In an embodiment, the shape of the liquid or solid content holding bag is critical to ensuring that minimum materials are used, that it fills with contents reliably, that is make the best use of the internal volume offered by the skeleton shell, that is does not transfer concentrated forces onto any specific areas of skeleton shell. The optimization and efficiency of this container lies in it being made cost effectively, not requiring excessive materials while being very reliable in transport and use.

In an embodiment, the final definition of bag (or pouch) shape depends on the specific instance of the outer shell shape required. This container system makes many shapes possible. The pouch shape is then tailored to not have excess material in places where air can get trapped resulting in under filling of contents. The thicker the film for any given film type, the less easily it fully deploys upon filling. The shape of the pouch is not limited to rectilinear or square. The edges can be curved or have profiles. Current pouches that are used on their own often have simple straight line geometries for ease of production. With a pouch detailed to work in a skeleton shell, the shape is an important method for controlling the forces applied to the skeleton. In some instances, the 'waist' of the pouch can have less material so that when it is expanded with contents it does not place excessive force on to the weak mid line area of the container (or skeleton shell). The length of the pouch is also important and will, once again, depend on the shape of the skeleton; if the pouch is too short, it will exert too much load on the location where the pouch is attached to the shell such as the upper fitment causing collapse. Optimized length can control this, as can having other locations along the pouch that are tabs or features for connecting, and distributing load to the skeleton shell. These tab features could be integrated into the seam. It is usually desirable to keep the seams minimal in dimension beyond what is required for structural reliability. Less plastic use advantageously reduces environmental impact and manufacturing costs. Certain forming features, sometimes at the corners, or in the shoulders or the midplane, can allow the pouch to have a three dimensional shape suited for a specific skeleton shell, resulting in a more optimized pouch.

The liquid-holding bag can also comprise a seam (220). The seam can be formed during welding or joining of polymeric materials used to form the liquid-holding bag. The seam can be formed along a vertical, horizontal or diagonal plane of the liquid-holding bag. In other embodiments of the invention, the seam can have any shape and is not necessarily along a single plane of the liquid-holding bag. The seam can have a minimal amount of polymer, so as to reduce the weight of the liquid-holding bag. In other embodiments of the invention, the seam is designed to provide structural shape to the liquid-holding body. For example, the seam can be thickened or designed to be filled with a gas, which may add integral structure to the vessel through pressurization.

Figure 16:
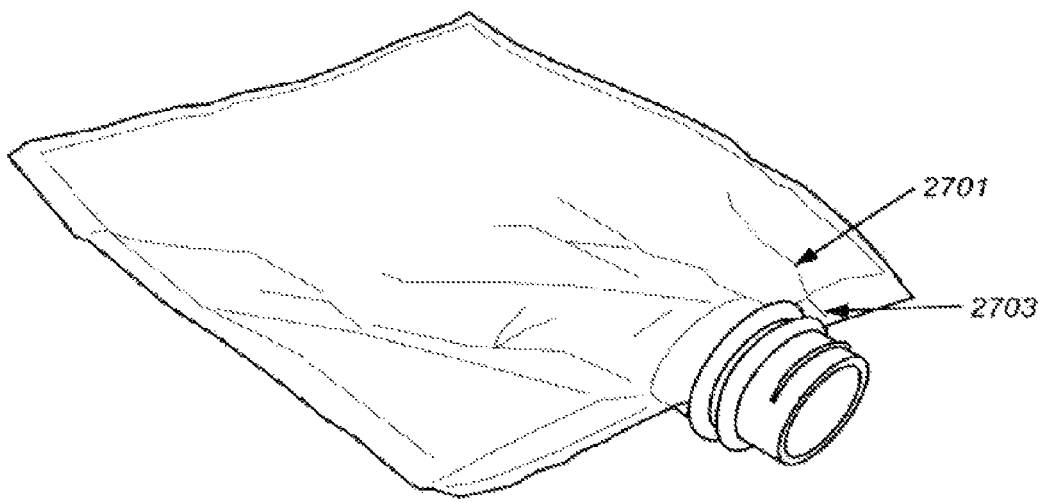
FIG. 16 shows a pillow style bag with an edge-mounted fitment, in accordance with an embodiment of the invention.

Fitments can be attached to bags in a variety of manners. For example, fitments can be edge-mounted or face mounted. A pillow style bag with an edge-mounted fitment is shown in FIG. 16. The edge-mounted fitment (2703) can be attached at an edge of the pillow-style bag (2701). The bag can be similar to any other bag described herein. It can have a gusset to allow for expansion of the bag. The bag/pouch can be formed with a top face, bottom face sides, gussets or combinations thereof for efficient optimization between the pouch shape and shell shape. The bag can be formed from a single piece of plastic or multiple pieces of plastic. The thickness of the bag can be such that it can be welded to a fitment using a single welding temperature and/or time. The pillow-style bag (2701) can have a re-sealable closure, such as a twist cap. Other examples of re-sealable closures include snap caps, lids, folds, clips, zipper grip and adhesives. In some embodiments, the re-sealable closure may utilize the skeleton. In some instances, the re-sealable closure may contact the skeleton, be supported by the skeleton, or the skeleton may be part of the re-sealing mechanism. The pillow-style bag (2701) of FIG. 16 can be formed and filled with the aid of a horizontal form fill seal machine. Alternatively, it may be filled on a vertical form fill seal machine, or any other method of manufacturing and filling.

Figure 17:
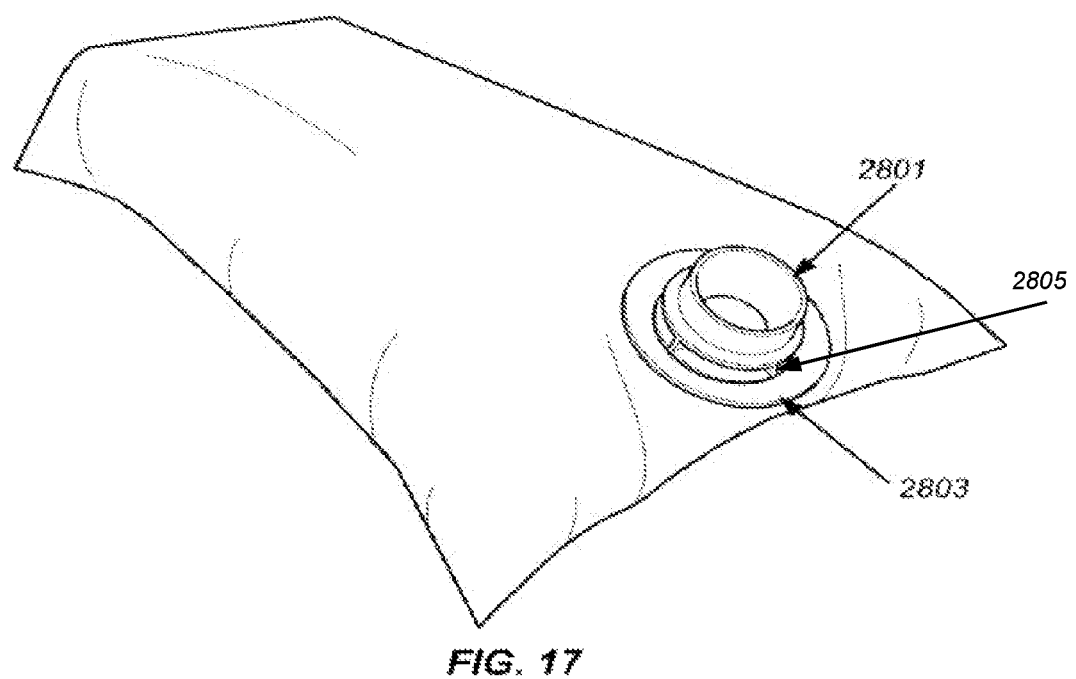
FIG. 17 shows a bag with a face-mounted fitment, in accordance with an embodiment of the invention.

Another bag with a face-mounted fitment is shown in FIG. 17. In embodiments, face mounted fitment (2801) can be designed such that it can be welded to the face surface of the bag that is formed with the aid of various methods of manufacturing and filling. In an embodiment, face-mounted fitment (2801) is designed such that it can be welded to the face surface of the bag that is formed with a Vertical Form Fill and Seal Machine. The face-mounted fitments can be designed to have a section or portion (2803) that has a similar thickness or welding temperature of the film used to form the bag. In some embodiments of the invention, the face-mounted fitment and the bag are manufactured of the same polymer, compatible polymers, or polymers of the same class. These classes can be recycling classes or groups. The recycling groups can comprise plastic identification codes 1, 2, 3, 4, 5, 6, and 7. A recycling group can comprise a set of plastic or polymer types that can be recycled together using a recycling process that does not require separation of the plastic or polymer types prior to the recycling process. The face-mounted fitments can have screw caps for closure, or may have any other type of closure described herein. The face-mounted fitments can have any type of tamper-evident seal described herein. The fitments can have ribs or flange features (2805) that may interlock with mating features on the shell to better retain the fitment securely.

The face-mounted fitments can be attached to a bag using a variety of methods. A fitment can be attached to a plastic sheet prior to the formation of a bag. Attachment of the fitment to the plastic sheet prior to bag formation can improve the attachment between the fitment and the plastic sheet, as well as reduce stress on the final bag formation. In some embodiments, this process can be performed inline with a process for producing a vertical form fill seal (VFFS) bag. Alternatively, a face-mounted fitment can be installed on a plastic sheet in a process that is not inline with a VFFS process. Any method of manufacturing and filing known in the art may be used (e.g., horizontal form fill sealing). Separating the fitment attachment process from the bag formation process can help avoid complications in the bag manufacturing process. Alternatively, combining the fitment attachment and bag formation process can help reduce the footprint or required space for the fitment attachment and bag manufacturing process. In some embodiments the fitment can be applied through an adhesive strip after or before the pouch has been formed and filled. The fitment can be designed so that the tamper evidence seal perforates the bag when removed to release the liquids for pouring. In some embodiments, no heat welding is required reducing the risk of manufacturing malformations, cost and carbon footprint. The face-mounted fitment (or any other fitment type described herein) can also have features that help form or reinforce a side of a shell that encloses the bag. For example, a fitment and a card and a plastic sheet can be welded or otherwise combined in a process prior to formation of a bag, which may be formed by welding the plastic sheet to another plastic sheet. The card can be designed for a variety of purposes. It can be designed to improve the strength of attachment between the fitment and a shell, to form a side of the shell, and/or to improve the strength of a shell wall. A fitment (such as a face-mounted fitment or any other fitment that can be used to close a bag) can have features that provide structural benefit, wear-resistant areas, and/or friction pads.

The plastic used for the VFFS process, or any other process used to form bags or pouches, can be made of a single type of polymer or multiple types of polymer. The plastic can be selected to exhibit impermeability or reduced permeability to a material to be contained within the bag. For example, the plastic can be polyethylene. The plastic can have layers of polyethylene that have been produced at varying densities.

Face-mounted fitments are described in U.S. Pat. Nos. 6,237,308, 5,288,531, 4,709,528, 7,076,935, 6,874,299, 6,826,892, 6,794,053, 6,237,308, 5,363,966, and U.S. Patent Publication No. 2006/0111224, which are incorporated herein by reference in their entirety.

In some embodiments of the invention, the liquid-holding bag and fitment can be formed from a polymer. The liquid-holding bag and fitment, having a given volume, can be formed of a given amount of polymer. The liquid-holding bag can be formed of a minimal amount of polymer since the liquid-holding bag can be supported by a molded fiber or pulp-formed skeleton. In one embodiment the fitment component and the vessel portion can be the same single part through the use of thin wall blowmolding (LDPE, or HDPE, or other) or injection blowmolding using a perform (PP or PET, or other). These integral fitment and vessel parts do not have overlapping material since there is no joining process between liner and fitment. The amount of polymer used to form the fitment can be minimized using the fitments described herein, or any other type of closure known to those skilled in the arts.

The amount of polymer required for the formation of the liquid-holding bag, neck, and the closure can be less than 4, 5, 6, 7, 8, 9, 10, 11, 12, 13, 14, 15, 20, 25, or 30 grams of polymer per liter contained within the liquid-holding bag and the closure. The amount of polymer used to form a given container can be broken down into the amount of polymer used to form the dispensing aperture and a liquid-holding bag where these are separate components. As the volume of a container increases, the amount of polymer used to form the container on a volumetric basis can decrease. This can be due to the fact that a large amount of polymer can be required for the formation of the closure. The mass of plastic to mass of water contained in a container described here can be approximately 6 g of plastic to 500 g of water, or approximately 1.2%.

For a 500 mL container, the closure can comprise less than 0.2, 0.5, 1, 2, 3, 4, 5, 6, 7, 8, 9, 10, or 15 grams of polymer and the liquid-holding bag can comprise less than 0.2, 0.5, 1, 2, 3, 4, 5, 6, 7, 8, 9, 10 or 15 grams of polymer.

The aforementioned components, including the liquid-holding bag and fitment, the closure, and the skeleton, as shown in FIG. 1 and FIG. 2, can be utilized in other containers described herein.

Figure 3:
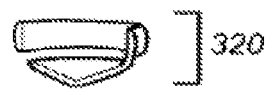
FIG. 3 is a cross-sectional view of a container with a vessel connected to a fiber molded or pulp-molded skeleton through a neck, in accordance with an embodiment of the invention.
Figure 3:
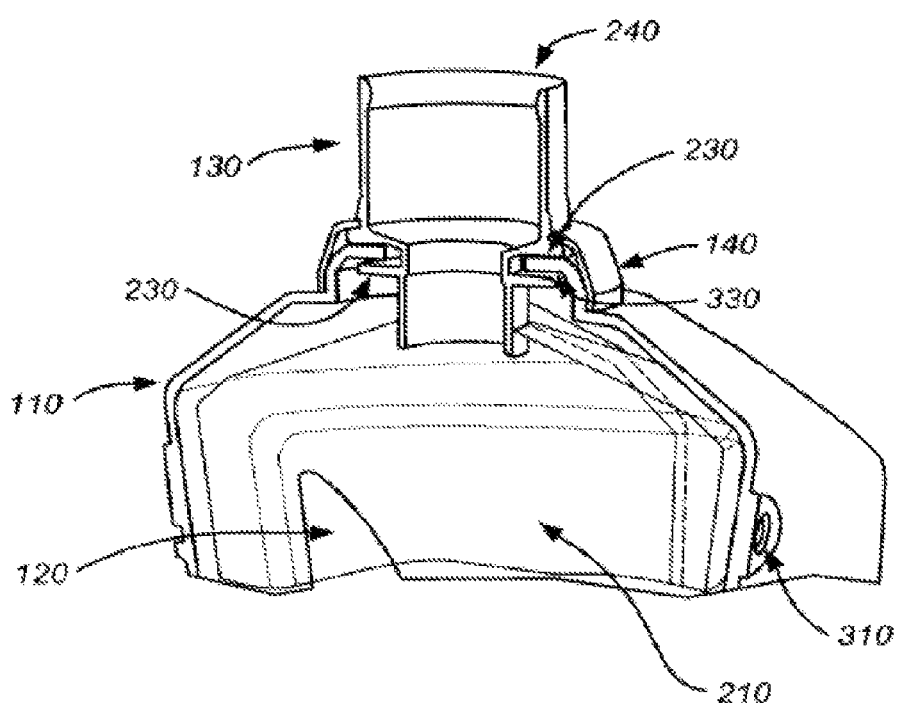

FIG. 3 shows a cross-sectional view of a skeleton (110) enclosing a liquid-holding bag (210). The liquid-holding bag can be attached to a neck (130) and the skeleton (110) may be mated to the neck (130) by neck flanges (230) and by skeleton flanges (330). The skeleton flanges can be held against the neck flanges by a retaining collar (140). The retaining collar can snap into place against the neck. The neck and/or skeleton flanges can be circumferential or annular flanges. The neck and/or the skeleton flanges can be shaped to mate to each other. For example, the skeleton can be made of a pulp material that is shaped to be complementary to a fitment. The neck (130) can also comprise a ribbed aperture (240). A tamper-evident seal (320) can be molded with, welded to or bonded to the neck during manufacture of the neck (See FIG. 5A).

The liquid-holding bag can be attached to the neck by bonding, sealing, or welding the liquid-holding bag to the neck. The containers described herein do not require that the liner be pulled through an opening of the skeleton. In some embodiments of the invention, the liquid-holding bag does not extend through an opening of the skeleton. The containers described herein can utilize liners that are pulled through an opening of the skeleton. In other embodiments of the invention, the liquid-holding bag may or may not be attached to an outside portion of the skeleton. In some embodiments, the liquid-holding bag can be pulled through or extend through an opening of the skeleton during construction or deconstruction of the container, but are not be pulled or extended through an opening of the skeleton during filling, distribution, or use of the container. In other embodiments, the liquid-holding bag can be pulled through or extend through an opening of the skeleton during construction or deconstruction of the container, and are pulled or extended through an opening of the skeleton during filling, distribution, or use of the container.

A bag can be attached to a shell using a variety of mechanisms. These mechanisms can include attachment of the bag to the shell or skeleton by the fitment. The fitment can be attached to the shell through the use of heat, welding, glue, friction, snaps, locks, clips, rails, mechanical deformation, or any other mechanism known to one skilled in the art.

Figure 18:
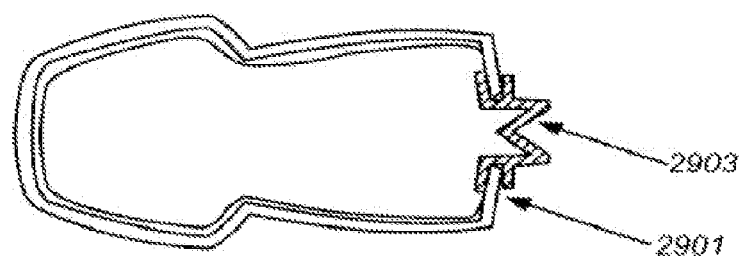
FIG. 18 shows a fitment attached to a shell by interference friction interlock, in accordance with an embodiment of the invention.

FIG. 18, FIG. 19, FIG. 20, and FIG. 21 show examples of mechanisms for attaching a fitment or a receiver part or a plastic component to a shell or skeleton. FIG. 18 shows a fitment (2903, diagonal fill lines) that is attached by flanges to a shell (2901). The fitment has two flanges that mate with one layer of the shell. The flanges can be friction fit to the shell. The flanges can also be glued or otherwise attached to the shell by an adhesive. In some embodiments, the fitment is attached to the shell without the use of adhesives or glues.

Figure 19A:
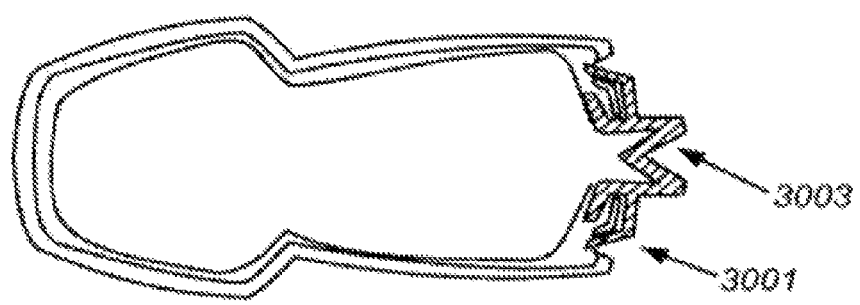
FIGS. 19A and 19B show fitments attached to shells by mechanical deformation, in accordance with various embodiments of the invention.

FIG. 19A shows a fitment (3003) that is attached to a shell by attachment members (also "external mating features" herein) that may be a mechanical deformation of flanges (3001), in accordance with an embodiment of the invention. The mechanical deformation can be performed by a machine or manually. The flange can mechanically deform in a circumferential manner about the fitment, or only partially about the fitment. In some embodiments, the mechanical deformation may cause a mechanical deformation of only the fitment, only the shell, or both the fitment and the shell. The mechanical deformation may be reversible or irreversible.

Figure 19B:
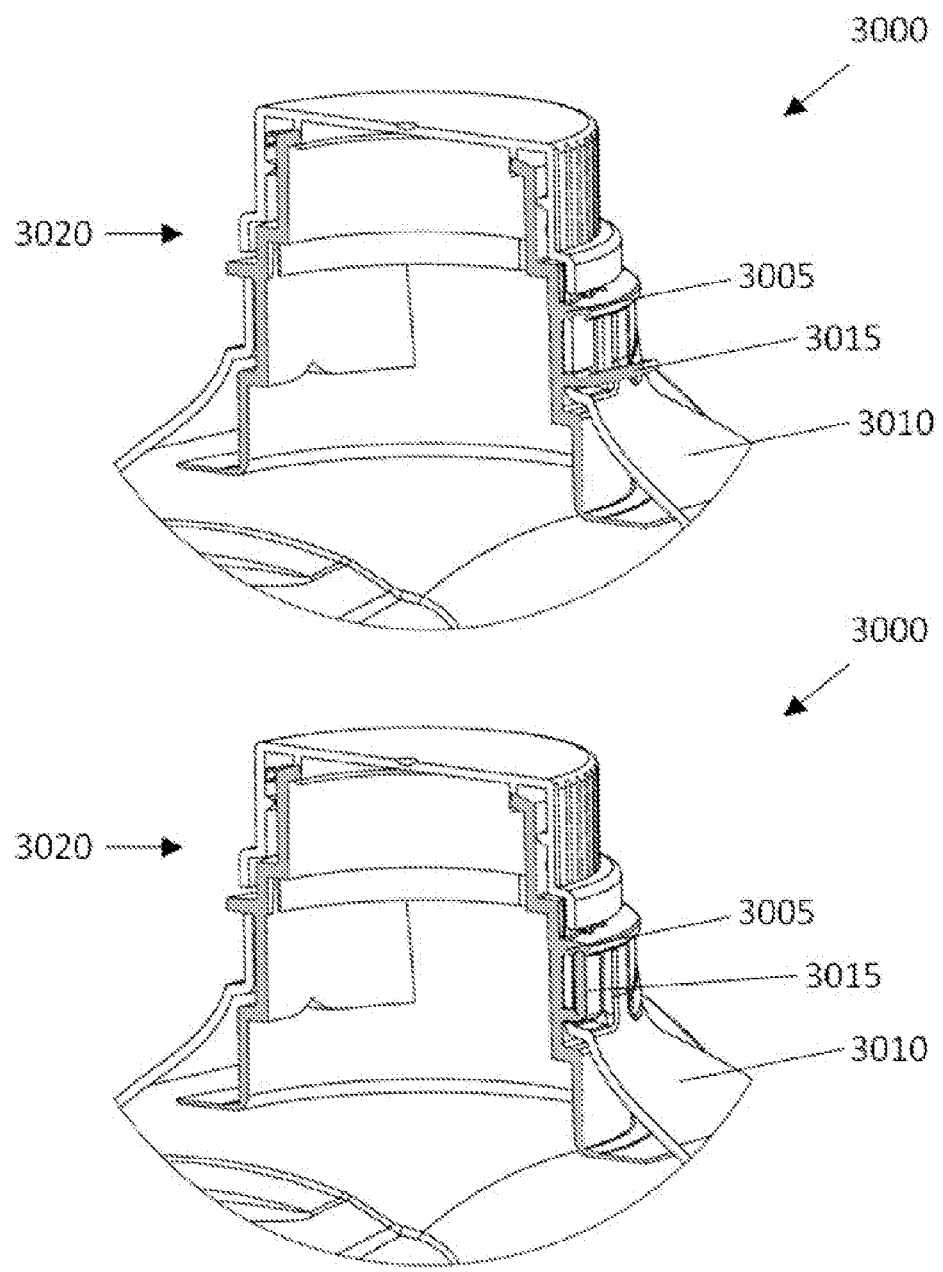

FIG. 19B shows a container (3000) having a fitment (3005) that is attached to a shell (3010) by one or more attachment members (3015), in accordance with an embodiment of the invention. The fitment (3005) and shell (3010) may be any fitment and shell provided herein. The one or more attachment members (3015) may be mechanical deformations formed from the fitment (3005). Each of the one or more attachment members (3015) may include posts (also "attachment posts" here) that extends through an opening in the shell (3010). FIG. 19B, top, shows a post (3015) formed from the fitment (3005) extending outwardly through an opening in the shell (3010). The post (3015) may extend perpendicularly or angled with respect to a surface of the shell (3010). FIG. 19B, bottom, shows the post (3015) resting against a portion of the shell (3010), which may secure the shell (3010) against the fitment (3005). The post (3015) may bend, hook, or curve against a surface of the shell (3010) located in a neck region (3020) of the container (3000). For example, the post (3015) may hook against a surface of the shell (3010) in the neck region (3020). The post (3015) may bend, hook or curve against the surface of the shell (3010) in a manner parallel to a base of the container (3000) (not shown) or angled, such as, e.g., perpendicularly, with respect to a plane parallel to the base of the container (3000). In some cases, the post (3015) may bend, hook or curve and attach to the surface of the shell (3010) parallel or angled with respect to a plane parallel to the base of the container (3000), such as angled at about 5.degree., or 10.degree., or 15.degree., or 20.degree., or 25.degree., or 30.degree., or 35.degree., or 40.degree., or 45.degree., or 50.degree., or 55.degree., or 60.degree., or 65.degree., or 70.degree., or 75.degree., or 80.degree., or 85.degree., or 90.degree. with respect to a plane parallel to the base of the container (3000). In other cases, the attachment members (3015) may include a plurality of posts that are attached to the shell (3010). In such a case, the attachment members (3015) may overlap one another or be attached to one another.

Each of the attachments posts (3015) may extend out of a hole, slot or slit in the shell (3010) and bend, curve or hook around a corner of hold, slot or slit and rest against a surface of the shell (3010). In some cases, the fitment (3005) may include a rib or ledge that rests over the shell (3010), as illustrated in FIG. 19B, top. The rib rests below a cap when the cap has mated with the fitment (3005), as shown. As shown in FIG. 19B, bottom, a post (3015) has come to rest against a surface of the shell (3010) and in contact with a groove formed in a lower surface of the rib or ledge of the fitment (3005). The groove may keep the post (3015) from moving away from the surface of the shell (3010).

The post (3015) may be have a circular, triangular, square, rectangular, pentagonal, hexagonal, heptagonal, or octagonal cross-section. The post (3015) may have a thickness (along its shortest dimension) between about 0.1 inches and 1 inch, or 0.2 inches and 0.5 inches, and a length (along its longest dimension) between about 0.1 inches and 1 inch, or 0.2 inches and 0.5 inches.

The attachment members (3015), such as posts, may extend (or protrude) from the shell (3010) a holes, slots or slits formed in shell. In some situations, the attachment members (3015) may extend from the shell (3010) at a hole, slot or slit formed at a single location in the shell (3010). In other situations, the attachment members (3015) may extend from the shell (3010) at a plurality of holes, slots or slits in the shell (3010).

In some cases, the attachment members (3015), including posts, may be formed from the fitment (3005). That is, the attachment members (3015) may be unitary (or single-piece) with the fitment (3005). For example, the fitment (3005) and attachment members (3015) may be formed from a polymeric material, such as a plastic. The fitment (3005) and attachment members (3015) may be formed by injection molding or extrusion. In other cases, the attachment members (3015) may be formed from one or more materials separate from the fitment (3005). For example, the fitment (3005) may be formed of a first polymeric material and the attachment members (3015) may be formed of a second polymeric material, a metallic material (e.g., aluminum), or a composite material that may include one or more of a polymer and metal.

Figure 20:
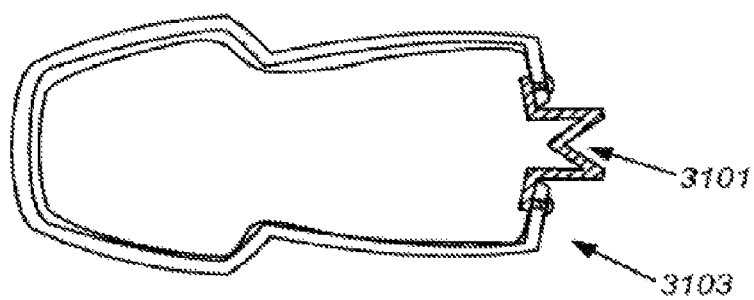
FIG. 20 shows a fitment attached to a shell by heat stakes, in accordance with an embodiment of the invention.
Figure 21:
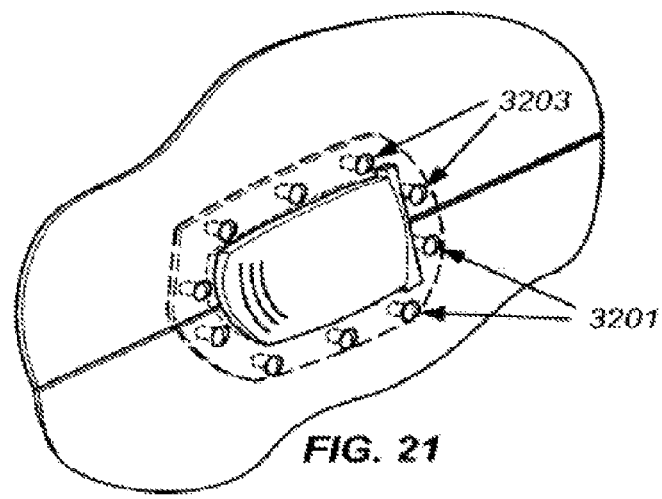
FIG. 21 shows a fitment mated to a shell by heat stakes, in accordance with an embodiment of the invention.

FIG. 20 and FIG. 21 show fitments (3101) that can be attached to a shell using heat stakes (3103, 3201, 3203). The heat stakes can extend from the fitment and through a shell. The shell can have predrilled, preformed or premolded holes, diecut holes, slots, or slits that allow for the heat stakes to extend through the shell or the heat stakes can be made to pierce through the shell or through a molded feature in the shell or through a thinner area in the shell. The heat stakes can be arranged in a circumferential or radial manner about the fitment, or can be positioned only partially about the fitment. The fitment can be attached to the shell by about, less than about, or at least about one, two, three, four, five, six, seven, eight, nine, ten, or more stakes. The stakes can be made from a material that is the same or different from rest of the fitment. For example, the stakes can be made of the same plastic as the fitment. The heat stakes can be integral to the fitment. The stakes can be made of a plastic that can be melted or deformed by heat or by ultrasonic energy directors. Melting or deformation of the plastic can allow for secure attachment between the fitment and the shell. The melted or deformed stakes can form any shape. For example, the melted or deformed stakes can form a rivet shaped head. In certain embodiments, the fitment can be mated to the skeleton shell or a part of the skeleton shell through a hole that is in the shell part. The fitment can then be inserted from the inside and connected to the skeleton shell with, e.g., adhesive, mechanical deformation of the pulp to the fitment flange, with the aid of welding, and/or a retaining ring installed from the outside.

Figure 24:
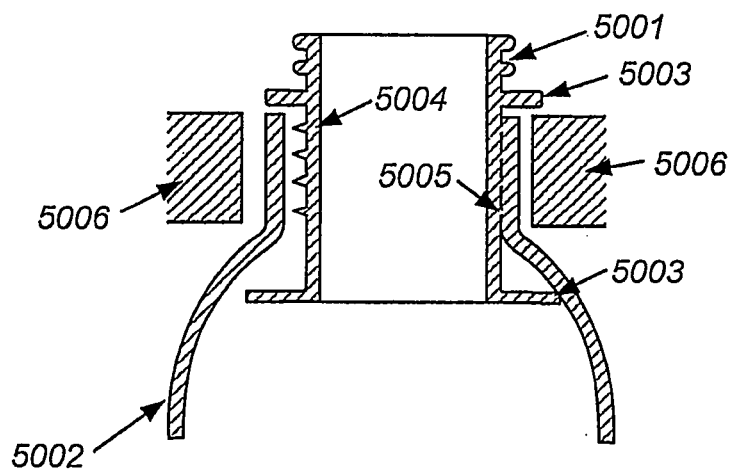
FIG. 24 shows a fitment with heat stakes and its attachment to a shell by ultrasonic energy directors.
Figure 24:
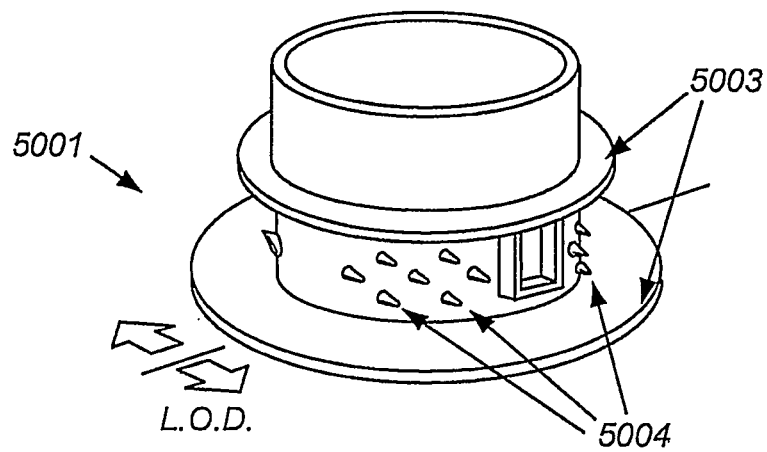

Further examples of configurations utilizing heat stakes for direct connection between the fitment and the shell are shown in FIG. 24. A direct connection may enable the fitment to more fully adhere to the pulp shell, thereby eliminating the need for additional structural support features such as a retaining collar or other mating features described elsewhere herein. This may be a cost effective way to reduce material requirements as well as the number of parts that a bottle or container in accordance with embodiments of the present invention may be assembled from.

A fitment (5001) may constitute one or more heat stakes (5004). The heat stakes may or may not be integral to the fitment. For example, the heat stakes may be made from a different material than the fitment, wherein the material from which the heat stakes are made may be more suitable for fusing the fitment and the pulp by ultrasonic energy directors. The heat stakes may also be part of the pulp shell. The fitment may or may not include one or more flanges (5003) that mate to the skeleton. In a preferable embodiment, ultrasonic welding of the fitment (5001) directly to the unmodified pulp shell (5002) may be employed. The heat stakes may have any shape including but not limited to spikes, pins, protrusions, bumps, cones, dimples, arrows, fringes and other features.

One or more heat stakes, such as a plurality of spikes or short pins (5004), may be configured to be embedded into the pulp wall (5002). The one or more heat stakes may be positioned around the fitment. Preferably, the heat stakes (5004) may be located between the one or more flanges (5003), as shown in FIG. 24. The heat stakes may also be located on the one or more flanges. The heat stakes may or may not be uniformly spaced around the fitment, for example, such that a uniform connection may be achieved along the entire surface of the fitment. Alternatively, the heat stakes may be localized, for example, such that other features may be employed on parts of the fitment. The spikes may be made to pierce the pulp mechanically. The spikes may partially or fully pierce the pulp shell. Preferably, the spikes may be embedded just shy of the full thickness of the pulp shell without piercing all the way through. The heat stakes may further be made to fuse together the fitment and pulp shell to form a bond that may be deeper than glue through the application of ultrasonic energy to melt the heat stakes.

The heat stakes may be deformed by the energy deposited to form a bond (5005). The pressing of the heat stakes into the pulp may be combined with ultrasonic energy deposition by the use of ultrasonic horn clamps or other means that combine heat and/or energy deposition with mechanical pressing or squeezing. The mechanical and energy deposition steps may also be performed sequentially through the use of a mechanical means and an ultrasonic means. The heat stakes may allow for a strong bond to be formed between the fitment and the pulp shell.

Moreover, the liquid-holding bag may be formed of multiple laminated layers. The laminated layers can be any material that prevents transfer of oxygen, water vapor, or other materials into or out of the vessel. The laminated layers can be formed from the same or different materials. In some configurations, the liquid-holding bag can be formed of one, two, three or more layers of a polymer that are separated from each other by a medium. The medium separating the layers can be gas, air, water vapor, liquid, or any other material. The layers of polymer can be the same or different polymers. The separation can be facilitated by bumps or dimples in one or more of the layers. Having multiple layers of polymer can reduce the transfer rate of oxygen, water vapor, or other materials into or out of the vessel.

The neck can have one or more flanges that mate to the skeleton, which may also have one or more flanges, to support the neck and the liquid-holding bag. The series of neck and skeleton flanges can provide an adhesive-free connection between the skeleton and the liquid-holding bag to support the weight of the liquid-holding bag and liquid contents therein. The neck and/or skeleton flanges can be formed in a neck area and provide support for heavier and larger bags (See FIG. 4).

The retaining collar can hold the neck to the skeleton. The retaining collar may provide a frictional fitting around both the skeleton and the neck. This may prevent or minimize rotation of the bag within the skeleton.

The neck can be positioned on a top portion of the skeleton. The liquid-holding bag and the contents therein can be suspended within the skeleton by attachment between the neck and the skeleton flanges. The weight of the liquid-holding bag and contents therein can be supported by the neck and skeleton flanges, which can prevent the neck from falling into the skeleton.

As shown in FIG. 3, the skeleton can also comprise interlocks (310) for connecting pieces of the skeleton together or securing the skeleton in a closed position. The skeleton can also comprise openings (120) for viewing the contents of the liquid-holding bag.

The flanges and interlocks as shown in FIG. 3 can be utilized in any container described herein.

Figure 4:
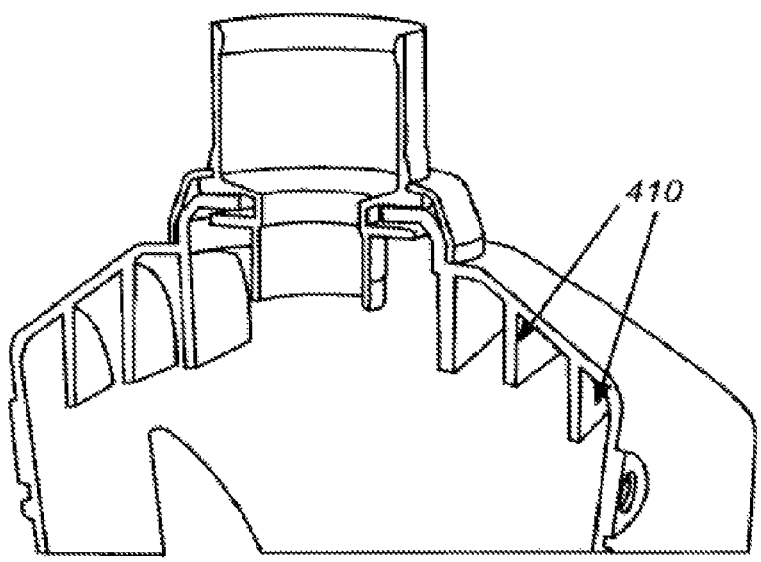
FIG. 4 is a cross-sectional view of a container with strengthening features near the neck area of the container, in accordance with an embodiment of the invention.

FIG. 4 shows a cross-section of a container with supporting features near the neck region. For example, the skeleton may comprise one or more ribs (410). Such ribs may provide more strength to the structure of the skeleton and may assist the container's neck region in supporting the weight of the liquid-holding vessel. In some cases, the ribs may comprise the same materials as the skeleton, such as a fiber or pulp-mold, and may be molded in the same piece as the skeleton, while in other cases the materials may include different materials from the skeleton or may be separate pieces somehow adhered, attached, or integrated with the skeleton. The ribs may include different arrangements and configurations that may lend support to the neck area of the container. The ribs as shown in FIG. 4 can be utilized in any of the containers described herein.

In some embodiments of the invention, gussets, tabs, or other supporting features that may stiffen the neck area of the skeleton may be used.

Figure 5A:
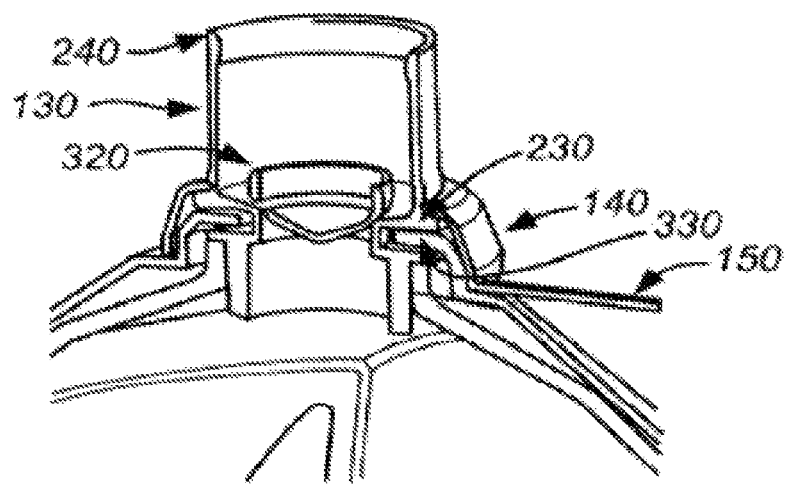
FIG. 5A is a cross-sectional view of a container with a tamper-evident seal, in accordance with an embodiment of the invention.

FIG. 5A shows an illustration of an integrally molded tamper evident seal (320) located within the neck (130). A retaining collar (140) can also be attached to a securing line (150). The securing line can also be attached to a cap. The retaining collar (140), securing line (150), and cap (160) can also be molded as one part, or the retaining collar (140) may be independently molded as a separate part. FIG. 5A shows a view of a container with a retaining collar (140), securing line (150) and cap (160) where the cap is open and the tamper evident seal is closed.

Figure 5B:
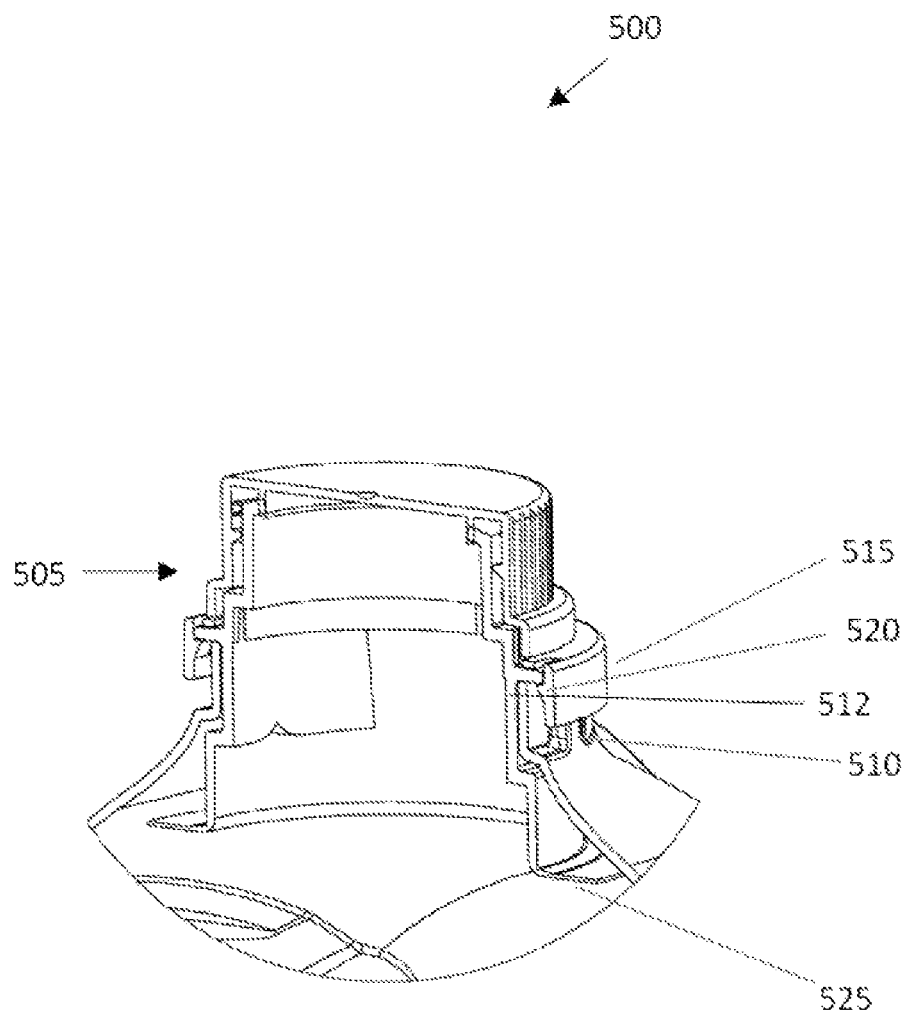
FIG. 5B is a cross-sectional side view of a neck of a container, in accordance with an embodiment of the invention.

FIG. 5B shows a container (500) having a neck (505) and shell (510), in accordance with an embodiment of the invention. The neck (505) includes a fitment (512), which may be any fitment provided herein. The container (500) may include a retaining collar (515), which may keep the shell (510) attached to the fitment (512). The retaining collar (515) may be independent from the shell (510) and fitment (512) of the container (500). In some cases, the retaining collar (515) may be integral with one or more of the fitment (512) and the shell (510). For example, the retaining collar (515) may be formed from the shell (510). As another example, the retaining collar (515) may be formed from the fitment (512). As another example, the retaining collar may be integral to the closure/cap, and when the cap is removed by the user the cap breaks away from the retaining collar where the retaining collar stays with the bottle, thus performing the dual function of retaining the shell to the fitment and serving as a tamper-proof (or tamper evident) feature that would need to be separated by the user for initial access to the contents. The retaining collar (515) may include a snap member (520) that may hold the retaining collar (515) to the fitment (512). The snap member (520) may be a protrusion from a surface of the retaining collar (515). The protrusion, as illustrated, protrudes inward toward the shell (510) and comes to rest against a lower portion of a ledge or rib of the fitment (512).

The shell (510) may be held in place by the retaining collar (515). In some cases, the retaining collar (515) may keep a portion of the shell (510) in the neck (505) adjacent the fitment (512). The snap member (520) may enable the retaining collar (515) to remain fixedly attached to the fitment (512) and the shell (510). In some cases, the retaining collar (515) may keep the shell (510) irremovably attached to the fitment (512). The shell (515) may encapsulate a container a holding bag (525) of the container (500).

The retaining collar (515) may be movable with respect to the shell (510) and fitment (512). In some situations, the retaining collar (515) may be rotatable with respect to the shell (510) and fitment (512). A user may be able to rotate the retaining collar (515) along a plane parallel to a base of the container (500).

In some cases, the retaining collar (515) may be circular. In other cases, the retaining collar (515) may have other geometric shapes, such as, for example, triangular, square, rectangular, pentagonal, hexagonal, heptagonal, or octagonal. The retaining collar (515) may be single-piece or formed of two or pieces (i.e., multi-piece). A multi-piece construction in some cases may permit assembly of the retaining collar (515) to the container (500).

The retaining collar (515) may have a thickness between about 0.1 inches and 1 inch, or between about 0.2 inches and 0.5 inches. The retaining collar (515) may be formed of a polymeric material, such as a plastic, or a composite material, which may include one or more of a metal, plastic or cellular material, such as pulp. The retaining collar (515), if circular, may have a diameter between about 0.5 inches and 8 inches, or between about 1 inch and 3 inches. The retaining collar may be a band of shrink sleeve material, a film material made of plastic of ten for the purposes of addings, which shrinks with heat applied during assembly. In its shrunken state the band may serve to unify the shell parts to the fitment.

Another aspect of the invention provides containers having types of closures that incorporate bicuspid or duckbill valves. A bicuspid valve can be defeated or opened by biting the valve or compressing sides of the valve. A "duck-bill" style valve can be similar to heart (bicuspid) valve in that in a resting or normal state the valve can be closed and sealed. Under pressure against the long sides of the neck, the duckbill valve lips can flex and move outward producing a free passage of liquids or fluid communication between an inside and an outside of the vessel. The valve can be produced in such a manner as allows the valve to be sealed securely during shipping and handling of the container. Upon deliberate action of an end user, the seal can be ruptured, providing a tamper-evident seal integrally molded within a neck of the closure. The tamper-evident seal can be defeated without creating any loose parts that could be discarded and become general litter.

A structural chassis can incorporate features that provide pressure to the sides of the neck in a first rotational orientation, causing the valve to be open and allow fluid to pass through the neck. In another rotational orientation the structural chassis doesn't exert this pressure, and in this other orientation, the valve is closed. In one embodiment, the relative angle between an open and a closed position can be any angle between 10 and 180 degrees. In some embodiments of the invention, the angle between the open and closed position is about 10, 30, 50, 70, 90, 110, 130, 150, 170, 190, 210, 230, 250, 270, 290, 310, 330, or 350 degrees.

In some embodiments of the invention, a container can be assembled by mating a pouch or a bag that has a fitment to a pulp-molded shell. The fitment can have an orifice that can be used for filling by any filling device or process. The orifice can be sealed by attaching or securing a cap to the fitment. The cap can be a threaded closure and may also include a tamper evident seal. The container assembly process and/or the filling process may be automated.

A threaded or friction-fit cap or stopper can be molded together with a central neck or aperture in such a way as to form a tamper-evident seal. The cap or stopper can have a connection to the aperture that is molded sufficiently thin to allow a normal user to tear the cap or stopper away easily. The cap or stopper can be prevented from moving toward the container, and thereby breaking the seal, by a non-compressible part. The non-compressible part can be located to prevent displacement of the cap or stopper.

A container can comprise a closure that is formed from a film or other thin and lightweight material. The closure can be sealed to an open end of the vessel, forming a watertight seal. The closure can be easily removed by peeling away from the open end of the vessel using a free tab extending away from the film either from an edge or from a flat surface of the film.

The closure can be opened by tearing along pre-defined rupture pathways within boundaries of the closure part to create an opening allowing communication between an inside and an outside of the vessel.

In some embodiments of the invention, a portion of the closure part can remain bonded to an open end of the vessel.

The vessel can be formed with female threads to allow secure installation of a stopper with male threads. The vessel can be formed with outer flange features allowing secure installation of a press-fit closure or cap for reseal. The chassis can be shaped as a clamshell with a longitudinal hinge axis.

Figure 6:
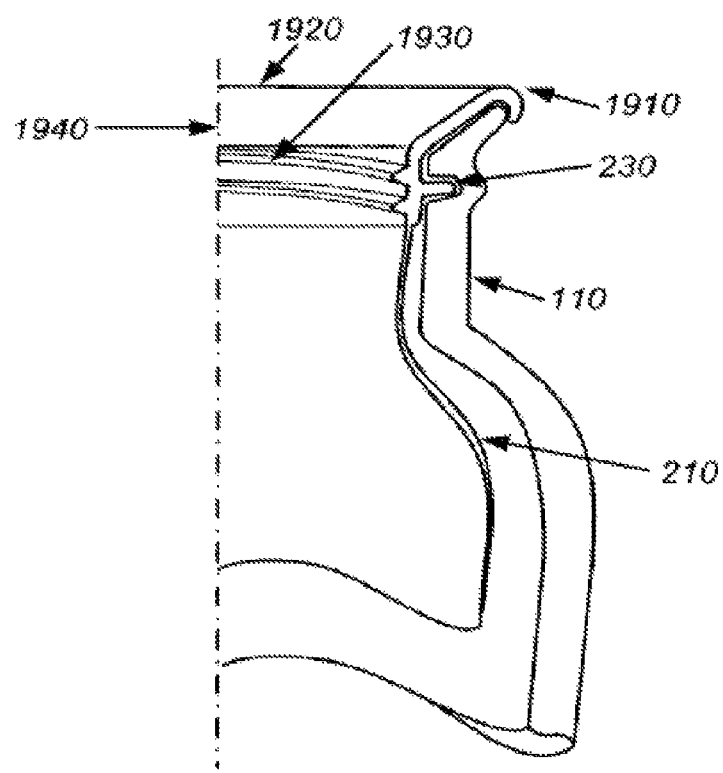
FIG. 6 is a diagram of a container with a vessel having flanges for securing the vessel to a fiber or pulp-molded body, in accordance with an embodiment of the invention.

FIG. 6 is a cross-sectional view of a container comprising a fiber or pulp-molded body (110) and a liquid-holding bag (210). The liquid-holding bag can have an aperture (1940) and the dispensing aperture area and the materials holding area are different features of a singular part. The aperture can have a flange (230) and a lip (1910). The flange and the lip can clip onto the fiber or pulp-molded body for added structural reinforcement of an aperture of the liquid-holding bag. In some embodiments, the flange and lip can be more structurally rigid than the rest of the liquid-holding bag in order to clip onto the body. A tamper-evident seal (1920) can be sealed over the aperture of the liquid-holding bag. Reinforcement of the aperture by the fiber or pulp-molded body can allow for removal of the tamper-evident seal by pulling the tamper-evident seal away from the fiber or pulp-molded body. In some embodiments of the invention, the aperture can comprise ribs or threads (1930) for re-sealable closure of the liquid-holding bag.

Figure 7:
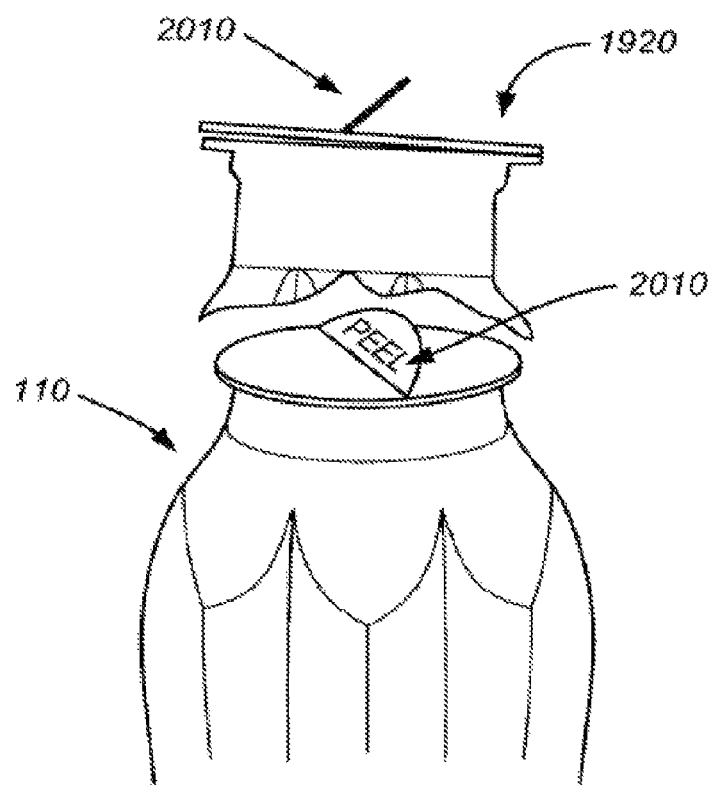
FIG. 7 is a diagram showing a tamper evident seal attached to a vessel, in accordance with an embodiment of the invention.

FIG. 7 shows an illustration of a container comprising a tamper-evident seal (1920) placed over an aperture of the container. The tamper-evident seal can comprise a flap (2010) for facilitating removal of the tamper evident seal from the container.

Figure 8:
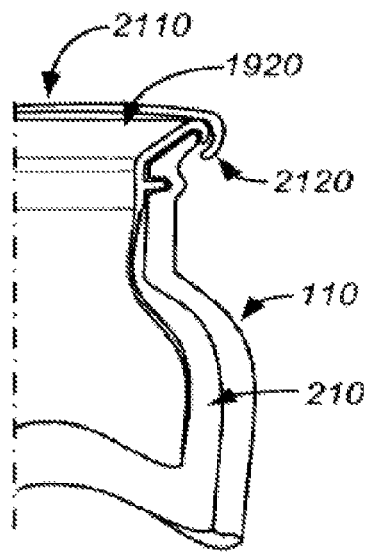
FIG. 8 is a diagram showing a lid for a container, in accordance with an embodiment of the invention.

FIG. 8 shows a diagram of the container shown in FIG. 6 with a lid (2110). The lid can snap close over a fiber or pulp-molded body (110) by a lip (2120).

Any container described herein can comprise a closure as shown in FIG. 6, FIG. 7, and FIG. 8.

Figure 9:
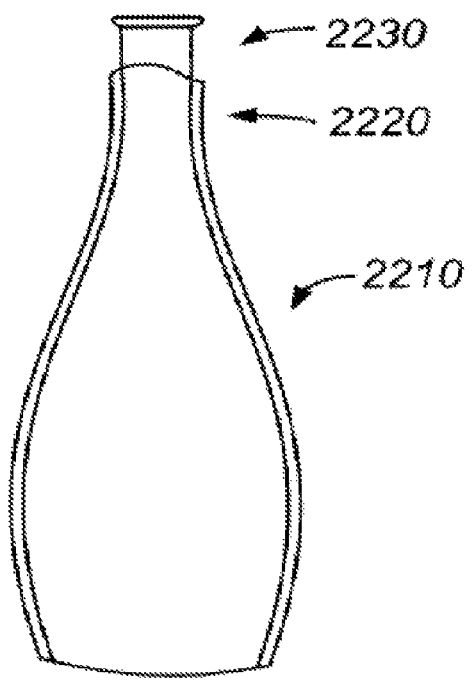
FIG. 9 is an illustration of a flexible bag container, in accordance with an embodiment of the invention.

FIG. 9 is an illustration of a flexible liquid container, wherein the flexible container comprises a closure (2230), a vessel (2210), and a neck portion (2220). The closure can be a bicuspid valve placed in the neck portion. The closure can have a tamper-evident seal feature, which may be defeated by an initial bite. The closure can have a cap or stopper. In some embodiments of the invention, the closure has a valve designed such that gas does not enter the flexible container when liquid exits the flexible liquid container. One-way transport of liquid can prevent contamination of liquid contained or stored within the flexible liquid container.

Figure 10:
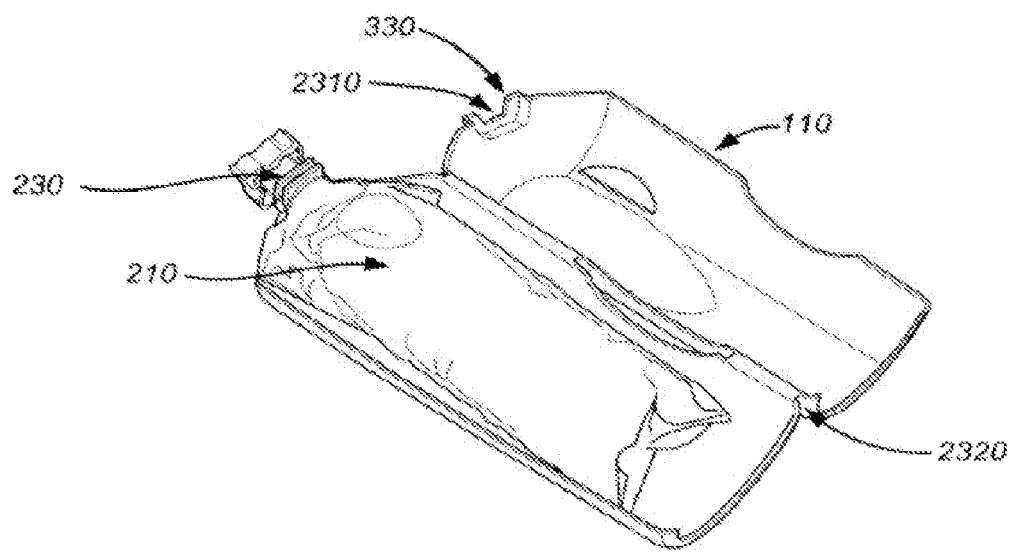
FIG. 10 is an illustration of a container with a clamshell-type skeleton that supports a flexible liquid-holding bag, shown in an open position, in accordance with an embodiment of the invention.

FIG. 10 is an illustration of a container having a fiber or pulp-molded skeleton (110) and a liquid-holding bag (210). In one configuration, the skeleton has a clamshell-type shape, which can be formed in an open position. The skeleton can have one or more hinges (2320) that allow for opening and closure of the skeleton. The skeleton can be closed around the liquid-holding bag and a dispensing aperture of the liquid-holding bag can protrude out of the skeleton through an opening (2310). The skeleton can have snap or interlock features positioned along open edges of the skeleton (110) to provide or assist with providing full and secure closure about the liquid-holding bag. The fitment of the liquid-holding bag (230) can interlock with flanges (330) on the skeleton that can support the weight of the liquid-holding bag. The skeleton can also have features, such as ribs or reinforcements, to securely support the liquid-holding bag. The container can be opened by an end user to remove the liquid-holding bag, either for the purpose of separating for recycling and disposal or for the purpose of reloading the container (e.g. replacing an empty bag with a full bag). The container can be dismantled such that the skeleton can be reused. The dismantling of the container can be performed such that the skeleton is not destroyed or destructed. The skeleton can be configured for reclosure after reloading the container. The skeleton can be reclosed using latches, hinges, adhesive, labels, or any other manner. The skeleton shell, when swapped with the recharged pouch, can be reclosed for use.

Figure 11:
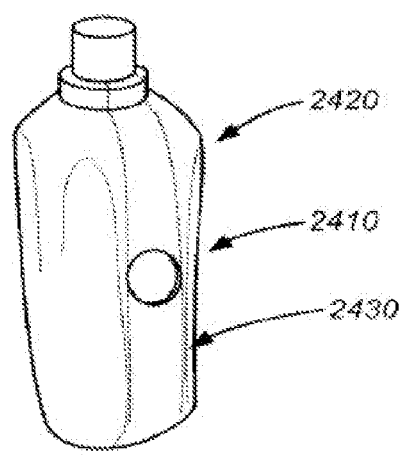
FIG. 11 is an illustration of a container that is formed with a skeleton that has features, such as holes and perforations, that facilitate separation of the skeleton from a liquid-holding bag contained within the skeleton, in accordance with an embodiment of the invention.

FIG. 11 is an illustration of a container, wherein the container has a skeleton and a liquid-holding bag, and the skeleton has features that facilitate deconstruction or separation of the skeleton from the liquid-holding bag. Such features may include holes (2410), tabs, perforations (2430, 2420), tear-away strips, pull-strips, creases, labels, embedded pieces of string or other features as might be conceived by those skilled in the art. A user can insert a finger or other object into a hole for destruction of the container. Alternatively, a pull-strip can be pulled to cause destruction of the container. The pull strips could be made of a higher density paper or organic compostable string. The pull strip could be insert molded, over molded or added after molding of the skeleton shell. User interaction with said features can cause the skeleton to become damaged or separated from the liquid-holding bag to such an extent that the two parts are no longer connected. Once separated, the parts can be directed to the correct recycling streams.

In an embodiment, another method for removing the plastic parts, such as the fitment and pouch from the skeleton shell, could be through twisting or pulling the cap/fitment out of the skeleton shell using force. In an embodiment, where the fitment is a threaded cap/fitment the connection of the fitment to the skeleton shell need to be sufficient to withstand the forces of the capping machine, the force of the user removing the cap for the first time including the breaking of the tamper evident seal, and the reasonable recapping and uncapping force generated by the user. Beyond this performance force, the fitment could be expected to release or twist away from the housing to facilitate the separation of the pouch and fitment from the outer skeletal shell for recycling or disposal. In an embodiment, the torque force that the fitment should withstand is about 30 inch-pounds (in.lbs) or more, or 35 in.lbs or more. For fitments that are not rotationally applied, such as a snap cap the same principle could apply where a certain number of lbs of force in any axis applied to the fitment needs to be withstood and beyond that could be made to release. These amounts could differ depending of production method and on container size and fitment size and type.

The container, as can any container (e.g., a liquid-holding container or vessel) described herein, can be used to hold non-liquid materials. Non-liquid materials can include powders, solids, and/or gases. The containers can be designed to hold any volume of material. In some embodiments of the invention, the containers can hold a volume of about, up to about, or greater than about 0.01, 0.1, 0.2, 0.25, 0.3, 0.35, 0.4, 0.45, 0.5, 0.6, 0.7, 0.75, 1, 1.25, 1.5, 1.75, 2, 2.25, 2.5, 2.75, or 3 liters. In some embodiments of the invention, the containers can hold a volume of about, up to about, or greater than about 0.1, 0.15, 0.2, 0.25, 0.3, 0.35, 0.4, 0.45, 0.5, 0.6, 0.7, 0.75, 0.8, 0.9 or 1 gallons. The containers can be designed to hold volumes of about 2 L or less.

FIGS. 22 and 23A-23F illustrate a liquid container having a liquid holding bag supported by a skeleton, in accordance with various embodiments of the invention. FIGS. 23A-23F illustrate various views of the liquid container of FIG. 22.

Figure 22:
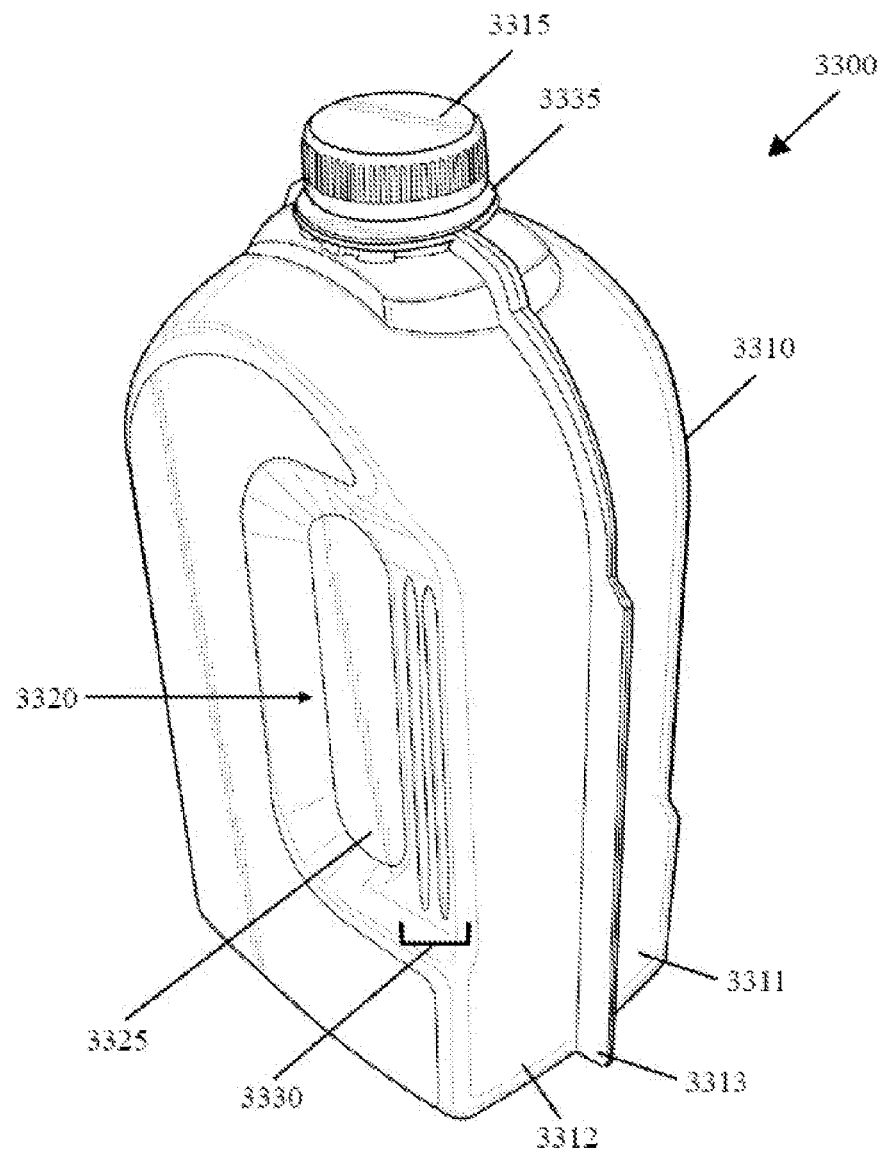
FIG. 22 shows a liquid container having a liquid holding bag within a skeleton, in accordance with an embodiment of the invention.

FIG. 22 illustrates a liquid container (3300) comprising a liquid holding bag (not shown) within a skeleton or outer shell (also skeleton shell) (3310). The liquid holding bag can be any liquid holding bag described herein, such as, for example, the liquid holding bag described above in the context of FIG. 16. The skeleton (3310) comprises a first portion (3311) and a second portion (3312) joined at a first mating point (3313). In an alternative embodiment, the skeleton is a single piece. In some embodiments, the skeleton (3310) is configured to support the liquid holding bag. In an embodiment, the skeleton (3310) includes features (see above) that facilitate deconstruction or separation of the skeleton from the liquid-holding bag. In an embodiment, the skeleton (3310) is a molded fiber skeleton. In another embodiment, the skeleton (3310) is a pulp-formed skeleton. In still another embodiment, the skeleton (3310) can be formed of a fibrous material (e.g., natural fibers), biodegradable material, or compostable material. In an embodiment, the liquid holding bag can be formed of a polymer or polymeric material, such as a flexible polymer. In an embodiment, the liquid-holding bag can be formed of an optically transparent material.

With continued reference to FIG. 22, the liquid container (3300) further comprises a cap (3315) and a first gripping or grasping area (3320) for gripping or grasping the container by a user. The first gripping area (3320) comprises a first depression (3325) and one or more ridges (3330) or set of ridges, which permit a user's thumb or fingers to grasp or handle the container (3300). The container (3300) of the illustrated embodiment comprises a gripping area (3320) having two ridges on each side of the liquid container (see below).

Figure 23A:
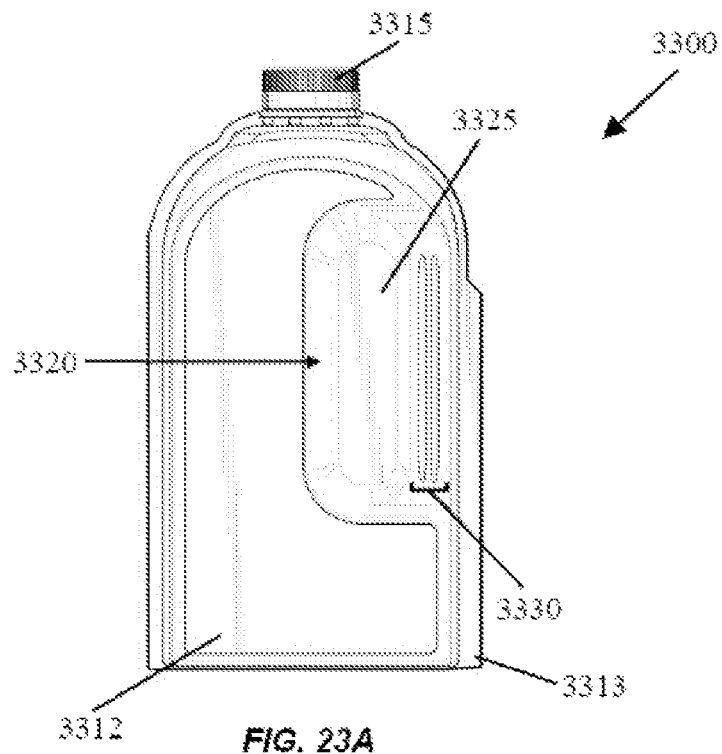
FIGS. 23A-23F illustrate various views of the liquid container of FIG. 22, in accordance with various embodiments of the invention.
Figure 23B:
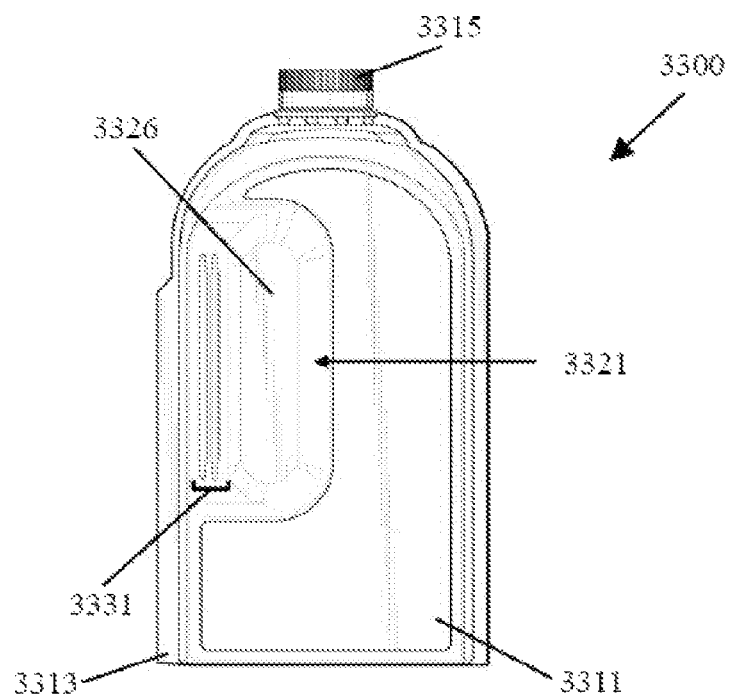

In an embodiment, such as the illustrated embodiments of FIGS. 23A and 23B, the liquid container (3300) comprises a second gripping (3321) in addition to the first gripping area (3320). In an alternative embodiment, the liquid container (3300) comprises a gripping area on either the first portion (3311) or the second portion (3312), but not both.

In embodiments, each of the gripping areas can comprise 1 or more, or 2 or more, or 3 or more, or 4 or more, or 5 or more, or 10 or more, or 20 or more ridges. In addition, each of the gripping areas can comprise multiple sets of ridges. As an example, the first gripping area (3320) can include 3 ridges. In embodiments, each of the gripping areas can include 1 or more, or 2 or more, or 3 or more, or 4 or more, or 5 or more, or 10 or more, or 20 or more depressions. As an example, the first gripping area (3320) can include two adjacent depressions.

With continued reference to FIG. 22, a fitment comprising a collar or neck portion (3335) of the liquid holding bag extends above the skeleton (3310). In such a case, with the first portion (3311) and the second portion (3312) joined at the first mating point (3313), the collar portion (3335) is disposed above the skeleton (3310). In an alternative embodiment, the collar portion (3335) of the liquid holding bag can be excluded.

In embodiments, the first portion (3311) and the second portion (3312) can be of the same volume or different volumes. In an embodiment, each of the first portion (3311) and the second portion (3312) is configured to house an equal or nearly equal volume of the liquid holding bag. In another embodiment, the sizes and volumes of the first portion (3311) and the second portion (3312) can be different, such that different volumes of the liquid holding bag are housed in each portion.

FIGS. 23A and 23B schematically illustrate opposing sides of the liquid container (3300) of FIG. 22, in accordance with embodiments of the invention. In the illustrated embodiments of FIGS. 23A and 23B, the first portion (3311) comprises the first gripping area (3320) and the second portion (3312) comprises the second gripping area (3321), with each of the first and second gripping areas (3320) and (3321) having a depression and two ridges (or a set of ridges). The first gripping area (3320) comprises a first depression (3325) and a first set of ridges (3330), and the second gripping area (3321) comprises a second depression (3326) and a second set or ridges (3331). While each set of ridges, as illustrated, comprises two ridges, each portion (3311) and (3312) can include any number, shapes and configurations of depressions and ridges. In an alternative embodiment, either the first portion (3311) or the second portion (3312), but not both, comprises a gripping area. In such a case, the portion without a gripping area can have a flat surface in place of the depression and ridges. In some cases, it might be desirable to exclude the depression and have only ridges. In an alternative embodiment, the liquid container (3300) does not include a gripping area.

With reference to FIGS. 23A and 23B, during use, a user can grasp a gripping area to dispense liquid from the liquid container (3300). In an embodiment, with the liquid container having gripping areas (3320) and (3321), the user can grasp the liquid container (3300) in a manner such that the user's thumb grasps one of the first gripping area (3320) and the second gripping area (3321), and some or all of the user's remaining fingers grasp the other of the first gripping area (3320) and the second gripping area (3321). For example, if the user holds the liquid container (3300) with the user's right hand, the user might grasp the liquid container (3300) with the user's right thumb on the first gripping area (3320) and the user's other fingers on the second gripping area (3321).

In an embodiment, the gripping area is configured to minimize strain on a user's muscles and tendons during handing of the liquid container (3300). In an embodiment, with the user grasping the liquid container (3300) in one or more gripping areas, the user can lift the liquid container (3300) without crimping the liquid container (3300). The one or more gripping areas thus aid in the handling of the liquid container (3300) while minimizing stress and strain on the user's hand.

With continued reference to FIGS. 23A and 23B, the gripping areas (3320) and (3321) can have any shape and configuration. As an example, the gripping areas can be circular, triangular or boxlike. In addition the gripping areas can have any depth. In some cases, it might be desirable to have gripping areas with depressions and ridges in the depressions.

Figure 23C:
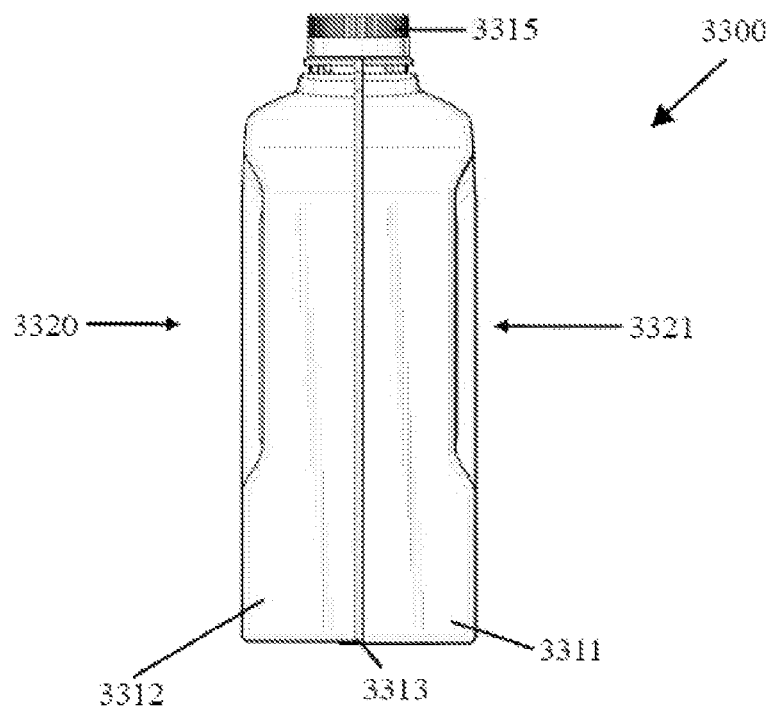
Figure 23D:
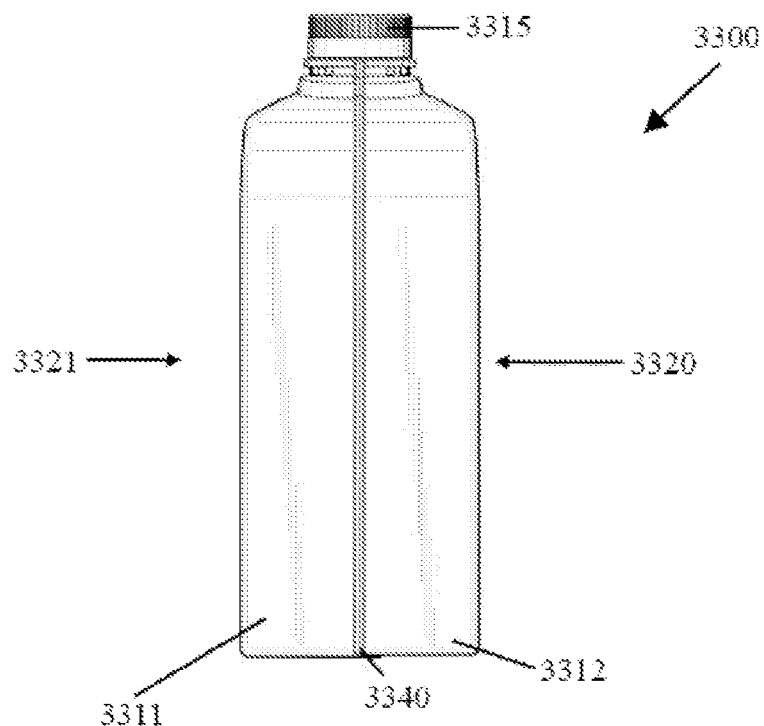

FIGS. 23C and 23D schematically illustrate opposing sides of the liquid container (3300) of FIG. 22, in accordance with embodiments of the invention. The first portion (3311) and the second portion (3312) of the skeleton (3310) are joined at the first mating point (3313) and a second mating (3340). In an embodiment, prior to assembly of the liquid container (3300) (i.e., prior to enclosing the liquid holding bag in the skeleton (3310) to form the container (3300)), the skeleton (3310) comprises the first portion (3311) and the second portion (3312) joined at the second mating point (3340) but not the first mating point (3313). In such a case, during assembly of the container (3300), the first and second portion (3311) and (3312) are brought together and joined at the first mating point (3313) to enclose the liquid holding bag (or liquid holding container). In another embodiment, prior to assembly of the liquid container (3300), the skeleton (3310) comprises the first portion (3311) and the second portion (3312) joined at the first mating point (3313) but not the second mating point (3340). In still another embodiment, prior to assembly of the liquid container (3300), the first portion (3311) and the second portion (3312) are not joined at either mating point (3313) and (3340). In such a case, the container (3300) can be assembled by enclosing the liquid holding bag in each of the first portion (3311) and the second portion (3312), following by forming the skeleton (3310) by joining the first and second portion (3311) and (3312) at the first and second mating points (3313) and (3340). In some embodiments, the first mating point (3313) may protrude as shown in FIG. 23A. In other embodiments, the first mating point need not protrude, or may come down without providing an extra flap. For example, the first mating point (3313) may come down flat like the second mating point (3340).

Figure 23E:
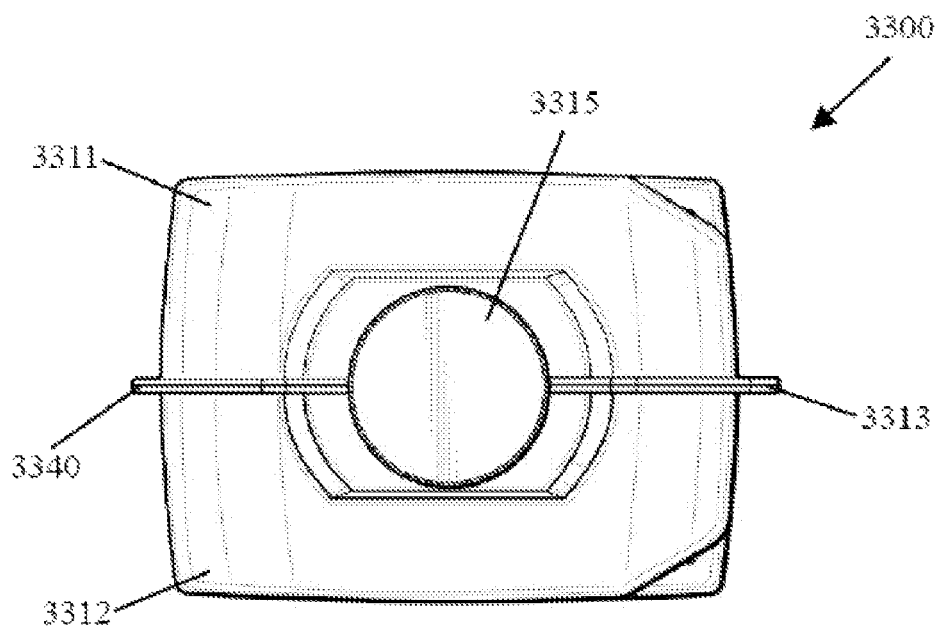
Figure 23F:
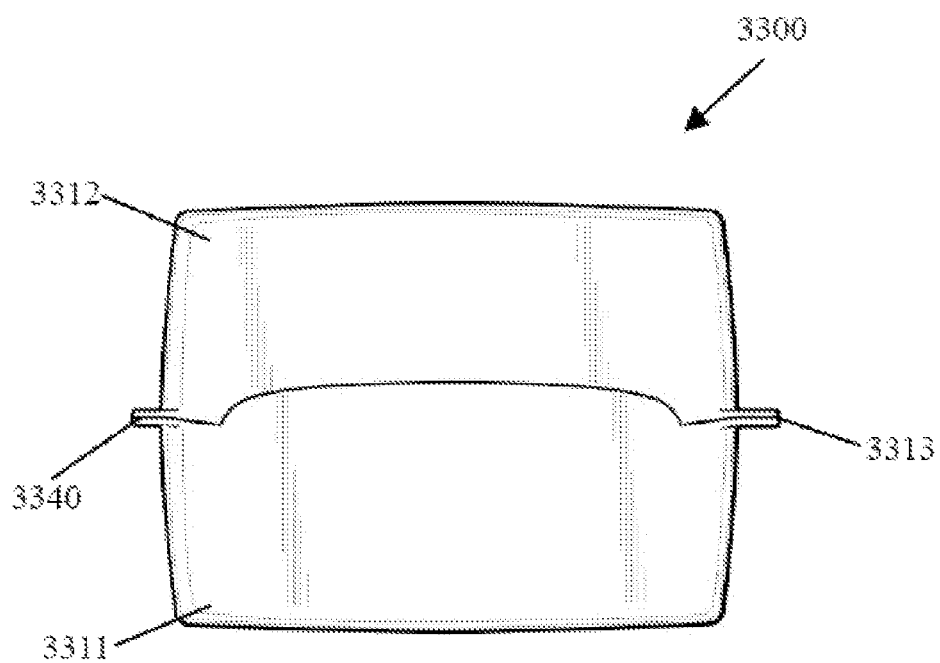

FIGS. 23E and 23F schematically illustrate top and bottom views of the liquid container (3300) of FIG. 22, in accordance with embodiments of the invention. With reference to FIG. 23E, the liquid container (3300) comprises the cap (3315) sealing the liquid holding bag (not shown). The skeleton (3310) of the liquid container (3300) comprises the first portion (3311) and the second portion (3312) enclosing the liquid holding bag. The first and second portions (3311) and (3312) are joined at the first mating point (3313) and the second mating point (3340). As shown in FIG. 23F, a first portion (3311) may overlap part of the second portion (3312). For example, a part of the bottom of the first portion may extend over part of the second portion. In some examples, a flap or edge may be provided that causes the overlap. With reference to FIGS. 23E and 23F, a top and bottom portion of the liquid container (3300) has a rectangular configuration, with a width of the liquid container (3300) being larger than a length of the liquid container (3300). In embodiments, the liquid container (3300), when viewed from above and below, can have any shape, such as circular, triangular, square or rectangular.

With reference to FIGS. 22 and 23A-F, the liquid container (3300) can have any size and shape. As an example, the liquid container (3300) can be cylindrical. As another example, the liquid container (3300) can be triangular. As still another example, the liquid container (3300) can be boxlike, having a length, height and width that are the same or substantially similar. In certain embodiments, the top portion of the liquid container (3300) can have a size and shape that is different from the bottom portion of the liquid container (3300).

In embodiments, the cap (3315) is configured to form an airtight (or hermetic) seal between the liquid holding bag and the external environment. The fitment of the liquid container (3300) can be a re-sealable closure, twist cap, snap cap, lid, zipper, fold, adhesive, clip, or any other re-sealable mechanism known or later developed in the art. In some embodiments, a re-sealable closure may be supported by, contact, or use the skeleton of the liquid container.

In embodiments, the liquid holding bag enclosed by the skeleton (3310) can have any shape. In an embodiment, the liquid holding bag can be shaped similarly to the skeleton (3310). The liquid holding bag may be shaped to minimize an internal cavity of the bottle between the skeleton and the bag. The liquid holding bag may be shaped to contact a portion or majority of the inner surface of the skeleton. In another embodiment, the liquid holding bag can be shaped so as to minimize the use of material (see above).

In an embodiment, containers are able to me made on high-speed production lines and high speed filling line in order reduce costs and be competitive with other aforementioned packaging technologies. In certain embodiments, containers or bottles can be fully assembled prior to filling. The pouches could be made on a horizontal forming machine with or without fitment inserter. The pouches could be made on other known machines. They are then assembled into the skeleton shell. Either the pouch or the shell, or both could have one or more features to facilitate automated assembly. The skeleton shell and pouch with fitment are then assembled. A standard bottling line can be used where the container fills similarly to a standard bottle. In such a case, various components of embodiments of the invention, such as skeletons and liquid holding bags, can be integrated into existing standard bottling lines, thereby making use of existing bottle filling line equipment and infrastructures. In other embodiments, the pouch and fitment can run and be filled on either Horizontal Form Fill machines or Vertical Form Fill machines. These filled pouches can then be assembled to skeleton shells to complete the product containers.

Containers of embodiments of the invention can be designed to minimize materials cost, thus aiding in the reduction of post-use waste. In addition, materials can be selected so as to minimize environmental impact. For example, the skeleton can be formed of a biodegradable material.

Containers of embodiments of the invention can be designed for storing and dispensing various liquids, such as, for example, fruit juice (e.g., apple juice, orange juice, grape juice), milk, carbonated liquids (e.g., soda beverages), wine, beer and water. In the case of wine, various containers of embodiments of the invention can contain skeletons in the shape of carafes.

In some embodiments, containers can be permanent containers. In some embodiments, containers can be designed to mate various components, such as caps and pouches. In some cases, containers can be designed to mate with smart caps and pouches. In various embodiments, containers can be configured for use with turn-key integrated manufacturing equipment.

Filling Containers

In various embodiments, methods for filling containers having liquid holding bags within skeleton shells are provided. In an embodiment, there is space between a skeleton and a liquid holding bag within the skeleton so that air (or another gas) within the skeleton (or shell) can be displaced through the shell as the liquid holding bag is filled. In addition, air can pass through the skeleton to fill the volume as contents are dispensed from the bag. Allowing air to pass into the volume inside the skeleton as the contents are dispensed from the liquid holding bag helps with the smooth dispensing of the contents of the liquid holding bag. In an embodiment, the flow of air through the skeleton can be achieved using the porosity of the skeleton. In another embodiment, the flow of air through the skeleton can be achieved with the aid of a vent in the skeleton. In such a case, the vent can be provided at a position where there is little risk of puncturing the liquid holding bag.

In an embodiment, a container, such as the container (3300) of FIG. 22 and FIGS. 23A-23F, can be filled by introducing content, such as liquid content, through a closure of the container and into a liquid holding bag of the container. The closure can be a sealable or re-sealable closure. In an embodiment, as the liquid holding tank is filled with the contents of the container, gas, such as air, is displaced.

In an embodiment, before filling, the liquid holding bag within the skeleton can be rolled to assist with the laying of the liquid holding bag within the skeleton. In this case, the liquid holding bag can be folded or rolled in such a way that it can easily unfold or unroll, such as, for example when the liquid holding bag is filled. Any folds or rolls may be lightly held by one or more holding members, such as, e.g., thin pieces of tape that will release as the bag fills. Alternatively, the bag can be held in the folded or rolled condition by an adhesive, clip or band, or other methods for minimizing the size of the pouch. During filling, as the body of the liquid holding bag expands, such as, for example, by injecting a gas into the bag prior to filling or expansion of the liquid holding bag upon filling the bag with its contents, the retaining means can be ruptured or removed from the liquid holding bag to allow the body of the liquid holding bag to expand. By folding or rolling the liquid holding bag prior to laying it into the skeleton of the container, various issues, such as, for example, the liquid holding bag getting caught by the skeleton when enclosing the liquid holding bag, can be minimized. This filling procedure further helps the liquid holding bag fill properly, as it will assume the correct internal orientation when filled.

In an embodiment, the liquid holding bag has a volume greater than the internal volume of the skeleton. In this way, when the liquid holding bag of the container is filled, the liquid holding bag will come in contact with the inner surface of the skeleton. This can help ensure that the weight of the contents is supported by the skeleton rather than by the liquid holding bag.

In embodiments, after filling, the openings through which content was introduced to the liquid holdings, such as the closures of the liquid holding bags, are sealed. In an embodiment, the closures can be sealably or re-sealably closed with a sealing member, such as a cap (e.g., smart cap), twist cap, snap cap, or lid. The closures can be sealed in a controlled environment, such as an inert environment or under vacuum, or in the ambient environment.

In some embodiments, containers of embodiments of the invention can benefit from certain features to help their merchandizing. These could include an ability to suspend the product at point of sale. This could include features to allow for the suspension on rails of the recharge pouches. Recharge pouches, or refill pouches, could be sold as single items or as groups of pouches, and are swappable into a skeleton shell after another one has been emptied. For example, a single pouch can be purchased and inserted into the skeleton shell of another container after the removal of the skeleton shell of that container. A number of pouches could be sold with a single skeleton shell. The skeleton shell could be intended to be recycled after a number of uses or intended to be used indefinitely. The recharge pouches could have a limited amount of packaging attached at retail points for branding purposes or merchandizing purposes. This limited packing could also serve a function in the reconnection to the skeleton shell, its subsequent use, or intended for removal and recycling. This new packaging invention could have features for merchandizing or meeting logistical needs.

For other contents that may not be dependent on fitments, the ecologic technology of flexible pouch mated to a biomaterial based thermoformed skeleton, with the option of using recycled content in the format of a bowl/cup/tray, could be used. Separable components for recycling can be used in certain cases. There would be a removable tamper evident seal. The liner would be separable from the bowl/cup/tray. This could be for refrigerated or frozen items, such as, e.g., yogurt, ice cream, ready-to eat-meals, salads, dried fruit, olives, and margarine. Such containers can be used with non-refrigerated items (e.g., nuts, spices), and they could be resealable with the aid of, e.g., lids or re-stackable peel away tabs. In an embodiment, such containers can include a separable liner and skeleton technology for items that are in jars or cans (structured) or in stand up pouches. Items that could benefit from such containers include items that could benefit from more structure but less plastic, such as, e.g., nuts, dried fruits, and snacks.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The invention claimed is:

1. A container, comprising:
a skeleton shell defining a container body of the container, the skeleton shell having at least one seam and being formed from a recycled and/or biodegradable pulp material;
a bag or liner removably disposed within the skeleton shell; and
wherein the skeleton shell comprises at least one separation feature that facilitates separation of the skeleton shell from the bag or liner, wherein the at least one separation feature is offset from the at least one seam.

2. The container of claim 1, wherein:
the at least one separation feature comprises one or more of a hole, a tab, or a perforation.

3. The container of claim 1, wherein:
the at least one separation feature is configured for a user to facilitate at least partial destruction of the container.

4. The container of claim 1, wherein:
the at least one separation feature is configured for a user to facilitate separation of the skeleton shell from the bag or liner.

5. The container of claim 2, wherein:
the at least one separation feature forms a pull-strip.

6. The container of claim 5, wherein:
the pull-strip is made of a polymer, a high density paper, or organic compostable, string.

7. The container of claim 5, wherein:
the pull-strip is insert molded into, or over molded onto, the skeleton shell.

8. The container of claim 5, wherein:
the pull-strip is added to the skeleton shell subsequent to forming of the skeleton shell.

9. The container of claim 5, wherein:
the pull-strip is integral to the skeleton shell.

10. The container of claim 1, wherein:
the skeleton shell is: molded as an open shell which is then folded to form a hollow shell; or, molded in a number of parts which are then joined together to form the hollow shell.

11. The container of claim 1 wherein:
the skeleton shell is made of a singular piece that is hollow with an aperture.

12. The container of claim 1, wherein:
the bag or liner is a liquid-holding bag or liner.

13. The container of claim 1, wherein:
the bag or liner comprises a fitment, wherein the fitment comprises one or more stakes that are separable from the fitment; and
the fitment is secured to the skeleton shell by engaging the one or more stakes to the skeleton shell.

14. The container of claim 13, wherein:
the one or more stakes are engaged with the skeleton shell through friction, partially embedding into the skeleton shell, or piercing fully through the skeleton shell by mechanical pressing.

15. The container of claim 1, wherein the bag or liner comprises a fitment, the fitment being integral to the bag or liner.

16. The container of claim 15, further comprising:
a retaining collar that is integral to the fitment.

17. The container of claim 13, wherein:
the one or more stakes are deformed by an application of energy which further engages the fitment to the skeleton shell.

18. The container of claim 17 wherein:
the energy is heat energy, mechanical energy, ultrasonic energy, or any combination of heat, mechanical, and ultrasonic, energy.

19. The container of claim 1, wherein:
the pulp material comprises fiber that is derived from wood pulp, plant pulp, agriculture waste by-product pulp, paper pulp, or a combination of a fiber based pulp.

20. The container of claim 1, wherein:
the bag or liner is formed of a biodegradable material.

* * * * *